US012578006B2

(12) United States Patent
Harris

(10) Patent No.: US 12,578,006 B2
(45) Date of Patent: Mar. 17, 2026

(54) BARBED WIRE REPAIR APPARATUSES AND METHODS FOR MAKING AND USING SAME

(71) Applicant: Norman Harris, Sugar Land, TX (US)

(72) Inventor: Norman Harris, Sugar Land, TX (US)

( * ) Notice: Subject to any disclaimer, the term of this patent is extended or adjusted under 35 U.S.C. 154(b) by 958 days.

(21) Appl. No.: 17/727,254

(22) Filed: Apr. 22, 2022

(65) Prior Publication Data

US 2023/0341026 A1 Oct. 26, 2023

(51) Int. Cl.
B21F 15/06 (2006.01)
F16G 11/14 (2006.01)

(52) U.S. Cl.
CPC ............ F16G 11/146 (2013.01); B21F 15/06 (2013.01)

(58) Field of Classification Search
CPC ............ B21F 9/002; B21F 9/02; B21F 15/06; B21F 29/00; E04H 17/127; F16B 7/04
See application file for complete search history.

(56) References Cited

U.S. PATENT DOCUMENTS 528,794 A * 11/1894 Page ....................... B21F 29/00
140/48

OTHER PUBLICATIONS

GrippleTV, "Repairing Barbed Wire—Gripple Barbed", Jul. 16, 2012, YouTube, https://www.youtube.com/watch?v=jluK513snWY (Year: 2012).*

* cited by examiner

*Primary Examiner* — Debra M Sullivan
(74) *Attorney, Agent, or Firm* — Robert W. Strozier

(57) ABSTRACT

Barbed wire repair apparatuses including (a) two members, each of the two members includes a barbed wire attachment or receiving apertures and an engaging surface having connection slot and (b) a connection device so that as connection devices insert into and through the connection slots and tightened to bring the engaging surfaces into contact and simultaneously tensioning the barbed wire at a break therein and methods for making and using same.

18 Claims, 52 Drawing Sheets

Figures 1A, 1B:
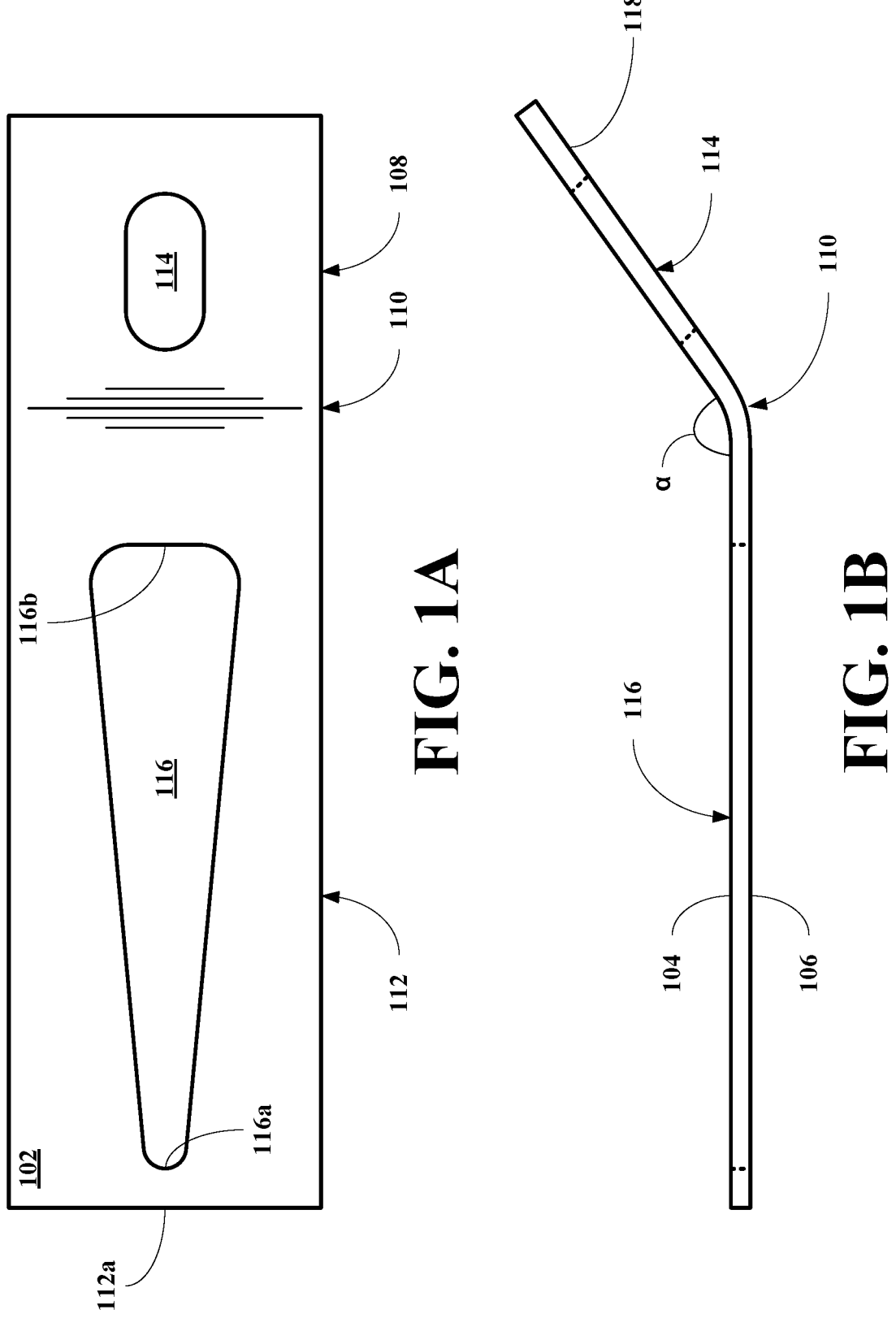

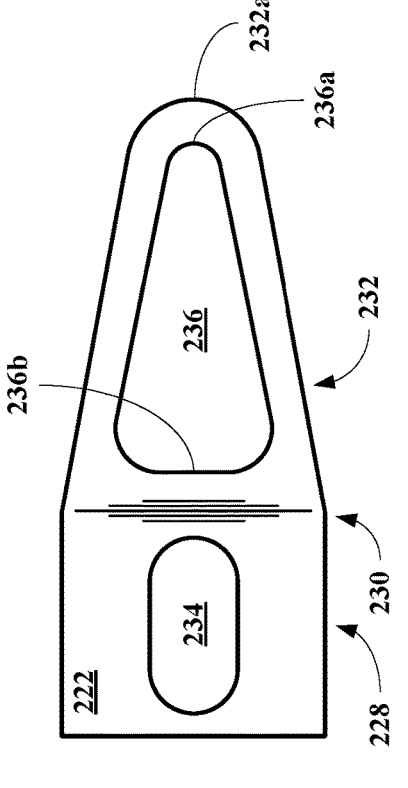
FIG. 2C
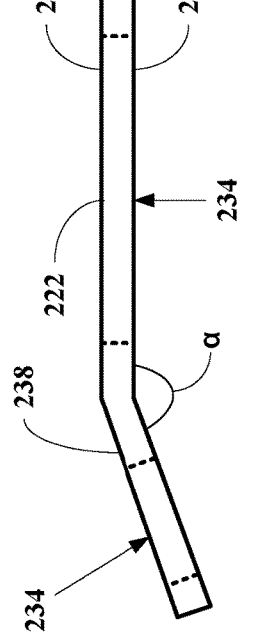
FIG. 2D
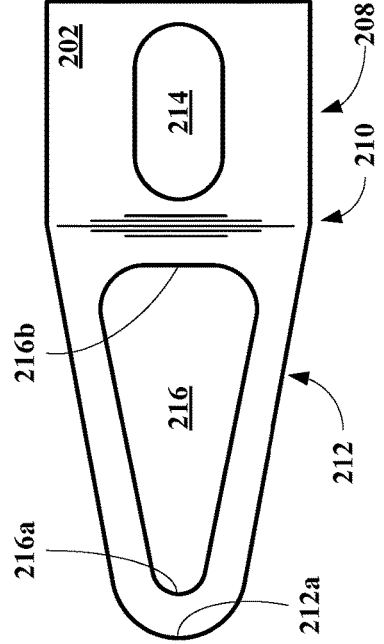
FIG. 2A
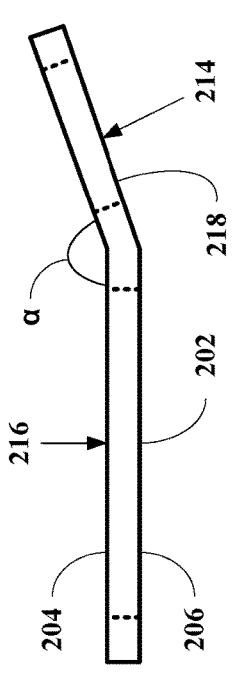
FIG. 2B

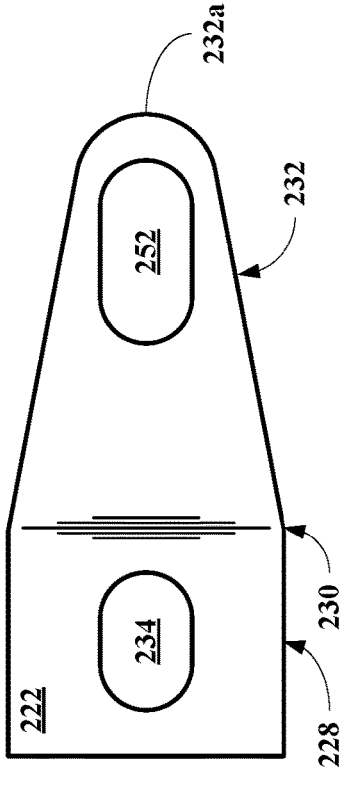
FIG. 2H
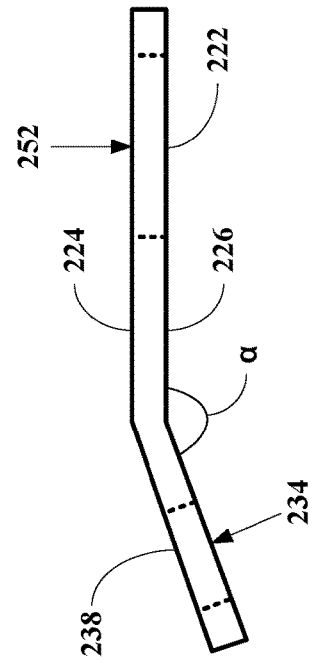
FIG. 2I
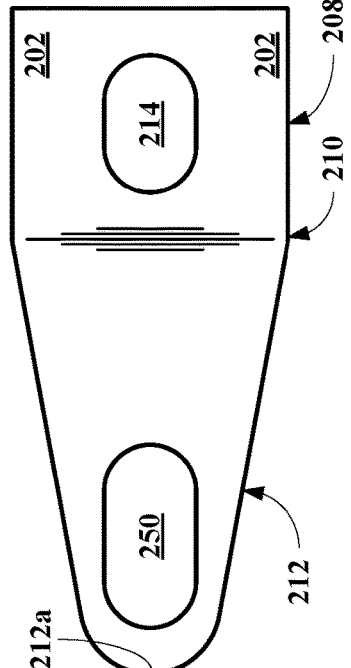
FIG. 2F
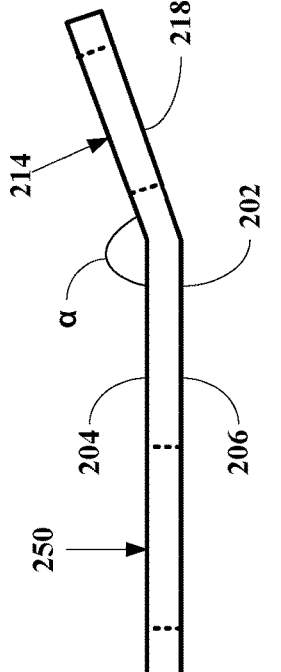
FIG. 2G

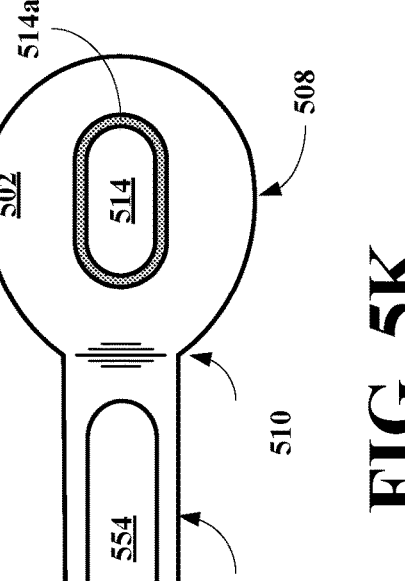
FIG. 5K
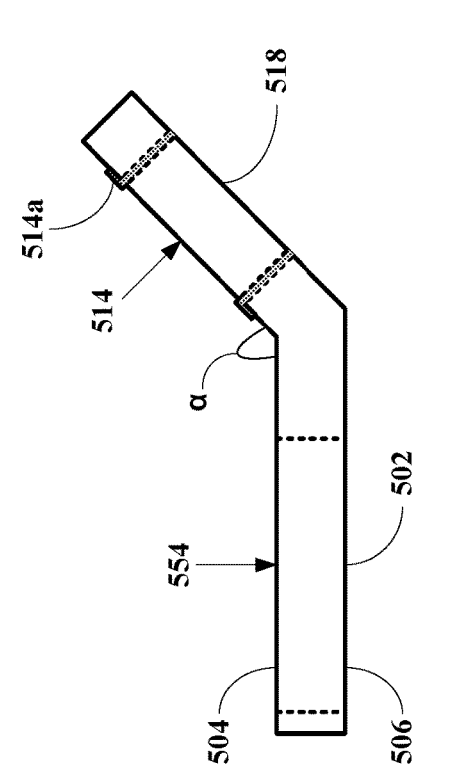
FIG. 5L
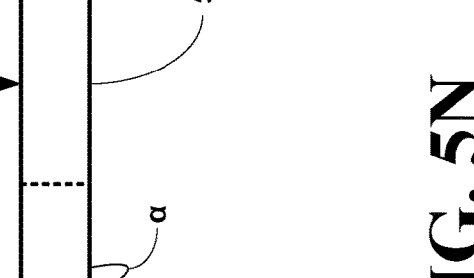
FIG. 5M
FIG. 5N

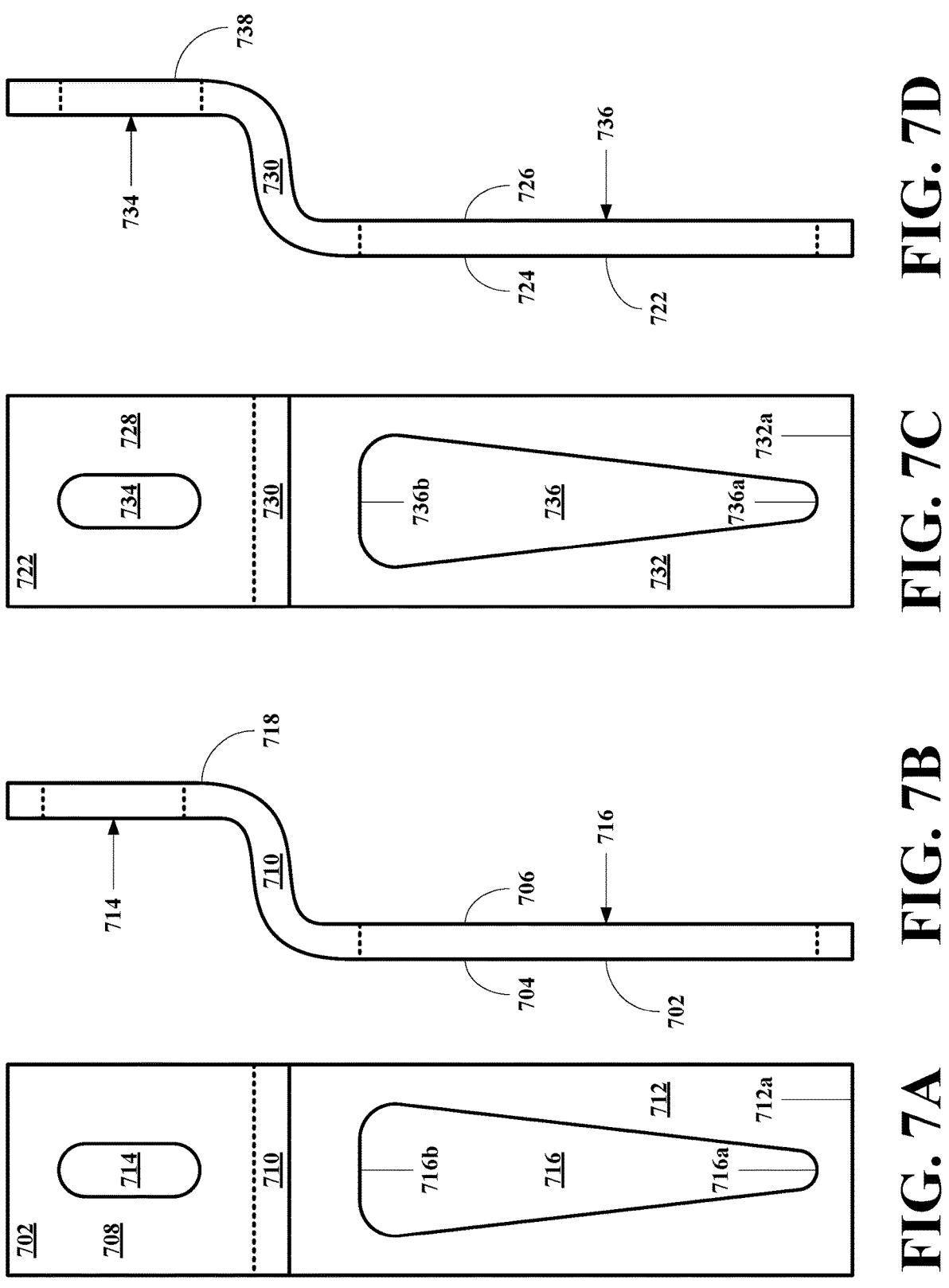
FIG. 7A    FIG. 7B    FIG. 7C    FIG. 7D

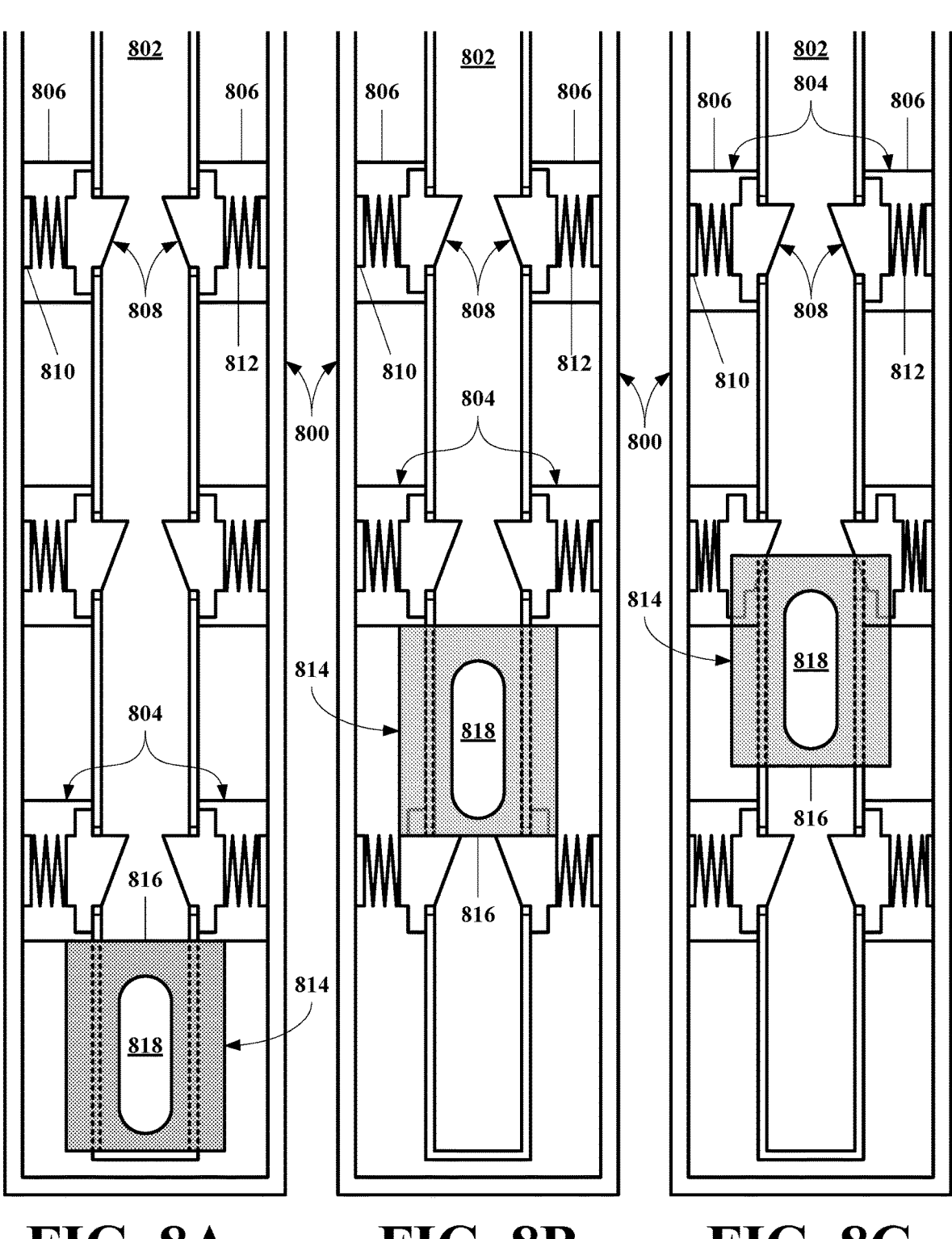
FIG. 8A          FIG. 8B          FIG. 8C

BARBED WIRE REPAIR APPARATUSES AND METHODS FOR MAKING AND USING SAME

BACKGROUND OF THE DISCLOSURE

1. Field of the Disclosure

Embodiments of the present disclosure relate to barbed wire repair apparatuses and methods for making and using same.

In particular, embodiments of the present disclosure relate to barbed wire repair apparatuses and methods for making and using same, wherein the apparatuses including (a) two members, each of the two members includes one or more barbed wire attachments or receiving apertures, and an engaging surface having one or more connection apertures and (b) one or more connection devices so that as connection devices insert into and through the connection slots and tightened to bring the engaging surfaces into contact and simultaneously tensioning the barbed wire at a break therein.

2. Description of the Related Art

The following patents and application represent the present state of the art: U.S. Pat. No. 159,177; 197,729; 239,128; 469,403; 577,754; 838,522; 902,406; 1,095,446; 2,147,706; 2,814,516; 4,662,035, 5,147,145, 5,357,656, 5,515,582, 5,577,712, 7,913,408, and 9,267,571 incorporated herein by reference by operation of the closing paragraph.

While there are a large number of barbed wire repair apparatuses, there is still a need in the art for alternative barbed wire repair apparatuses and methods for making and using same.

SUMMARY OF THE DISCLOSURE

Embodiments of this disclosure provide barbed wire repair apparatuses including (a) two members, each member including a barbed wire receiving aperture or slot and an engaging surface having a connection aperture, and (b) a connection device.

In certain embodiments, the members include a

Embodiments of this disclosure provide barbed wire repair apparatuses including (a) two members, each member including one or more barbed wire attachments or barbed wire receiving apertures and an engaging surface having one or more connection apertures, and (b) one or more connection devices.

Embodiments of this disclosure provide barbed wire repair apparatuses including (a) two members, each member including a plurality of barbed wire attachments or barbed wire receiving apertures and an engaging surface having a plurality of connection apertures, and (b) one or more connection devices.

Embodiments of this disclosure provide methods of repairing breaks in barbed wire including attaching each end of the barbed wire to a barbed wire repair apparatus including (a) two members, each member including one or more barbed wire attachments or barbed wire receiving apertures and an engaging surface having one or more connection apertures, and (b) one or more connection devices.

BRIEF DESCRIPTION OF THE DRAWINGS OF THE DISCLOSURE

The disclosure may be better understood with reference to the following detailed description together with the appended illustrative drawings in which like elements are numbered the same:

First Embodiments

FIGS. 1A-E depict front and side views of members of an embodiment of a barbed wire repair apparatus and a side view of a repaired barbed wire segment.

FIGS. 1F-J depict front and side views of members of another embodiment of a barbed wire repair apparatus and a side view of a repaired barbed wire segment.

FIGS. 1K-O depict front and side views of members of another embodiment of a barbed wire repair apparatus and a side view of a repaired barbed wire segment.

Second Embodiments

FIGS. 2A-E depict front and side views of members of another embodiment of a barbed wire repair apparatus and a side view of a repaired barbed wire segment.

FIGS. 2F-J depict front and side views of members of another embodiment of a barbed wire repair apparatus and a side view of a repaired barbed wire segment.

FIGS. 2K-O depict front and side views of members of another embodiment of a barbed wire repair apparatus and a side view of a repaired barbed wire segment.

Third Embodiments

FIGS. 3A-E depict front and side views of members of another embodiment of a barbed wire repair apparatus and a side view of a repaired barbed wire segment.

FIGS. 3F-J depict front and side views of members of another embodiment of a barbed wire repair apparatus and a side view of a repaired barbed wire segment.

FIGS. 3K-O depict front and side views of members of another embodiment of a barbed wire repair apparatus and a side view of a repaired barbed wire segment.

Fourth Embodiments

FIGS. 4A-E depict front and side views of members of another embodiment of a barbed wire repair apparatus and a side view of a repaired barbed wire segment.

FIGS. 4F-J depict front and side views of members of another embodiment of a barbed wire repair apparatus and a side view of a repaired barbed wire segment.

FIGS. 4K-O depict front and side views of members of another embodiment of a barbed wire repair apparatus and a side view of a repaired barbed wire segment.

Fifth Embodiments

FIGS. 5A-E depict front and side views of members of another embodiment of a barbed wire repair apparatus and a side view of a repaired barbed wire segment.

FIGS. 5F-J depict front and side views of members of another embodiment of a barbed wire repair apparatus and a side view of a repaired barbed wire segment.

FIGS. 5K-O depict front and side views of members of another embodiment of a barbed wire repair apparatus and a side view of a repaired barbed wire segment.

Sixth Embodiments

FIGS. 6A-E depict front and side views of members of another embodiment of a barbed wire repair apparatus and a side view of a repaired barbed wire segment.

FIGS. 6F-J depict front and side views of members of another embodiment of a barbed wire repair apparatus and a side view of a repaired barbed wire segment.

FIGS. 6K-O depict front and side views of members of another embodiment of a barbed wire repair apparatus and a side view of a repaired barbed wire segment.

Seventh Embodiments

FIGS. 7A-E depict front and side views of members of another embodiment of a barbed wire repair apparatus and a side view of a repaired barbed wire segment.

FIGS. 7F-J depict front and side views of members of another embodiment of a barbed wire repair apparatus and a side view of a repaired barbed wire segment.

FIGS. 7K-O depict front and side views of members of another embodiment of a barbed wire repair apparatus and a side view of a repaired barbed wire segment.

Rachet Type Slot Embodiment

FIGS. 8A-C depict embodiments comprising a rachet-type adjustable slot.

Illustration of Method of Use of the Embodiments

FIGS. 9A-E depict a sequence of figures showing the repair of a break in a barbed wire.

DEFINITIONS USED IN THE DISCLOSURE

The term "at least one" means one or more or one or a plurality, additionally, these three terms may be used interchangeably within this application. For example, at least one device means one or more devices or one device and a plurality of devices.

The term "one or more" and "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "angle" means an angle measured in degrees between two parts of a surface.

The term "engaging surface" means a surface of a first member that contacts a corresponding member of a second member so that a connection device may be used to connect the two members together.

The term "spring" or "reciprocating device" means a device that may be compressed and expanded so that elements may transition between a first state and a second state.

All ranges set forth herein include end points and all subranges. If the range is reported in integers, then the subranges include all integer subranges. If the range is reported in real number, then the subranges include all real number subranges.

DETAILED DESCRIPTION OF THE DISCLOSURE

The inventor has found that a new and simple device for repairing break in barbed wire fencing may be constructed out of two members and one or more connection devices, each of the members including one or more barbed wire apertures disposed at its distal portion for attaching an end of a break in a barbed wire fence, a bent middle portion, and a proximal portion including one or more connection apertures. The one or more connection devices are used to detachably connect the two members together via the one or more connection apertures after connecting the broken ends of the barbed wire to the members via the one or more barbed wire apertures. Once the broken ends of the barbed wire fence are secured to the members, the one or more connections are inserted through the apertures and tightened tensioning the barbed wire fence.

The bent portion makes an angle α between the distal portion and the proximal portion, the angle α having a value between about 20 degrees and about 70 including endpoints and subranges. In certain embodiments, the value between about 25 degrees and about 65 degrees including endpoints and subranges. In certain embodiments, the value between about 30 degrees and about 60 degrees including endpoints and subranges. In certain embodiments, the value is between about 35 degrees and about 55 degrees including endpoints and subranges. In certain embodiments, the value is between about 40 degrees and about 50 degrees including endpoints and subranges. In certain embodiments, the value is between about 37.5 degrees and about 47.5 degrees including endpoints and subranges. In certain embodiments, the angle α has a value of about 20 degrees, about 25 degrees, about 30 degrees, about 35 degrees, about 40 degrees, about 45 degrees, about 50 degrees, about 55 degrees, about 60 degrees, about 65 degrees, or about 70 degrees including any other value between 20 degrees and 70 degrees. In certain embodiments, the value of the angle α may assume any integral, fractional, or real numeric value between 20 degrees and about 70 degrees, e.g., about 20, about 25, about 30, about 35, about 40, about 45, about 50, about 55, about 60, about 65, about 70, about 20.5, about 25.5, about 30.5, about 35.5, about 40.5, about 45.5, about 50.5, about 55.5, about 60.5, about 65.5, or any other value.

In certain embodiments, the one or more barbed wire apertures may allow the barbed wire ends to be threaded through different barbed wire apertures on the two members to insure that the barbed wire when repaired is pulled tight. In other embodiments, the barbed wire apertures are slots including barbed wire tensioning devices adapted to receive a broken end of the barbed wire break and moved toward the bent portion via the tension member that is subsequently tightened onto the member along the slot length.

Suitable Materials and Components for Use in the Disclosure

Suitable materials from which the members may be constructed includes, without limitation, any durable material including metals, ceramics, fiber reinforced ceramics, plastics, fiber reinforced plastics, any other structural material, and mixtures or combinations thereof.

Suitable connection devices for use in the disclosure include, without limitation, threaded connections comprising a threaded bolt and a threaded nut, a threaded bolt adapted to be screwed into a threaded aperture, quick connections, ring connections, loop connections, any other connection devices for connecting two members together, or any combination thereof.

Suitable nuts for use herein include, without limitation, hex nut, K-lock nut, nylon insert nut, T-nut, regular square nut, heavy hex nut, hex jam nut, hex castle nut, finished slotted nut, clinch nut, flange nut, top lock nut, RND base weld nut, tab weld nut, flex type lock nut, wing nut, stamped wing nut, side lock nut, acorn nut, coupling nut, RIV nut, any other type of nut, or any combination thereof.

Suitable bolts or screws for use herein include, without limitation, machine screws, threaded cutting machine screws, hex bolts, carriage bolts, socket screws, set screws, eye bolts, J-bolts, U-bolts, shoulder bolts, elevator bolts, sex bolts and matting screws, any other type of bolt or screw, or any combination thereof.

Suitable materials for use in the thread protector or protection members include, without limitation, any plastic, any fiber reinforced plastic, or any mixture and combination thereof. Suitable plastics include, without limitation, polyolefins, polycarbonates, polyesters, polyamides, polyimides, polyacids, acrylics, acetals, olefin-diene polymers, or any combination or mixture thereof. Suitable polyolefins include, without limitation, polyethylene, polypropylene, polybutenes, polypentenes, polyhexenes, polyheptenes, polyoctenes, higher linear olefin polymers, polystyrene, polyvinylchloride, any other polyolefin, copolymers thereof, or any combination or mixture thereof. Suitable polycarbonates, without limitation, poly(bisphenol A carbonate), poly (4,4'-thiodiphenylene carbonate), poly(bisphenol B carbonate), poly(bisphenol F carbonate), poly(ethylene carbonate), poly(propylene carbonate), poly(2,6,3',5'-tetrachloro bisphenol A carbonate), poly(tetramethyl bisphenol A carbonate), or any combination or mixture thereof. Suitable polyesters include, without limitation, poly(Bisphenol A isophthalate), poly(Bisphenol A terephthalate), poly(butylene adipate), poly(butylene isophthalate), poly(butylene sebacate), poly(butylene succinate), poly(butylene terephthalate), poly(ethylene sebacate), poly(ethylene succinate), poly(caprolactone), poly(cyclohexylenedimethylene terephthalate), poly(ethylene adipate), poly(ethylene isophthalate), poly(ethylene naphthalate), poly(ethylene phthalate), poly (ethylene terephthalate), polyglycolide, poly(hexylene sebacate), poly(hexylene succinate), poly(3-hydroxybutyrate), poly(4-hydroxybutyrate), polylactic acid, poly(propylene adipate), poly(trimethylene succinate), poly(trimethylene terephthalate), or any combination or mixture thereof. Suitable polyamides include, without limitation, polyamide 6, polyamide 12, polyamide 66, polyamide 69, polyamide 6-10, polyamide 6-12, polyamide 46, polyamide 1212, polyamide 11, polyphthalamide, or any combination or mixture thereof. Suitable polyimides include, without limitation, Apical, Kapton, UPILEX, VTEC PI, Norton TH, Kaptrex, or any combination or mixture thereof. Suitable polyacids include, without limitation, polylactic acid polymers, polyglycolic acid polymers, copolymers thereof, or any combination or mixture thereof. Suitable acrylics include, without limitation, polyacrylic acid, polymethacrylic acid, acrylic acid copolymers with 2-chloroethylvinylether, acrylonitrile, or similar co-monomers, polymethylmethacrylate, poly(acrylic acid), poly(benzyl acrylate), poly(butyl acrylate), poly(4-chlorophenyl acrylate), poly(2-cyanoethyl acrylate), poly(cyanomethyl acrylate), poly(cyclohexyl acrylate), poly(ethyl acrylate), poly(2-ethylhexyl acrylate), poly(hexyl acrylate), poly(isobutyl acrylate), poly(isopropyl acrylate), poly(methyl acrylate), poly(octyl acrylate), poly (propyl acrylate), poly(sec-butyl acrylate), poly(stearyl acrylate), poly(tert-butyl acrylate), poly(2,2,3,3-tetrafluoropropyl acrylate), copolymers thereof, or any combination or mixture thereof. Suitable acetals include, without limitation, polyoxymethylene resins, or any combination or mixture thereof. Suitable olefin/diene copolymers include, without limitation, acrylonitrile-butadiene-styrene polymers (ABSs), styrene-butadiene polymers, styrene-isoprene polymers, styrene-butadiene-isoprene polymers, or any combination or mixture thereof.

In certain embodiments, the thread protector or protection members include, without limitation, the any ceramic provided that the ceramic has a hardness value less than about 10% of the hardness value of the connection device such as a long metal bolt, less than about 15% of the hardness value of the connection device, less than about 20% of the hardness value of the connection device, less than about 25% of the hardness value of the connection device, less than about 30% of the hardness value of the connection device including any subvalue.

In other embodiments, the thread protector or protection members include, without limitation, any metal having a hardness value less than about 10 of the hardness value of the connection device such as a long metal bolt, less than about 150% of the hardness value of the connection device, less than about 200% of the hardness value of the connection device, less than about 2500 of the hardness value of the connection device, less than about 30% of the hardness value of the connection device including any subvalue. The following table list hardness values for various metals and metal alloys.

| Metal Type | Minimum Value | Maximum Value |
|---|---|---|
| Copper | 80 | 85 |
| Steel Mang.; 713% | 87 | 217 |
| Zirconium-niobium alloy | 89 | 89 |
| Duralumin | 90 | 104 |
| Aluminum | 99 | 101 |
| Iron, Malleable | 112 | 126 |
| Zinc, Alloy | 112 | 126 |
| Copper Mang.; 30% Mn | 134 | 134 |
| Monel | 149 | 170 |
| Bronze Phos.; Soft | 149 | 163 |
| Steel Stainless | 150 | 225 |
| Titanium | 160 | 160 |
| Steel Struct; A36 | 160 | 160 |
| Bronze, Common | 166 | 183 |
| Aluminum Bronze | 170 | 187 |
| Steel .40.50C | 170 | 196 |
| Steel Mild; .20.30C | 170 | 202 |
| Steel Machinery | 170 | 196 |
| Screw Stock, C.R. | 170 | 196 |
| Steel Drop Forged | 170 | 196 |
| Steel Carbon | 175 | 225 |
| Bronze Phos.; 1/2 Hard | 187 | 202 |
| Nickel, Pure | 187 | 202 |
| Brass | 192 | 202 |
| Iron, Cast; Med Soft | 196 | 196 |
| Nickel, Steel; 3 1/2% | 196 | 241 |
| Steel Molybdenum | 196 | 235 |
| Steel Magnet; Soft | 241 | 302 |
| Iron, Cast; Hard | 293 | 302 |
| Steel Magnet; Hard | 321 | 512 |
| Steel Spring | 402 | 402 |

-continued

| Metal Type | Minimum Value | Maximum Value |
| --- | --- | --- |
| Iron, Cast; Chilled | 402 | 402 |
| Steel Stainless | 460 | 520 |

If the apparatus is made out of carbon steel having a hardness between 175 and 225, then the protection member may be mad out of metals or alloys having minimum values less than 168 (10% less), or less than 140 (20%), or less than 122.5 (30%).

In other embodiments, the thread protector or protection members include, without limitation, any type of wood, a wood composite material, a compressed paper material, a paper composite material, or any combination thereof or any composite material including, wood, paper, plastic, and/or a metal having a hardness less than the hardness of the connection device.

DETAILED DESCRIPTION OF THE DRAWINGS OF THE DISCLOSURE

First Embodiments

Referring now to FIGS. 1A-O, first embodiments of a barbed wire repair apparatus, generally 100, are shown.
Type 1

Looking at FIGS. 1A&B, the apparatus 100 includes a first member 102 having a top surface 104 and a bottom surface 106. The first member 102 also includes a proximal portion 108, a bent portion 110, and a distal portion 112. The proximal portion 108 includes a connection slot 114. The distal portion 112 includes a tapered elongated barbed wire receiving aperture 116 having a narrow end 116a near a distal end 112a of the distal portion 112 and a broad end 116b near the bent portion 110. The bent portion 110 makes the angle α between the proximal portion 108 and the distal portion 112. The angle α is generally between 30 degrees and 60 degrees, here the angle α is 45 degrees. The first member 102 also includes a first engaging surface 118.

Figures 1C, 1D:
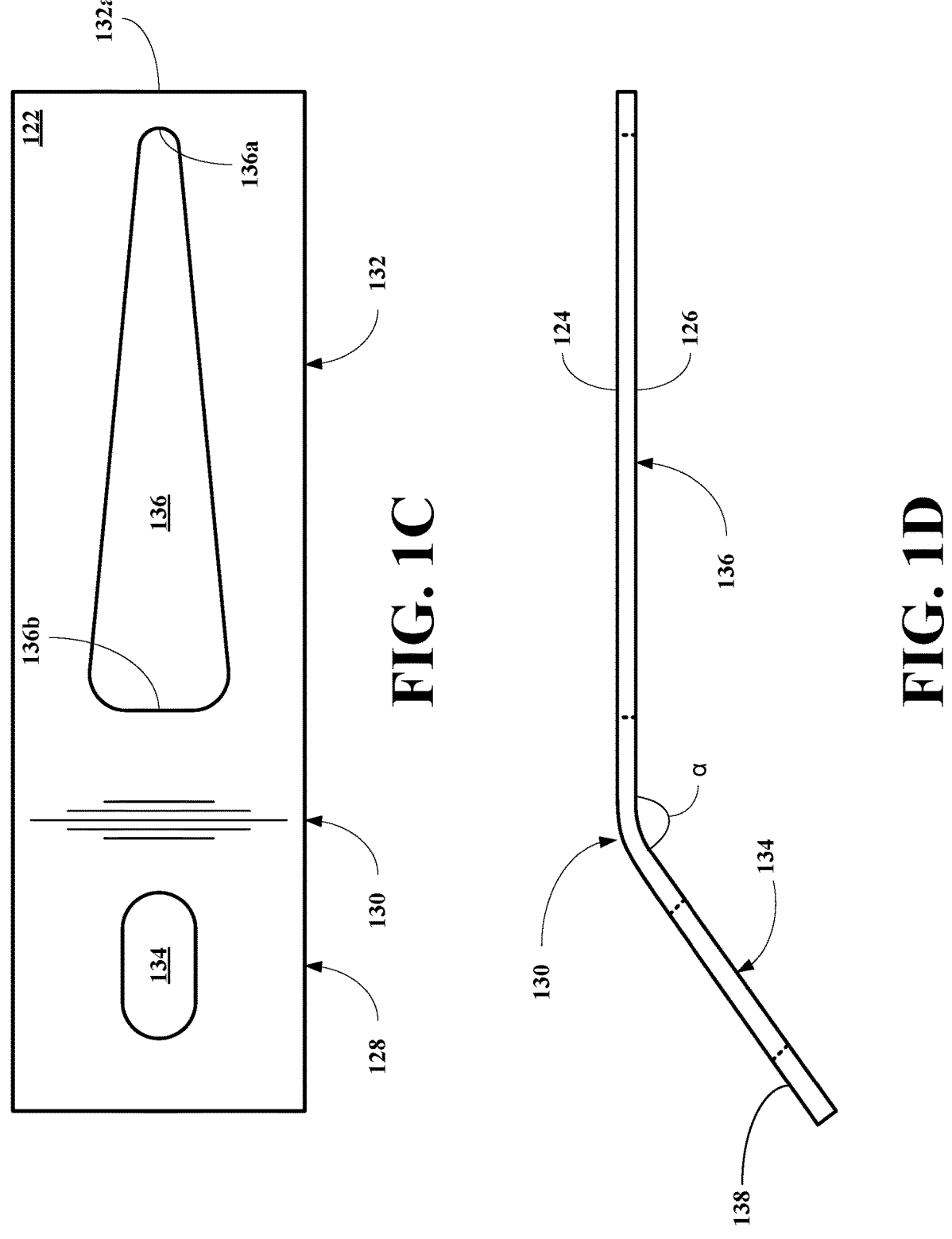

Looking at FIGS. 1C&D, the apparatus 100 also includes a second member 122 having a top surface 124 and a bottom surface 126. The second member 122 also includes a proximal portion 128, a bent portion 130, and a distal portion 132. The proximal portion 128 includes a connection slot 134. The distal portion 132 includes a tapered elongated barbed wire receiving aperture 136 having a narrow end 136a near a distal end 132a of the distal portion 132 and a broad end 136b near the bent portion 130. The bent portion 130 makes the angle α between the proximal portion 128 and the distal portion 132. The second member 122 also includes a second engaging surface 138, wherein the second engaging surface 138 is adapted to engage the first engaging surface 118.

Figure 1E:
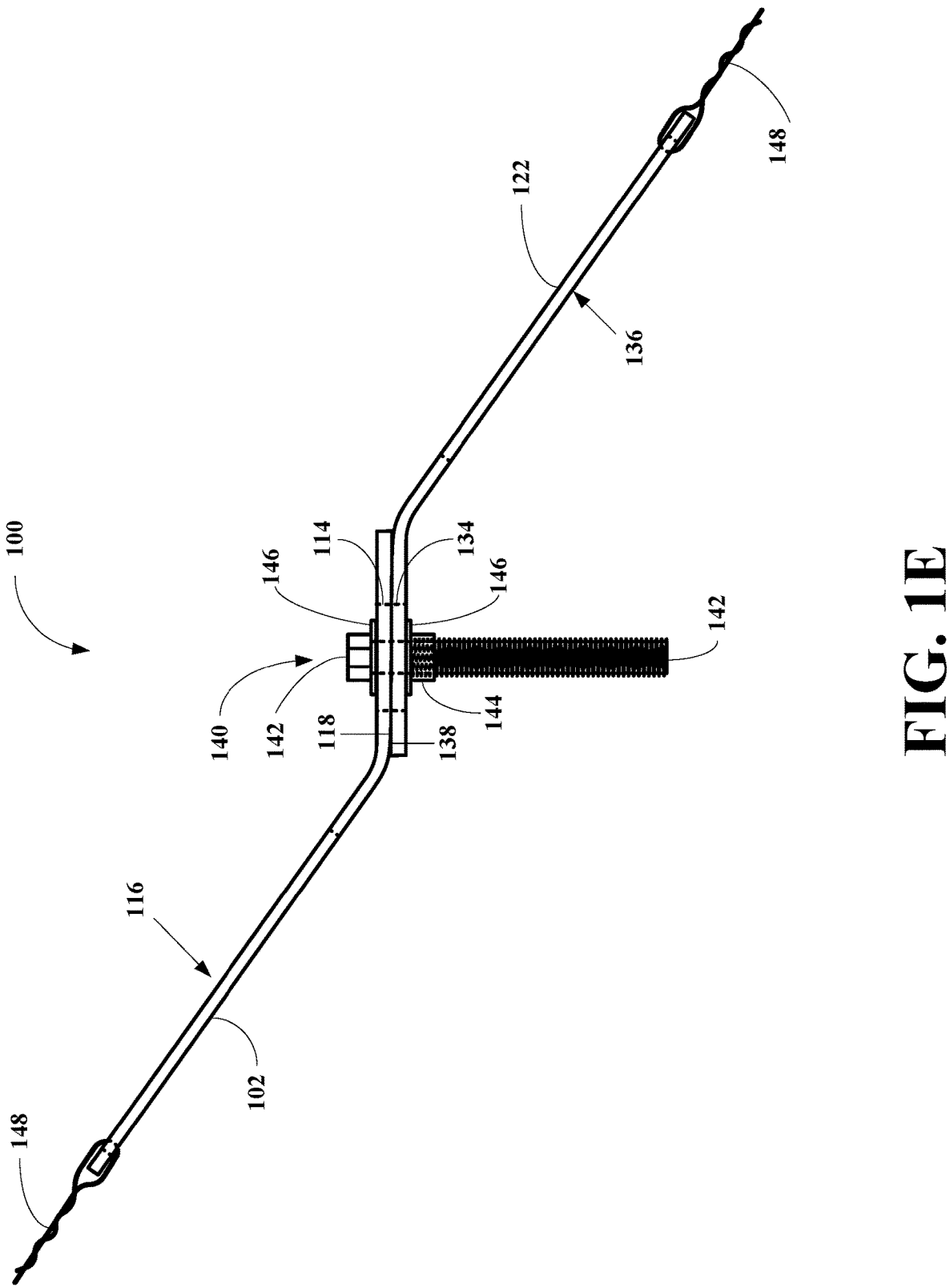

Looking at FIGS. 1E, the apparatus 100 is shown fixing a break in the barbed wire 148. After the ends of the break in the barbed wire are secured to the members 102 and 122 of the apparatus 100 via the tapered elongated barbed wire receiving apertures 116 and 136, respectively, a connection device 140, here a long bolt 142, a nut 144, and two washers 146, is used to (a) secure the two members 102 and 122 together, (b) bring the first engaging surface 118 and the second engaging surface 138 into contact, and (c) repair the break and tensioning the repaired barbed wire 148.
Type 2

Figures 1F, 1G:
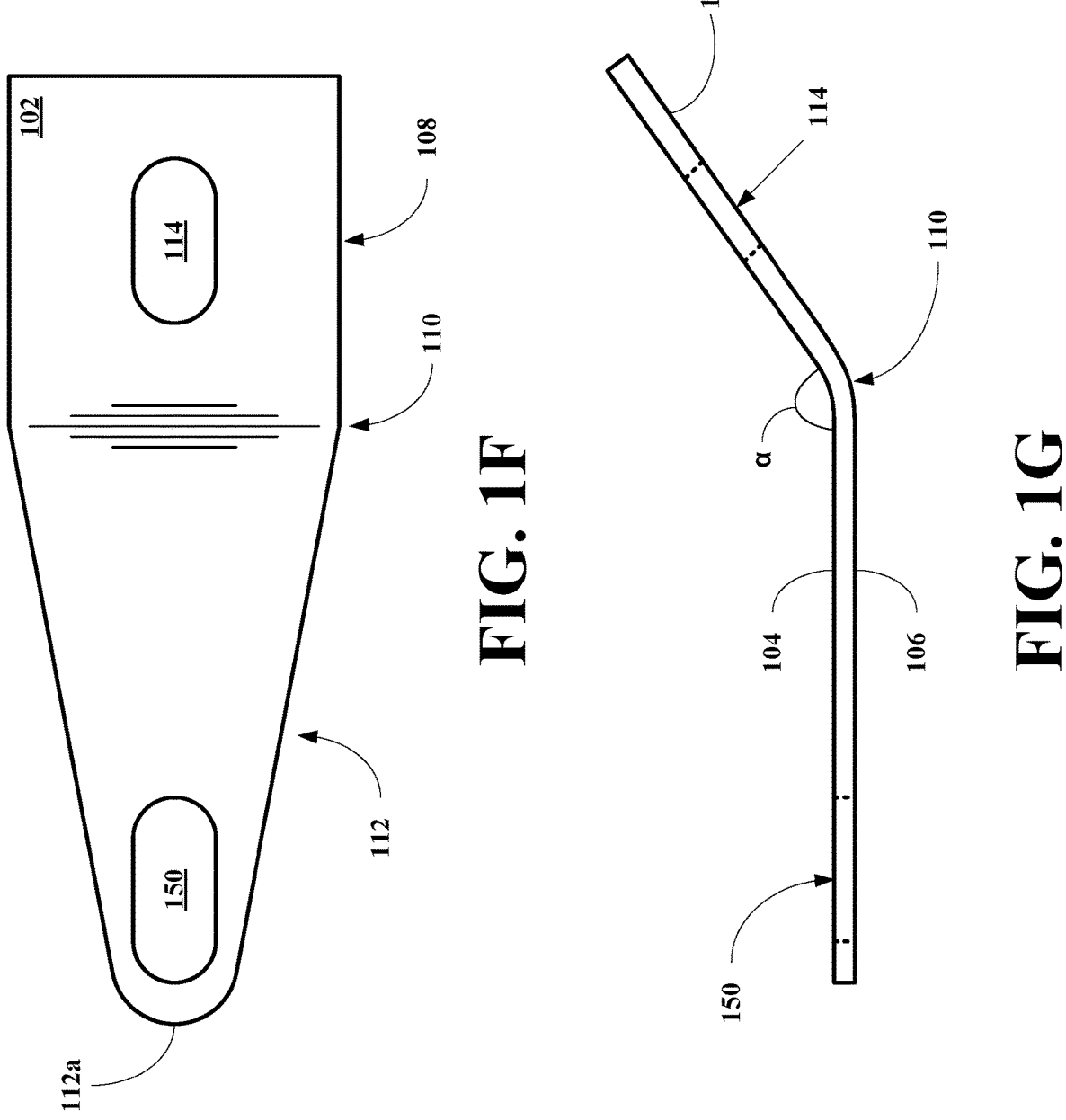

Looking at FIGS. 1F&G, the apparatus 100 includes the first member 102 having the top surface 104 and the bottom surface 106. The first member 102 also includes the proximal portion 108, the bent portion 110, and the distal portion 112. The proximal portion 108 includes the connection slot 114. The distal portion 112 includes a barbed wire receiving slot 150 disposed near the distal end 112a of the distal portion 112. The bent portion 110 makes the angle α between the proximal portion 108 and the distal portion 112. The first member 102 also includes the first engaging surface 118.

Figures 1H, 1I:
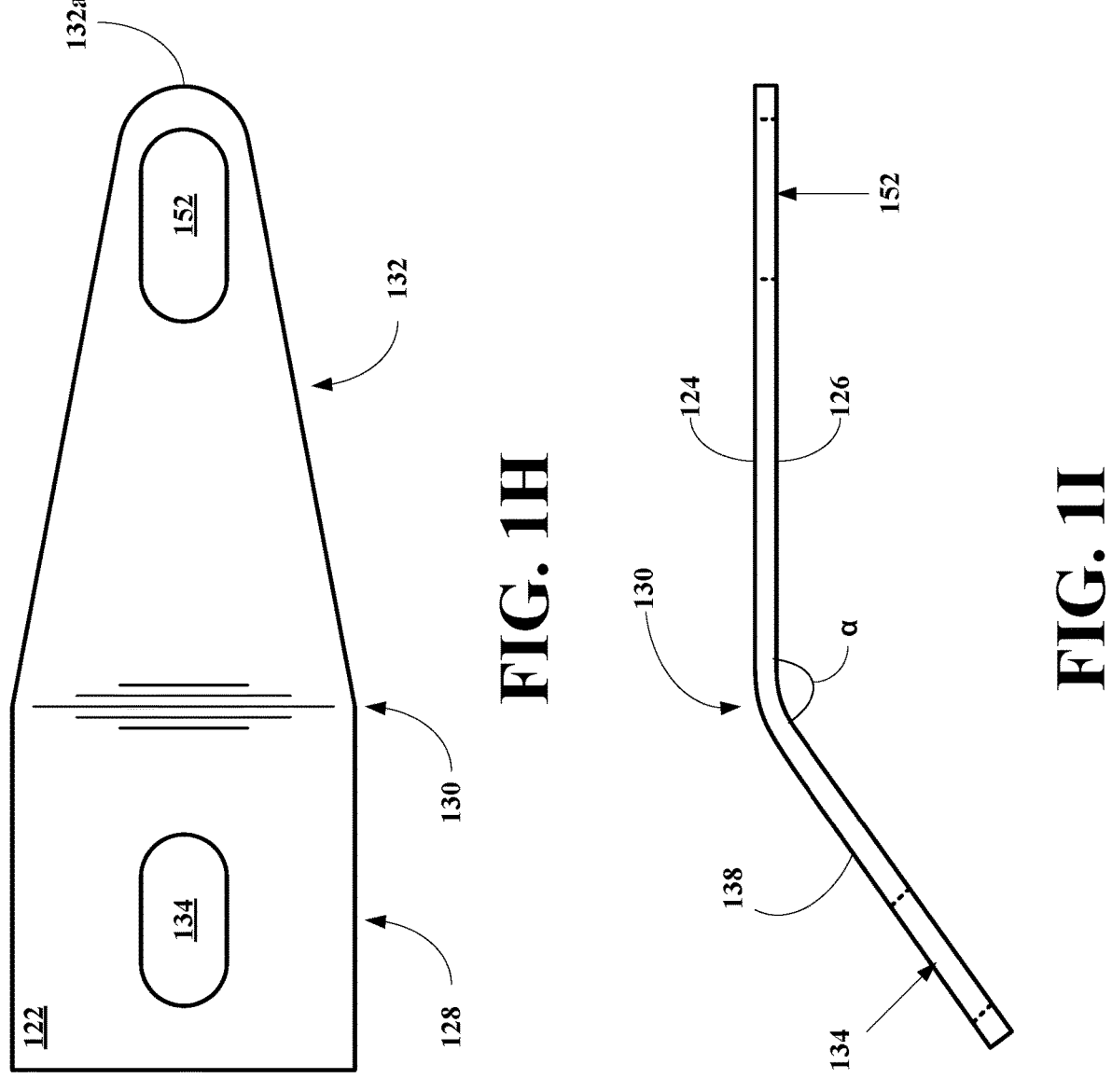

Looking at FIGS. 1H&I, the apparatus 100 also includes the second member 122 having the top surface 124 and the bottom surface 126. The second member 122 also includes the proximal portion 128, the bent portion 130, and the distal portion 132. The proximal portion 128 includes the connection slot 134. The distal portion 132 includes a barbed wire receiving slot 152 disposed near the distal end 132a of the distal portion 132. The bent portion 130 makes the angle α between the proximal portion 128 and the distal portion 132. The second member 122 also includes a second engaging surface 138, wherein the second engaging surface 138 is adapted to engage the first engaging surface 118.

Figure 1J:
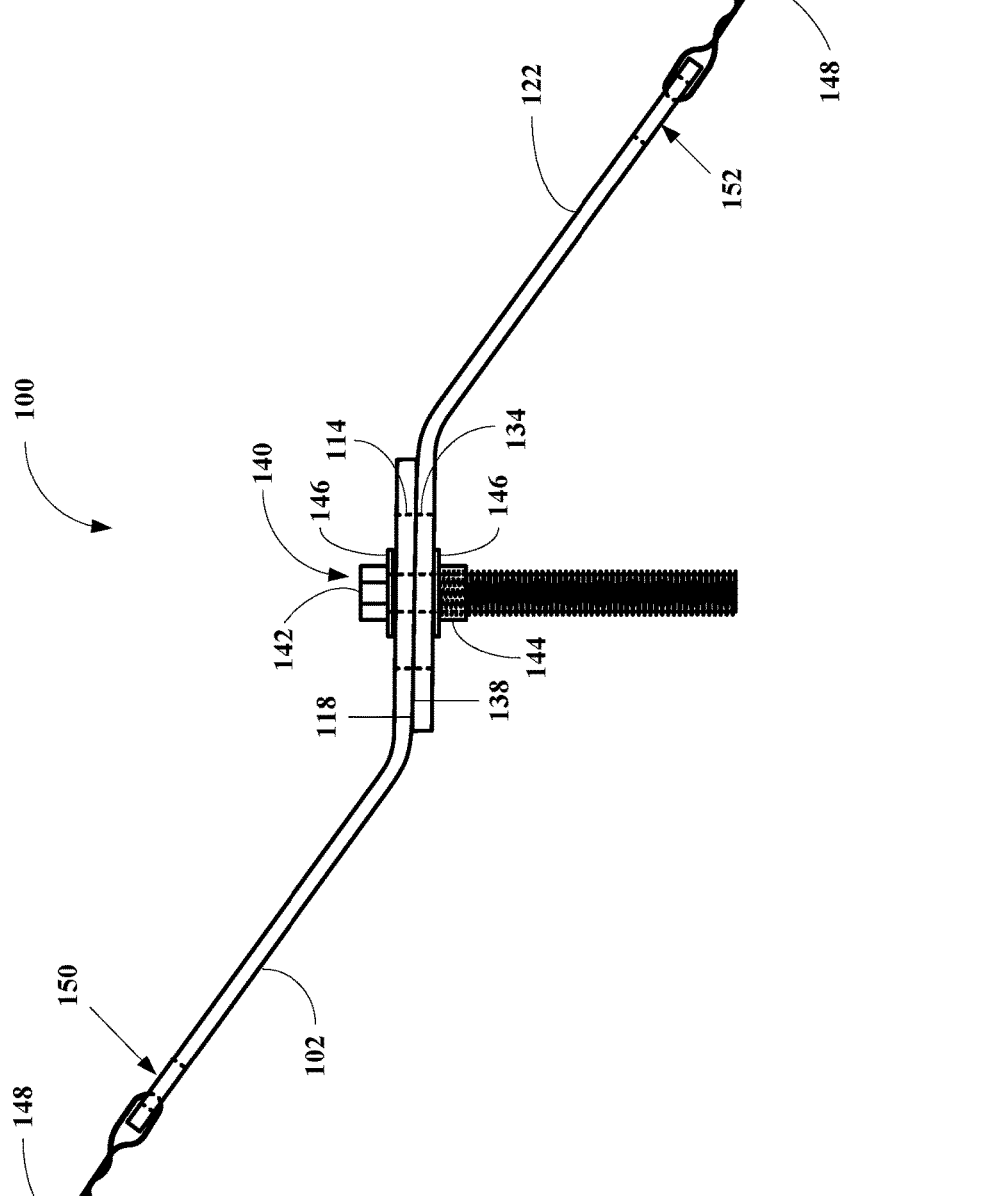

Looking at FIGS. 1J, the apparatus 100 is shown fixing a break in the barbed wire 148. After the ends of the break in the barbed wire are secured to the members 102 and 122 of the apparatus 100 via the barbed wire receiving slots 150 and 152, respectively, the connection device 140, here a bolt 142, a nut 144, and two washers 146, is used to (a) secure the two members 102 and 122 together, (b) bring the first engaging surface 118 and the second engaging surface 138 into contact, and (c) repair the break and tensioning the repaired the barbed wire 148.
Type 3

Figures 1K, 1L:
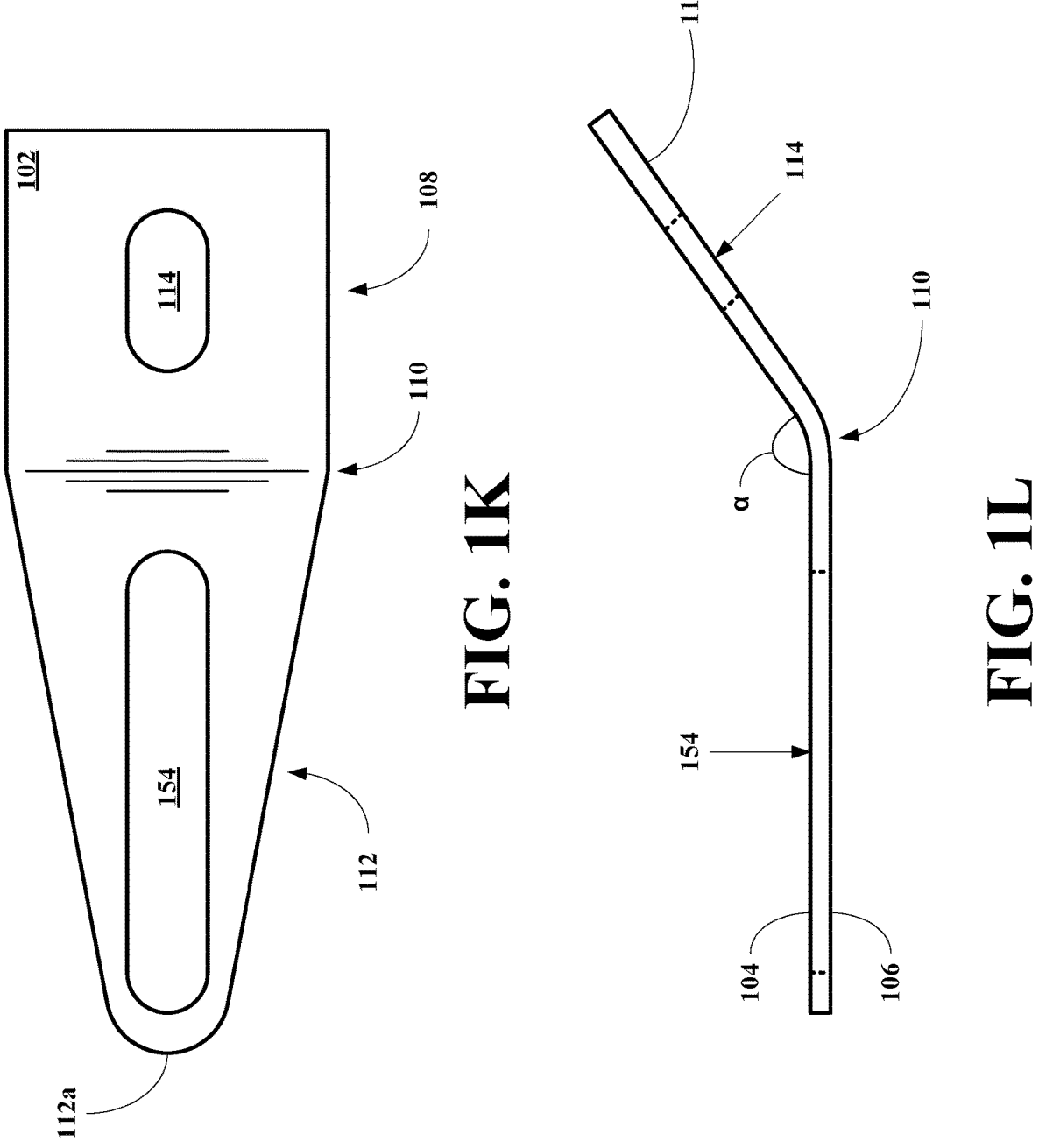

Looking at FIGS. 1K&L, the apparatus 100 includes a first member 102 having a top surface 104 and a bottom surface 106. The first member 102 also includes a proximal portion 108, a bent portion 110, and a distal portion 112. The proximal portion 108 includes the connection slot 114. The distal portion 112 includes an elongated barbed wire receiving slot 154. The bent portion 110 makes the angle α between the proximal portion 108 and the distal portion 112. The first member 102 also includes a first engaging surface 118.

Figures 1M, 1N:
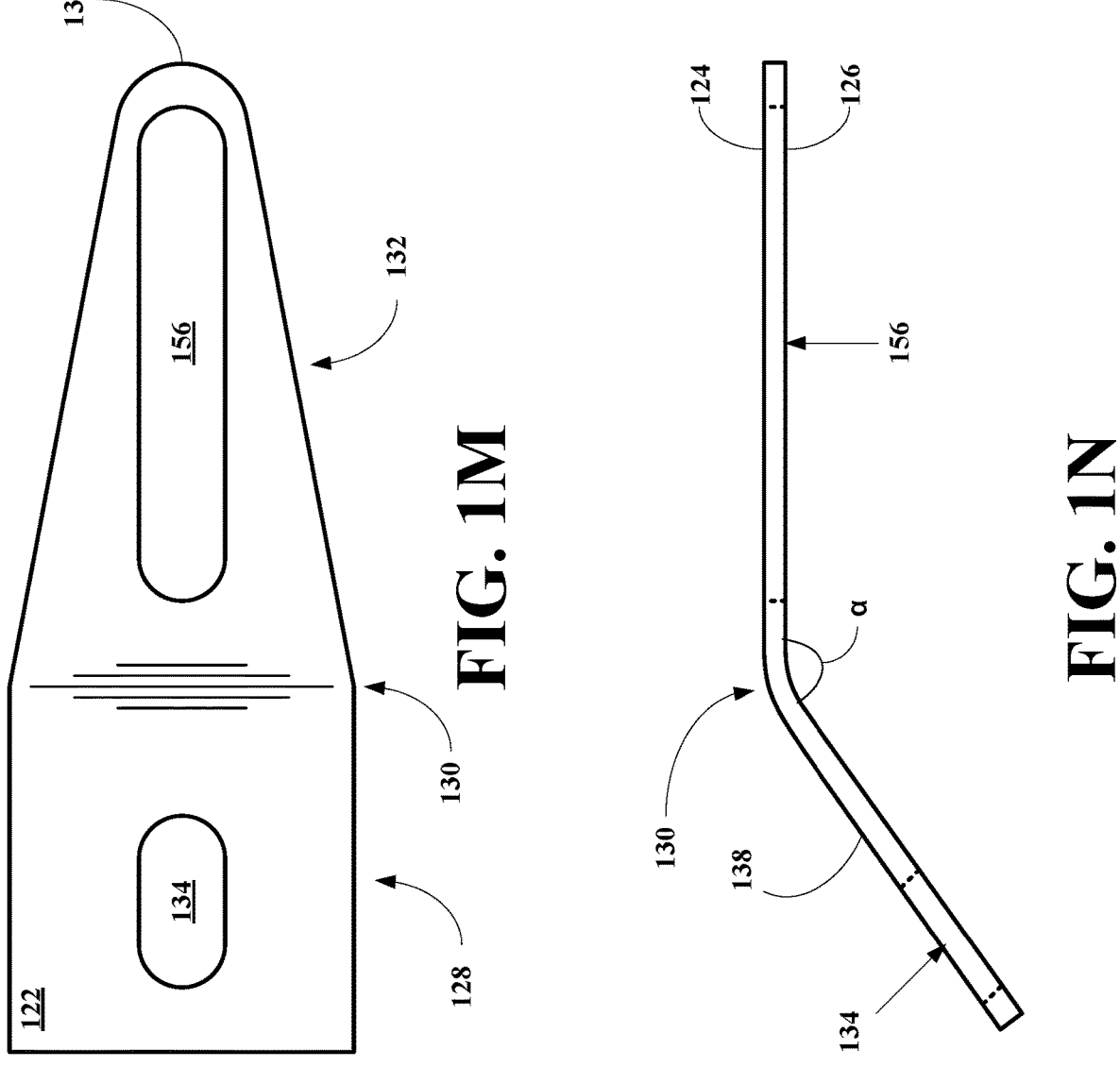
Figure 10:
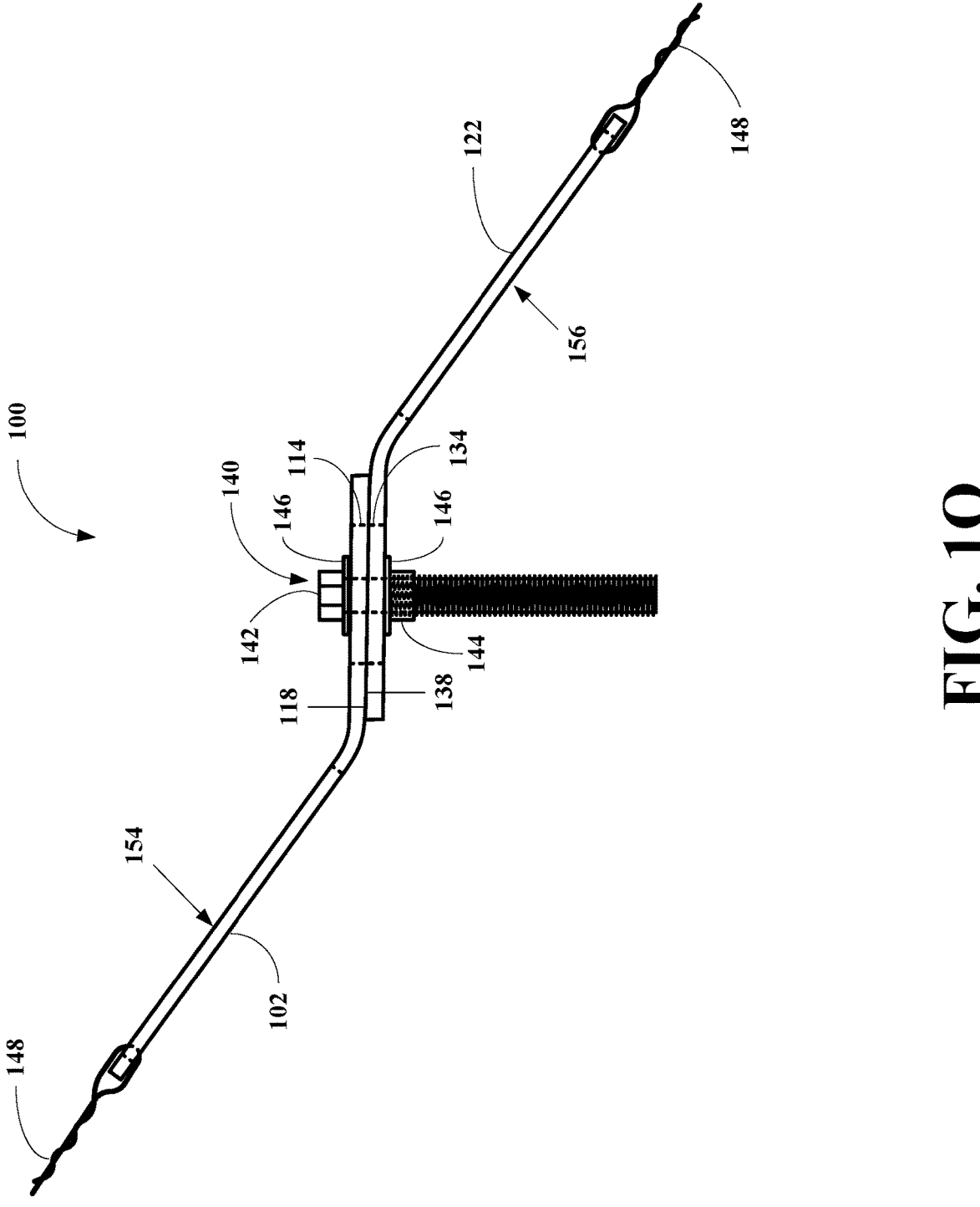

Looking at FIGS. 1M&N, the apparatus 100 also includes a second member 122 having a top surface 124 and a bottom surface 126. The second member 122 also includes a proximal portion 128, a bent portion 130, and a distal portion 132. The proximal portion 128 includes the connection slot 134. The distal portion 132 includes an elongated barbed wire receiving slot 156. The bent portion 130 makes the angle α between the proximal portion 128 and the distal portion 132. The second member 122 also includes a second engaging surface 138, wherein the second engaging surface 138 is adapted to engage the first engaging surface 118.

Looking at FIG. 1O, the apparatus 100 is shown fixing a break in the barbed wire 148. After the ends of the break in the barbed wire are secured to the members 102 and 122 of the apparatus 100 via the elongated barbed wire receiving slots 154 and 156, respectively, the connection device 140, here a bolt 142, a nut 144, and two washers 146, is used to (a) secure the two members 102 and 122 together, (b) bring the first engaging surface 118 and the second engaging surface 138 into contact, and (c) repair the break and tensioning the repaired the barbed wire 148.

Second Embodiments

Referring now to FIG. 2A-O, second embodiments of a barbed wire repair apparatus, generally 200, are shown.

Type 1

Looking at FIGS. 2A&B, the apparatus 200 includes a first member 202 having a top surface 204 and a bottom surface 206. The first member 202 also includes a proximal portion 208, a bent portion 210, and a distal portion 212. The proximal portion 208 includes a connection slot 214. The distal portion 212 includes a tapered elongated barbed wire receiving aperture 216 having a narrow end 216a near a distal end 212a of the distal portion 212 and a broad end 216b near the bent portion 210. The bent portion 210 makes an angle α between the proximal portion 208 and the distal portion 212. The angle α is generally between 30 degrees and 60 degrees, here the angle α has a value of 30 degrees. The first member 202 also includes a first engaging surface 218.

Looking at FIGS. 2C&D, the apparatus 200 also includes a second member 222 having a top surface 224 and a bottom surface 226. The second member 222 also includes a proximal portion 228, a bent portion 230, and a distal portion 232. The proximal portion 228 includes a connection slot 234. The distal portion 232 includes a tapered elongated barbed wire receiving aperture 236 having a narrow end 236a near a distal end 232a of the distal portion 232 and a broad end 236b near the bent portion 230. The bent portion 230 makes the angle α between the proximal portion 228 and the distal portion 232. The second member 222 also includes a second engaging surface 238, wherein the second engaging surface 238 is adapted to engage the first engaging surface 218.

Figure 2E:
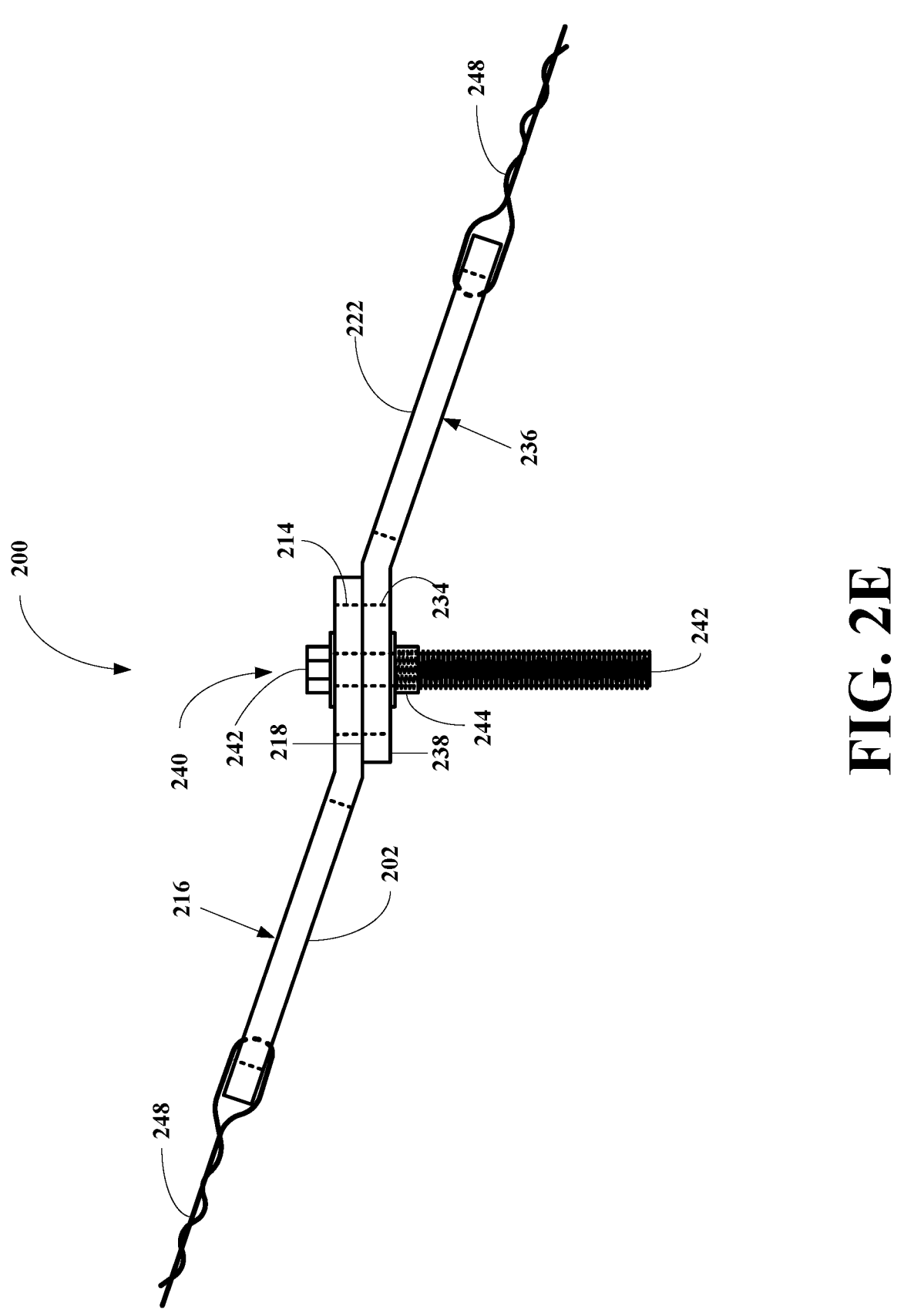

Looking at FIGS. 2E, the apparatus 200 is shown fixing a break in the barbed wire 248. After the ends of the break in the barbed wire are secured to the members 202 and 222 of the apparatus 200 via the tapered elongated barbed wire receiving apertures 216 and 236, respectively, a connection device 240, here a flanged bolt 242 and a flanged nut 244, is used to (a) secure the two members 202 and 222 together, (b) bring the first engaging surface 218 and the second engaging surface 238 into contact, and (c) repair the break and tensioning the repaired the barbed wire 248.

Type 2

Looking at FIGS. 2F&G, the apparatus 200 includes a first member 202 having a top surface 204 and a bottom surface 206. The first member 202 also includes the proximal portion 208, the bent portion 210, and the distal portion 212. The proximal portion 208 includes the connection slot 214. The distal portion 212 includes a barbed wire receiving slot 250 disposed near the distal end 212a of the distal portion 212. The bent portion 210 makes the angle α between the proximal portion 208 and the distal portion 212. The first member 202 also includes the first engaging surface 218.

Looking at FIGS. 2H&I, the apparatus 200 also includes the second member 222 having the top surface 224 and the bottom surface 226. The second member 222 also includes the proximal portion 228, the bent portion 230, and the distal portion 232. The proximal portion 228 includes the connection slot 234. The distal portion 232 includes a barbed wire receiving slot 252 disposed near the distal end 232a of the distal portion 232. The bent portion 230 makes the angle α between the proximal portion 228 and the distal portion 232. The second member 222 also includes a second engaging surface 238, wherein the second engaging surface 238 is adapted to engage the first engaging surface 218.

Figure 2J:
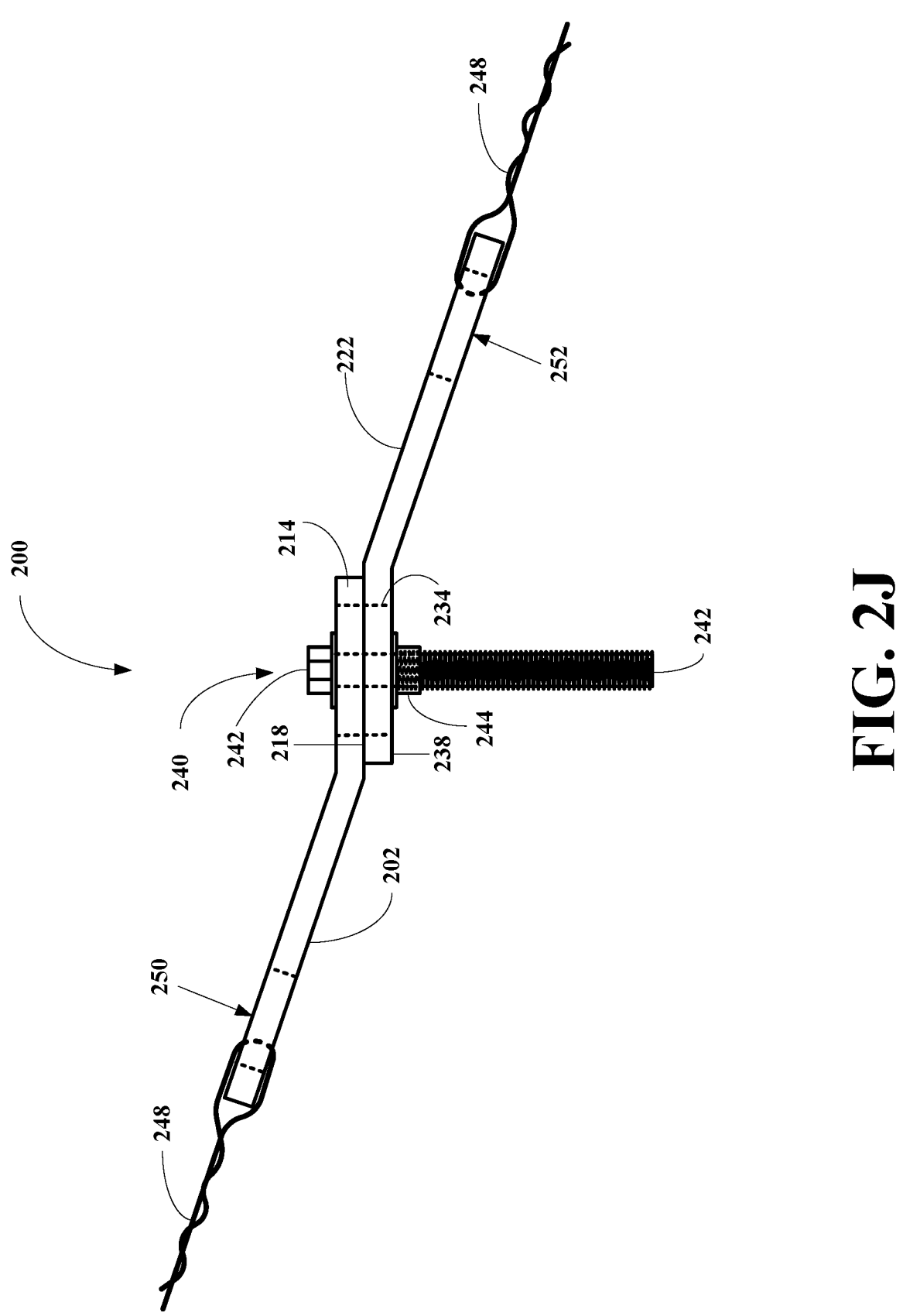

Looking at FIGS. 2J, the apparatus 200 is shown fixing a break in the barbed wire 248. After the ends of the break in the barbed wire are secured to the members 202 and 222 of the apparatus 200 via the barbed wire receiving slots 250 and 252, respectively, a connection device 240, here a flanged bolt 242 and a flanged nut 244, is used to (a) secure the two members 202 and 222 together, (b) bring the first engaging surface 218 and the second engaging surface 238 into contact, and (c) repair the break and tensioning the repaired the barbed wire 248.

Type 3

Figure 2M:
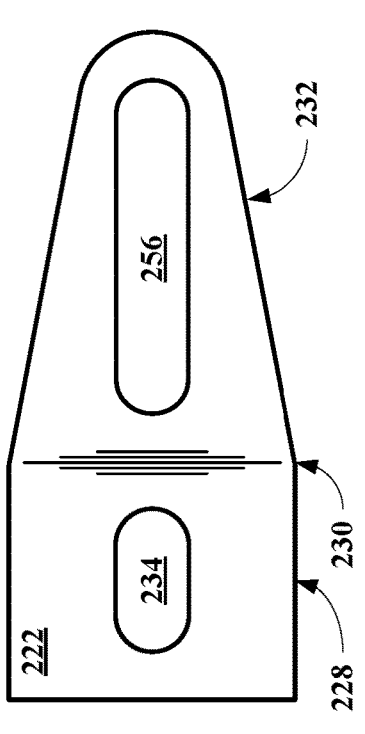
Figure 2N:
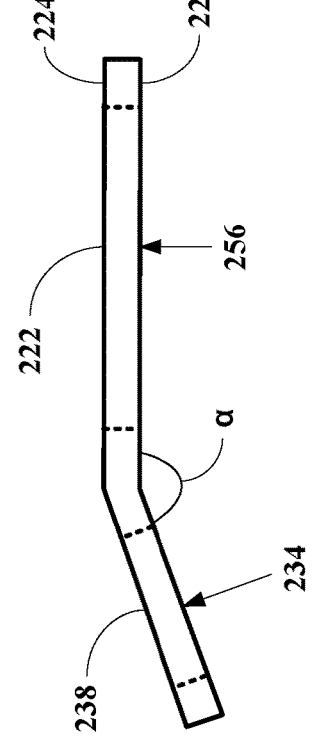
Figure 2K:
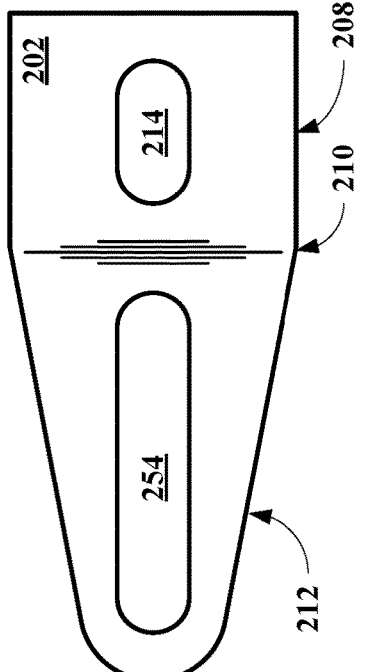
Figure 2L:
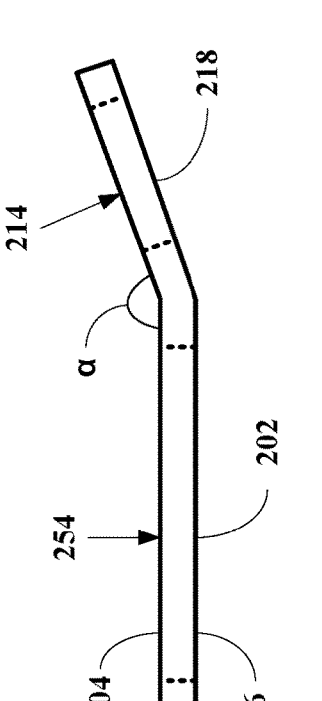
Figure 20:
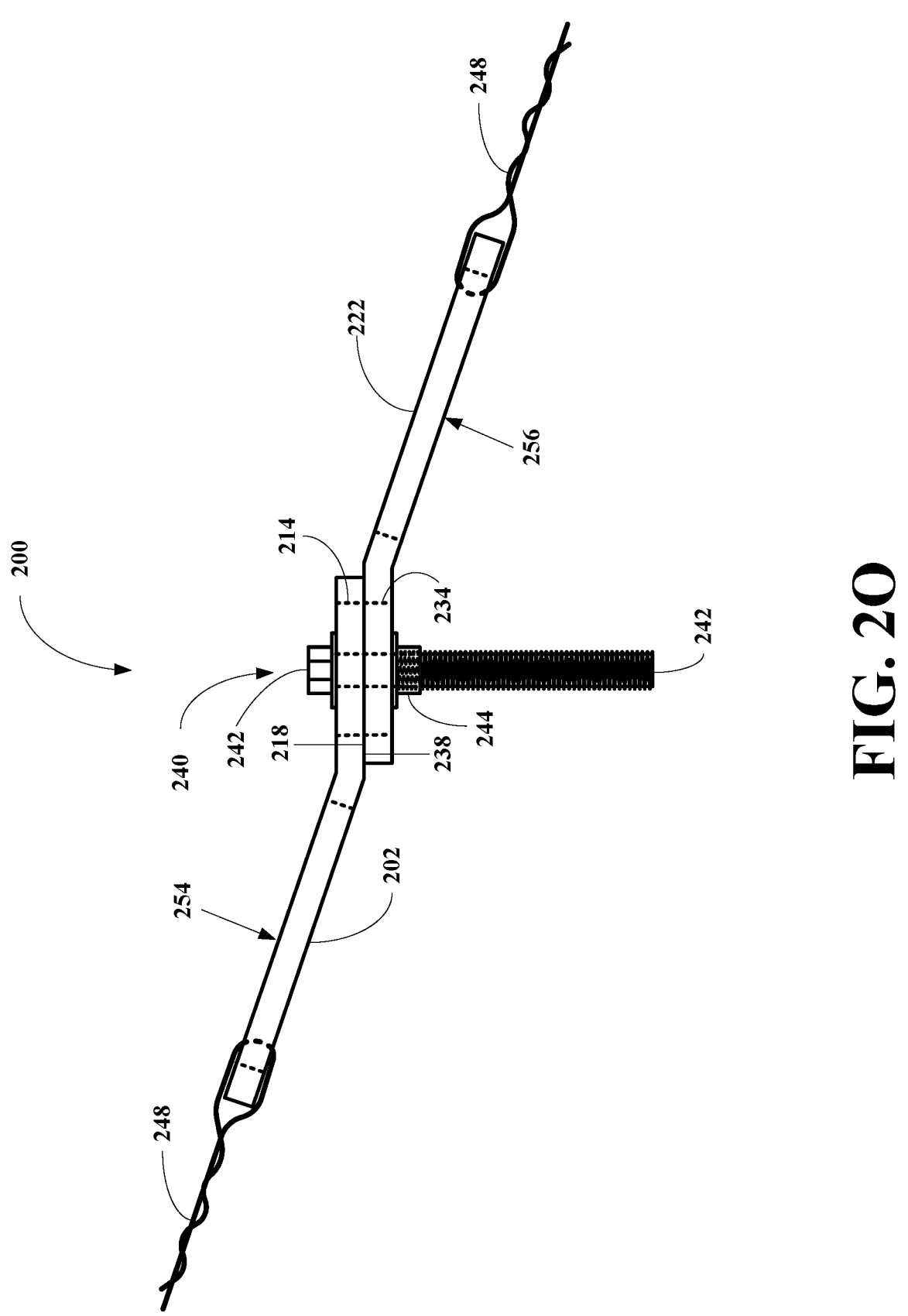

Looking at FIGS. 2K&L, the apparatus 200 includes the first member 202 having the top surface 204 and the bottom surface 206. The first member 202 also includes the proximal portion 208, the bent portion 210, and the distal portion 212. The proximal portion 208 includes the connection slot 214. The distal portion 212 includes an elongated barbed wire receiving slot 254. The bent portion 210 makes the angle α between the proximal portion 208 and the distal portion 212. The first member 202 also includes a first engaging surface 218.

Looking at FIGS. 2M&N, the apparatus 200 also includes the second member 222 having the top surface 224 and the bottom surface 226. The second member 222 also includes the proximal portion 228, the bent portion 230, and the distal portion 232. The proximal portion 228 includes the connection slot 234. The distal portion 232 includes an elongated barbed wire receiving slot 256. The bent portion 230 makes the angle α between the proximal portion 228 and the distal portion 232. The second member 222 also includes a second engaging surface 238, wherein the second engaging surface 238 is adapted to engage the first engaging surface 218.

Looking at FIGS. 2O, the apparatus 200 is shown fixing a break in the barbed wire 248. After the ends of the break in the barbed wire are secured to the members 202 and 222 of the apparatus 200 via the elongated barbed wire receiving slots 254 and 256, respectively, a connection device 240, here a flanged bolt 242 and a flanged nut 244, is used to (a) secure the two members 202 and 222 together, (b) bring the first engaging surface 218 and the second engaging surface 238 into contact, and (c) repair the break and tensioning the repaired the barbed wire 248.

Third Embodiments

Figures 3A, 3B, 3C, 3D:
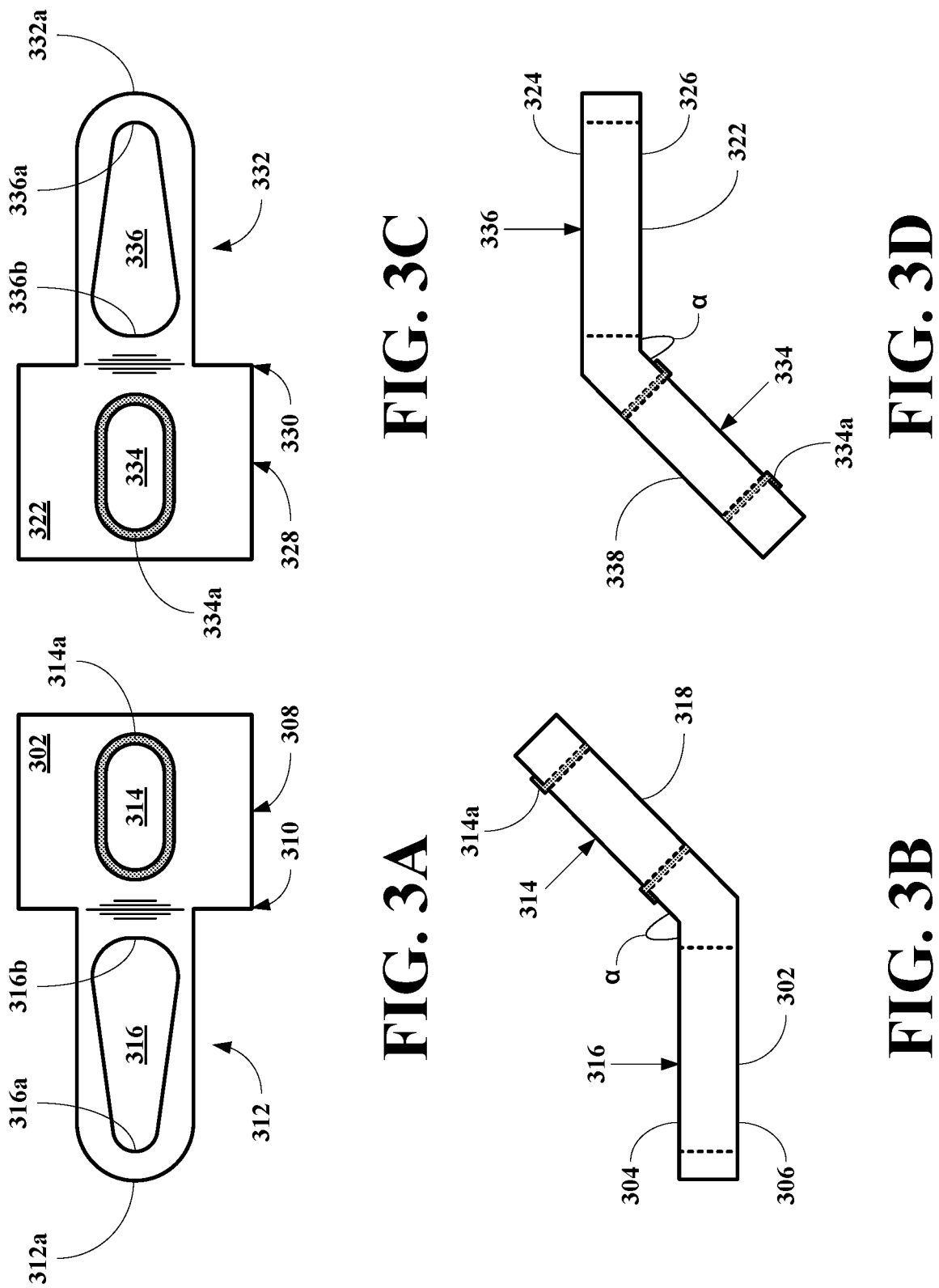

Referring now to FIG. 3A-O, second embodiments of a barbed wire repair apparatus, generally 300, are shown.

Type 1

Looking at FIGS. 3A&B, the apparatus 300 includes a first member 302 having a top surface 304 and a bottom surface 306. The first member 302 also includes a proximal portion 308, a bent portion 310, and a distal portion 312. The proximal portion 308 includes a connection slot 314 including a plastic thread protection member 314a. The distal portion 312 includes a tapered elongated barbed wire receiving aperture 316 having a narrow end 316a near a distal end 312a of the distal portion 312 and a broad end 316b near the bent portion 310. The bent portion 310 makes an angle α between the proximal portion 308 and the distal portion 312. The angle α is generally between 30 degrees and 60 degrees, here the angle α has a value of 45 degrees. The first member 302 also includes a first engaging surface 318.

Looking at FIGS. 3C&D, the apparatus 300 also includes a second member 322 having a top surface 324 and a bottom surface 326. The second member 322 also includes a proximal portion 328, a bent portion 330, and a distal portion 332. The proximal portion 328 includes a connection slot 334 including a plastic thread protection member 334a. The distal portion 332 includes a tapered elongated barbed wire receiving aperture 336 having a narrow end 336a near a distal end 332a of the distal portion 332 and a broad end 336b near the bent portion 330. The bent portion 330 makes the angle α between the proximal portion 328 and the distal portion 332. The second member 322 also includes a second engaging surface 338, wherein the second engaging surface 338 is adapted to engage the first engaging surface 318.

Figure 3E:
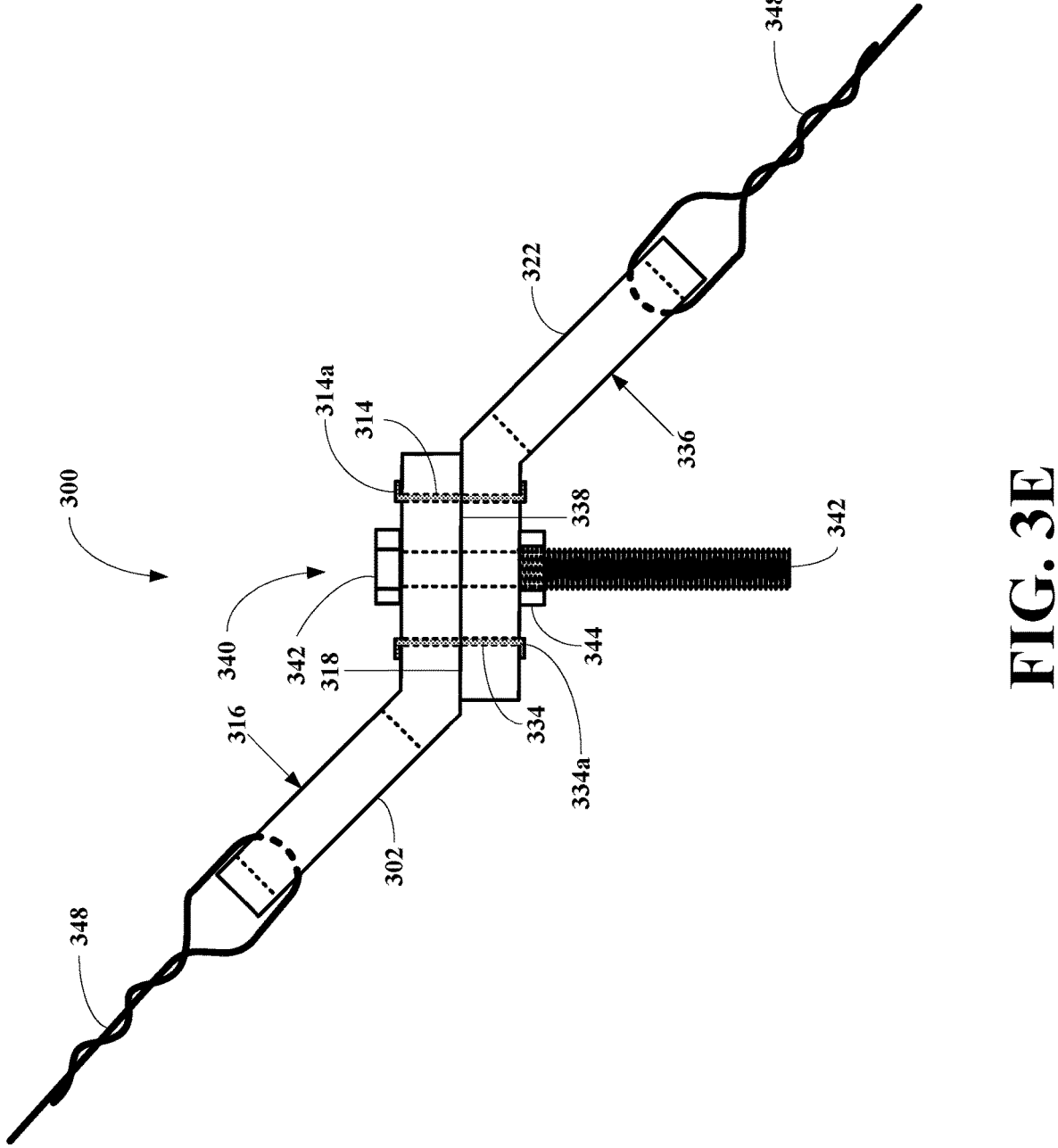

Looking at FIGS. 3E, the apparatus 300 is shown fixing a break in the barbed wire 348. After the ends of the break in the barbed wire are secured to the members 302 and 322 of the apparatus 300 via the tapered elongated barbed wire receiving slots 316 and 336, respectively, a connection device 340, here a long bolt 342 and a nut 344, is used to (a) secure the two members 302 and 322 together, (b) bring the first engaging surface 318 and the second engaging surface 338 into contact, and (c) repair the break and tensioning the repaired the barbed wire 348.

Type 2

Figures 3F, 3G, 3H, 3I:
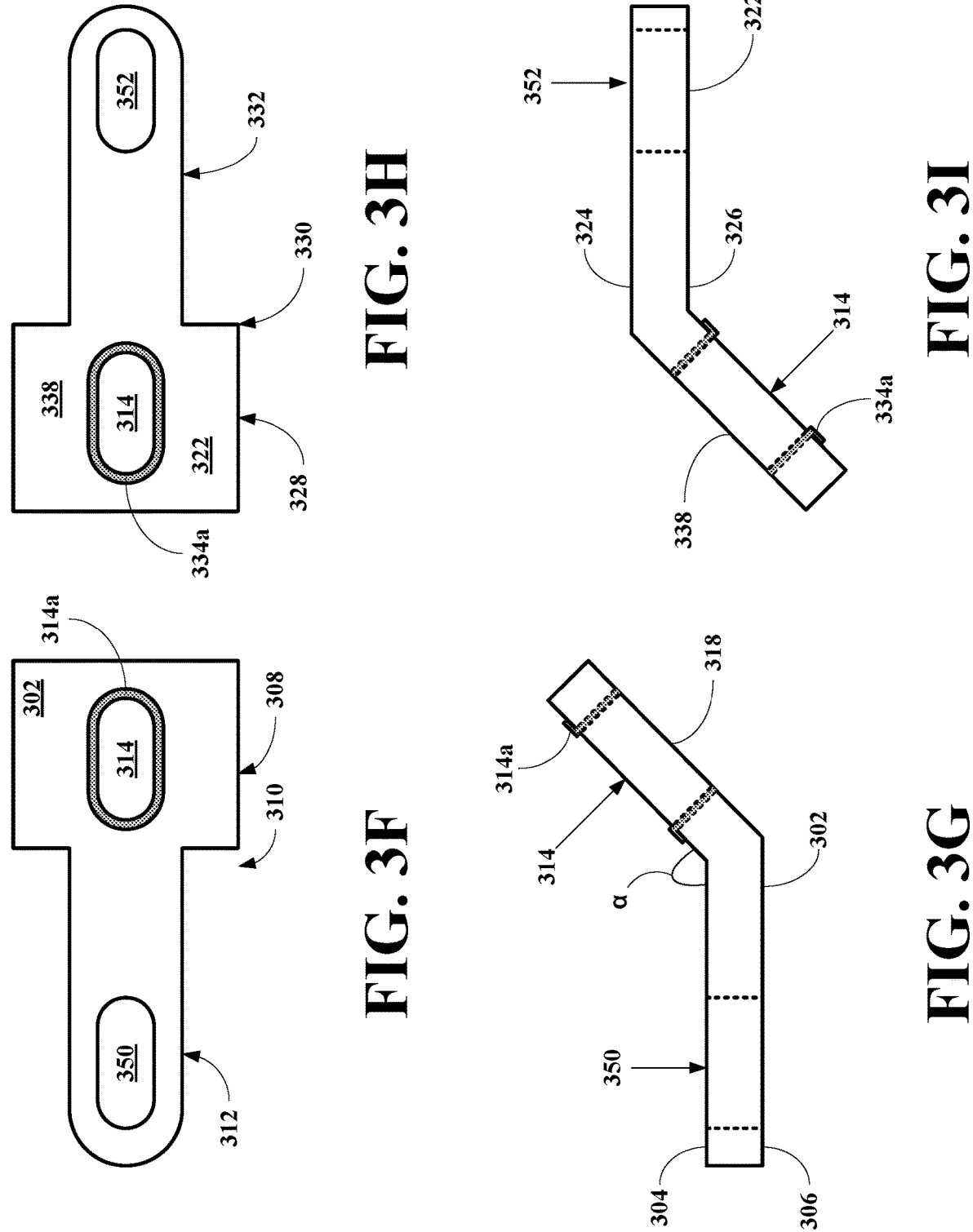

Looking at FIGS. 3F&G, the apparatus 300 includes the first member 302 having the top surface 304 and the bottom surface 306. The first member 302 also includes the proximal portion 308, the bent portion 310, and the distal portion 312. The proximal portion 308 includes the connection slot 314 including the plastic thread protection member 314a. The distal portion 312 includes a barbed wire receiving slot 350 disposed near a distal end 312a of the distal portion 312. The bent portion 310 makes the angle α between the proximal portion 308 and the distal portion 312. The first member 302 also includes a first engaging surface 318.

Looking at FIGS. 3H&I, the apparatus 300 also includes the second member 322 having a top surface 324 and a bottom surface 326. The second member 322 also includes the proximal portion 328, the bent portion 330, and the distal portion 332. The proximal portion 328 includes the connection slot 334 including the plastic thread protection member 334a. The distal portion 332 includes a barbed wire receiving slot 352 disposed near a distal end 332a of the distal portion 332. The bent portion 330 makes the angle α between the proximal portion 328 and the distal portion 332. The second member 322 also includes a second engaging surface 338, wherein the second engaging surface 338 is adapted to engage the first engaging surface 318.

Figure 3J:
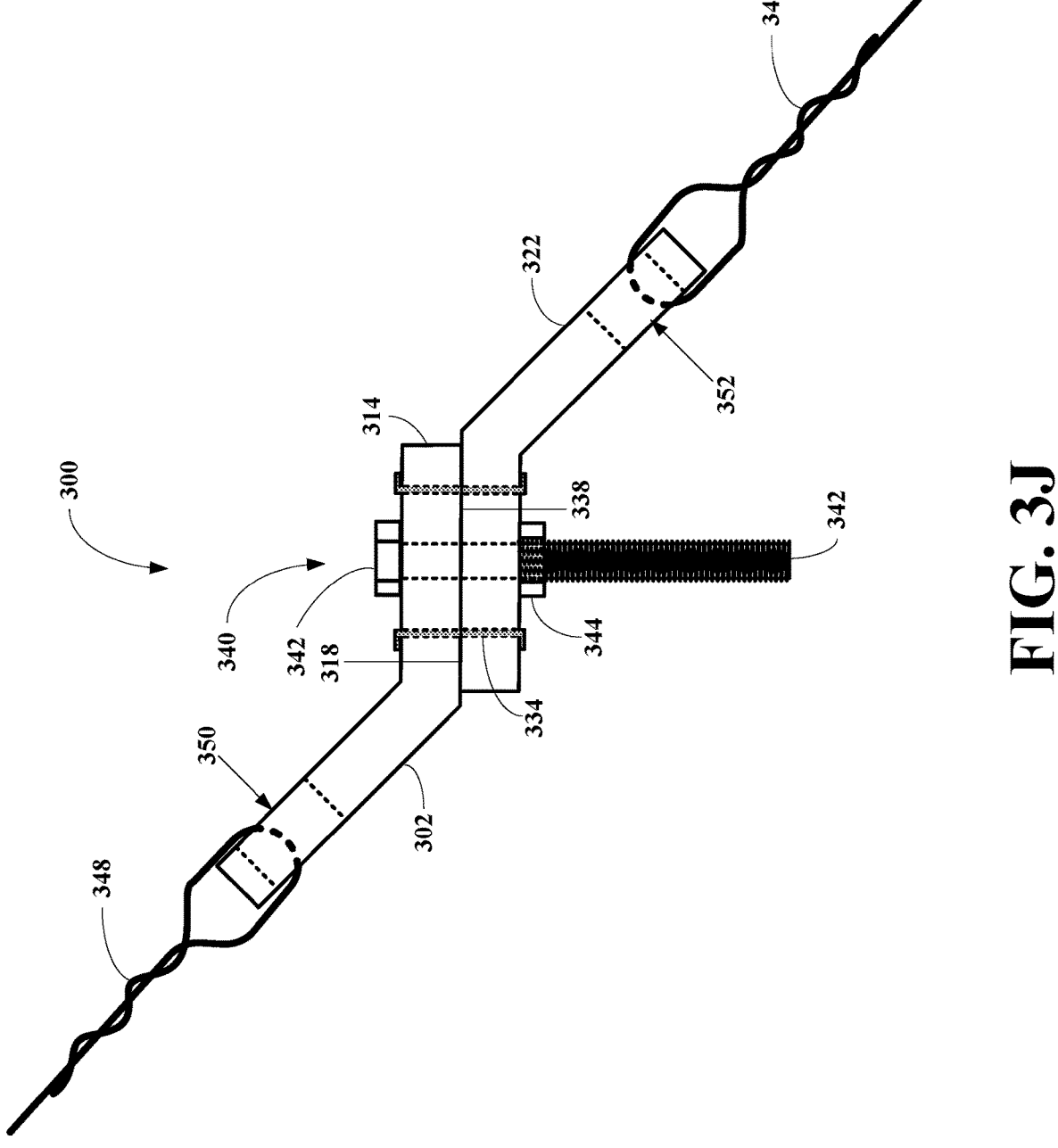

Looking at FIGS. 3J, the apparatus 300 is shown fixing a break in the barbed wire 348. After the ends of the break in the barbed wire are secured to the members 302 and 322 of the apparatus 300 via the barbed wire receiving slots 350 and 352, respectively, a connection device 340, here a long bolt 342 and a nut 344, is used to (a) secure the two members 302 and 322 together, (b) bring the first engaging surface 318 and the second engaging surface 338 into contact, and (c) repair the break and tensioning the repaired the barbed wire 348.

Type 3

Figures 3K, 3L, 3M, 3N:
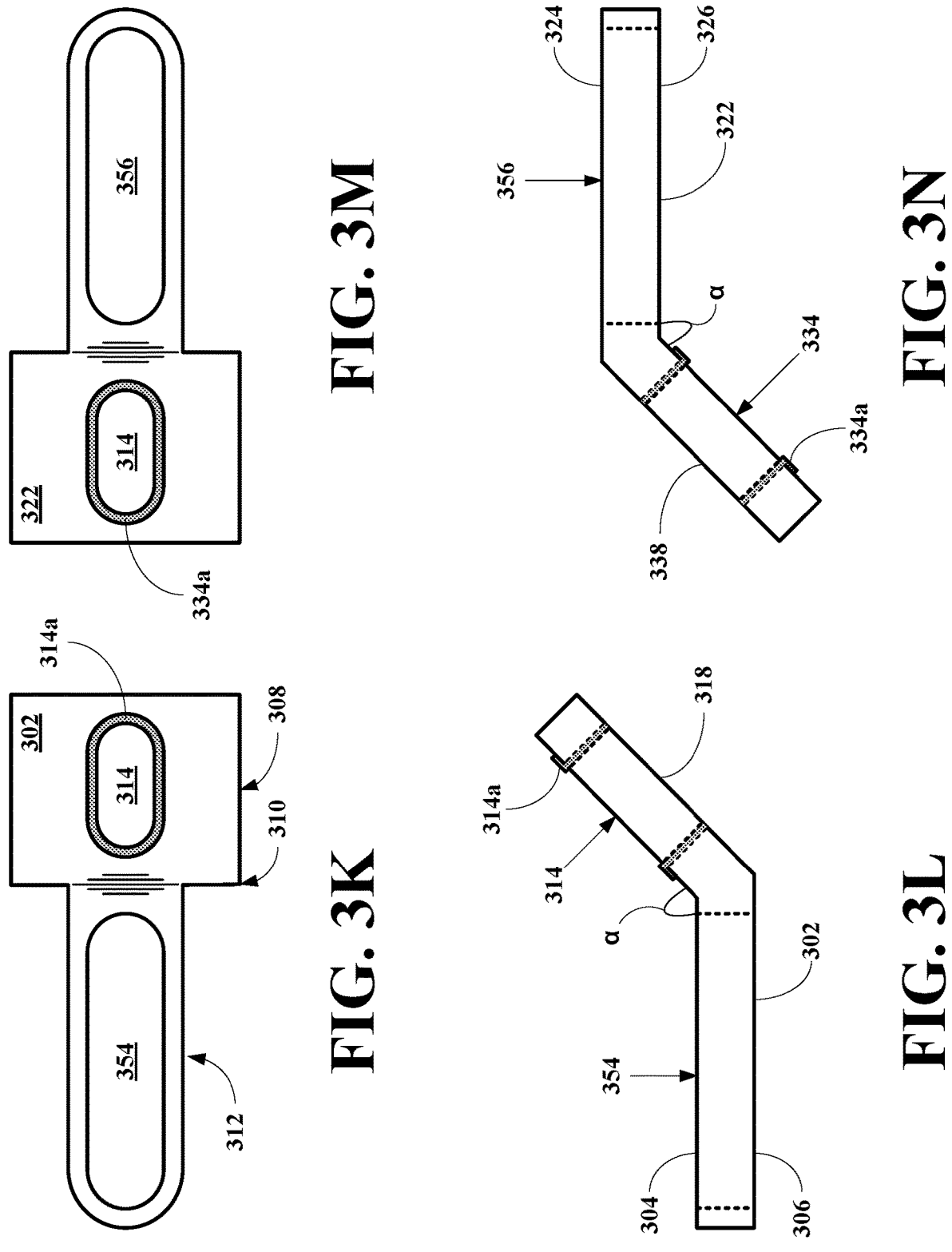
Figure 30:
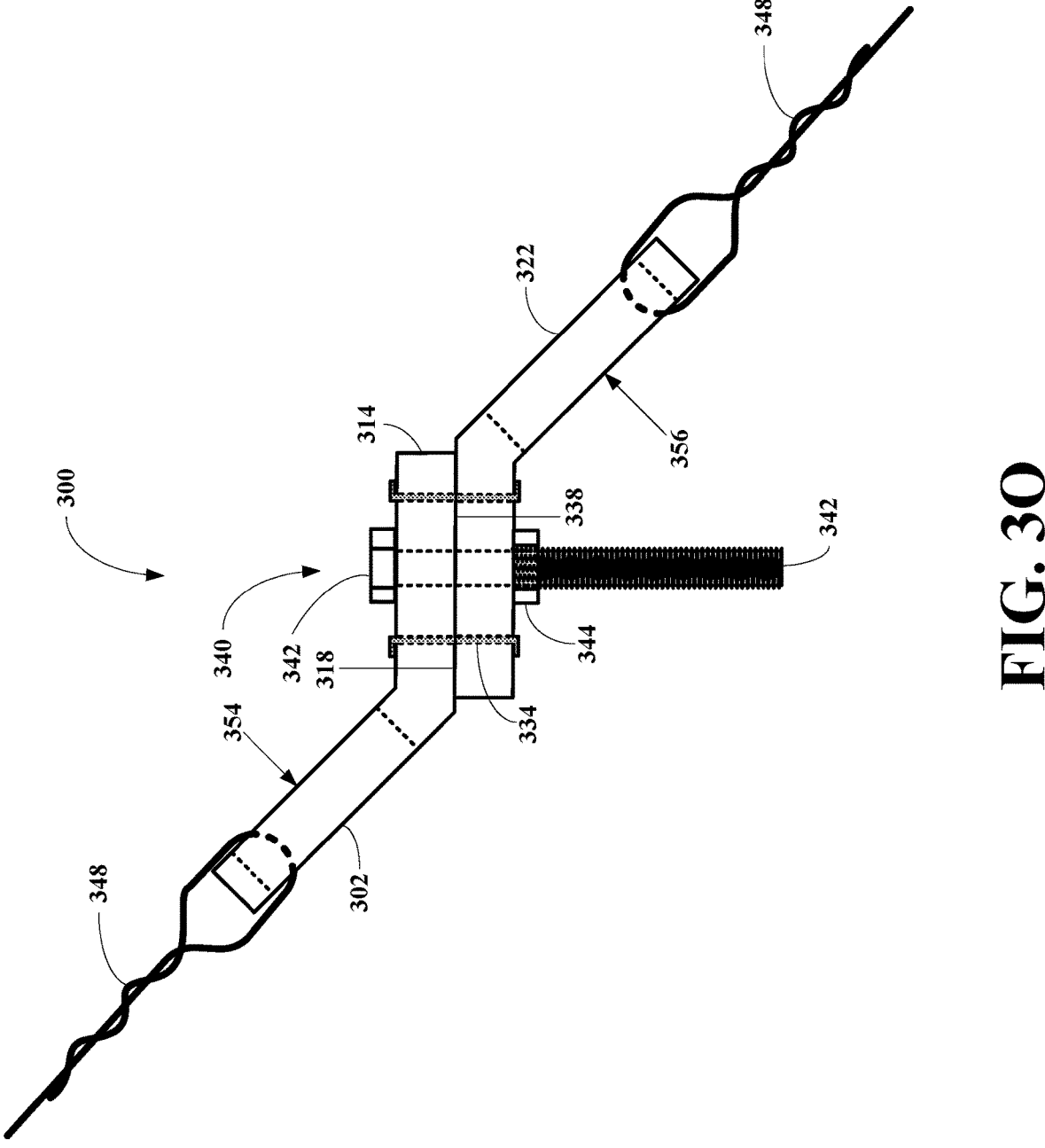

Looking at FIGS. 3K&L, the apparatus 300 includes the first member 302 having the top surface 304 and the bottom surface 306. The first member 302 also includes the proximal portion 308, the bent portion 310, and the distal portion 312. The proximal portion 308 includes the connection slot 314 including the plastic thread protection member 314a. The distal portion 312 includes an elongated barbed wire receiving slot 354. The bent portion 310 makes the angle α between the proximal portion 308 and the distal portion 312. The first member 302 also includes the first engaging surface 318.

Looking at FIGS. 3M&N, the apparatus 300 also includes the second member 322 having the top surface 324 and the bottom surface 326. The second member 322 also includes the proximal portion 328, the bent portion 330, and the distal portion 332. The proximal portion 328 includes the connection slot 334 barbed including the plastic thread protection member 334a. The distal portion 332 includes an elongated barbed wire receiving slot 356. The bent portion 330 makes the angle α between the proximal portion 328 and the distal portion 332. The second member 322 also includes a second engaging surface 338, wherein the second engaging surface 338 is adapted to engage the first engaging surface 318.

Looking at FIGS. 3O, the apparatus 300 is shown fixing a break in the barbed wire 348. After the ends of the break in the barbed wire are secured to the members 302 and 322 of the apparatus 300 via the elongated barbed wire receiving slots 354 and 356, respectively, a connection device 340, here a long bolt 342 and a nut 344, is used to (a) secure the two members 302 and 322 together, (b) bring the first engaging surface 318 and the second engaging surface 338 into contact, and (c) repair the break and tensioning the repaired the barbed wire 348.

Fourth Embodiments

Figures 4A, 4B, 4C, 4D:
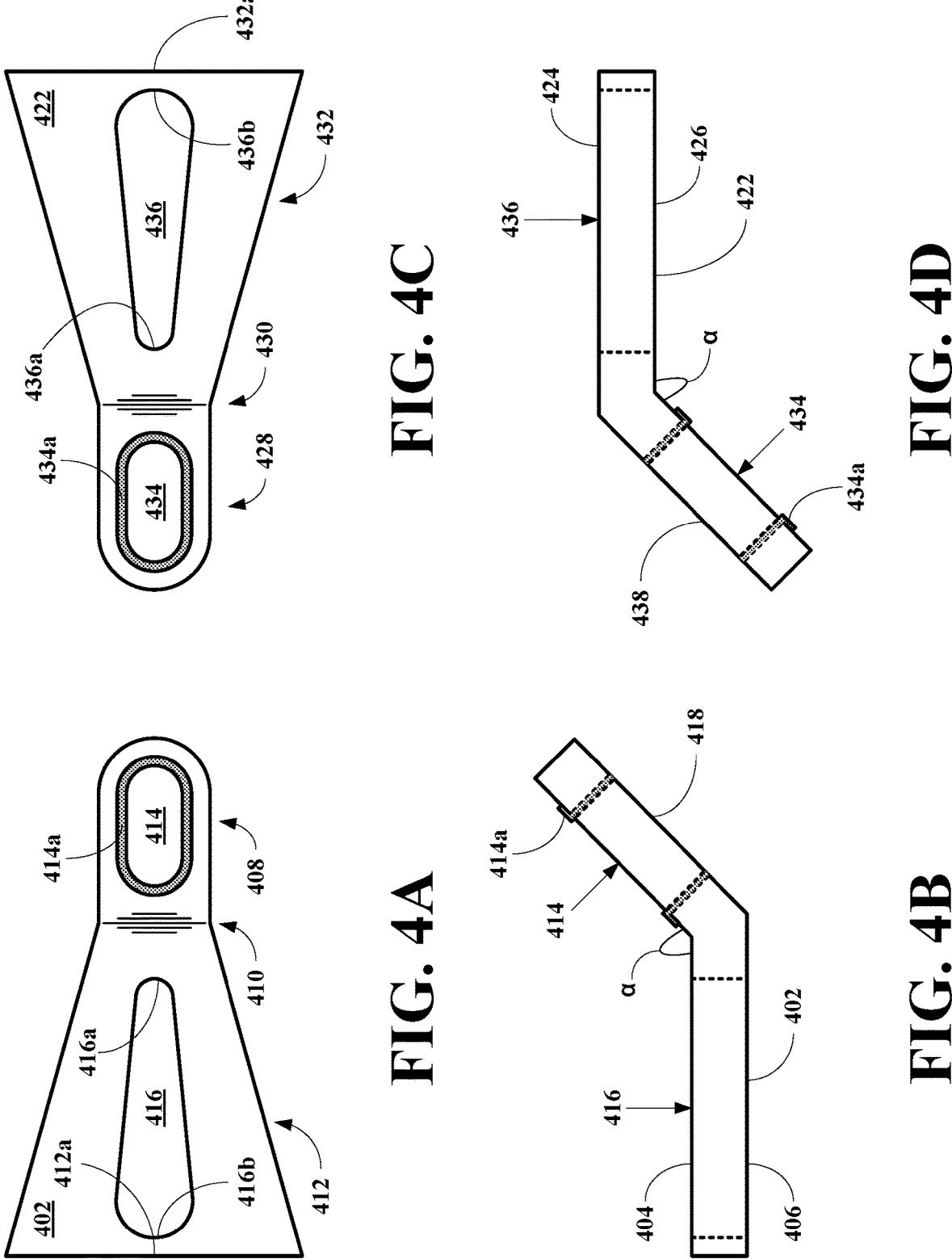

Referring now to FIG. 4A-O, fourth embodiments of a barbed wire repair apparatus, generally 400, are shown.

Type 1

Looking at FIGS. 4A&B, the apparatus 400 includes a first member 402 having a top surface 404 and a bottom surface 406. The first member 402 also includes a proximal portion 408, a bent portion 410, and a distal portion 412. The proximal portion 408 includes a connection slot 414 including a plastic thread protection member 414a. The distal portion 412 includes a tapered elongated barbed wire receiving aperture 416 having a narrow end 416a near a distal end 412a of the distal portion 412 and a broad end 416b near the bent portion 410. The bent portion 410 makes an angle α between the proximal portion 408 and the distal portion 412. The angle α is generally between 30 degrees and 60 degrees, here the angle α has a value of 45 degrees. The first member 402 also includes a first engaging surface 418.

Looking at FIGS. 4C&D, the apparatus 400 also includes a second member 422 having a top surface 424 and a bottom surface 426. The second member 422 also includes a proximal portion 428, a bent portion 430, and a distal portion 432. The proximal portion 428 includes a connection slot 434 including aplastic thread protection member 434a. The distal portion 432 includes a tapered elongated barbed wire receiving aperture 436 having a narrow end 436a near a distal end 432a of the distal portion 432 and a broad end 436b near the bent portion 430. The bent portion 430 makes the angle α between the proximal portion 428 and the distal portion 432. The second member 422 also includes a second engaging surface 438, wherein the second engaging surface 438 is adapted to engage the first engaging surface 418.

Figure 4E:
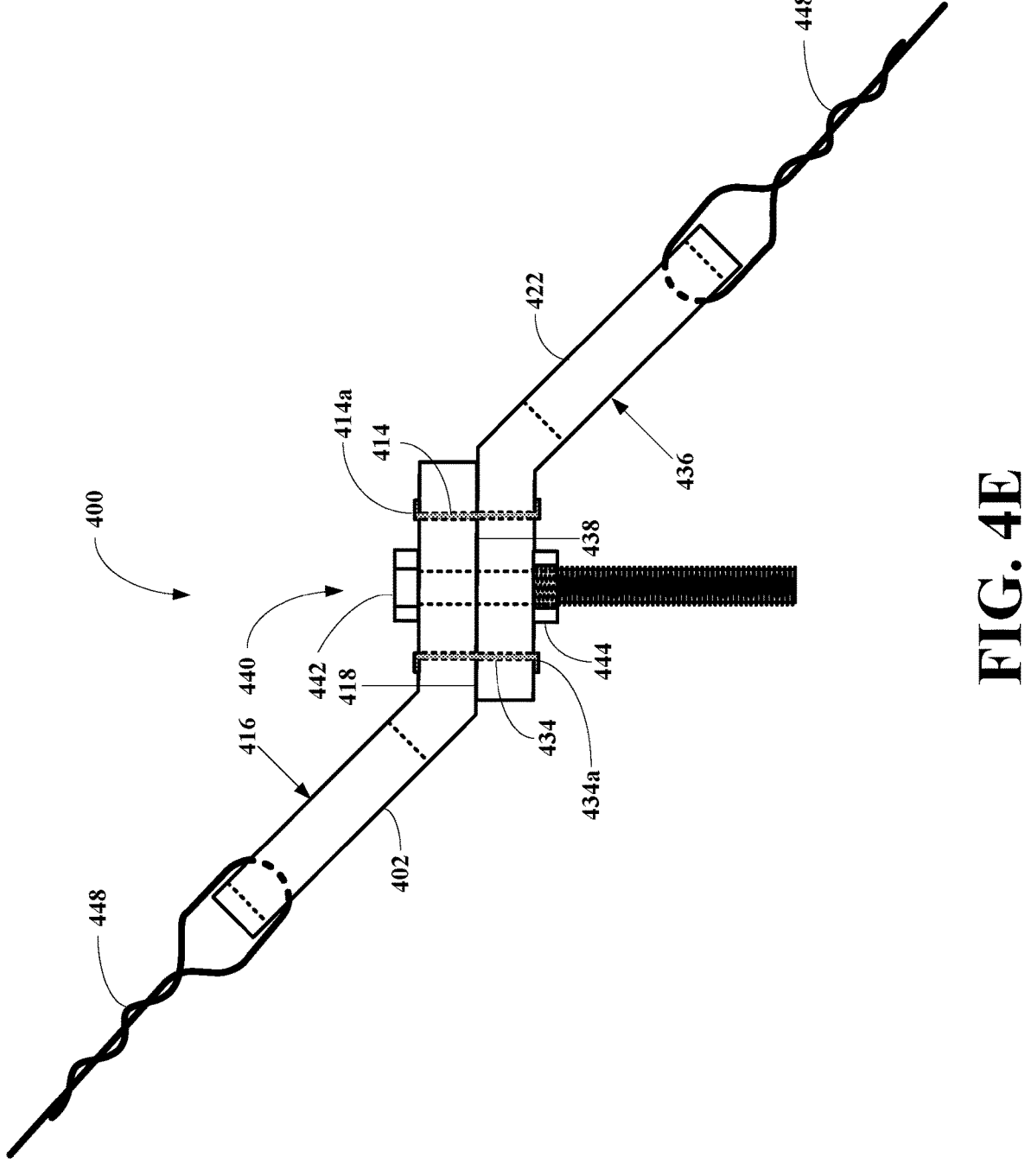

Looking at FIGS. 4E, the apparatus 400 is shown fixing a break in the barbed wire 448. After the ends of the break in the barbed wire are secured to the members 402 and 422 of the apparatus 400 via the tapered elongated barbed wire receiving slots 416 and 436, respectively, a connection device 440, here a long bolt 442 and a nut 444, is used to (a) secure the two members 402 and 422 together, (b) bring the first engaging surface 418 and the second engaging surface 438 into contact, and (c) repair the break and tensioning the repaired the barbed wire 448.

Type 2

Figures 4F, 4G, 4H, 4I:
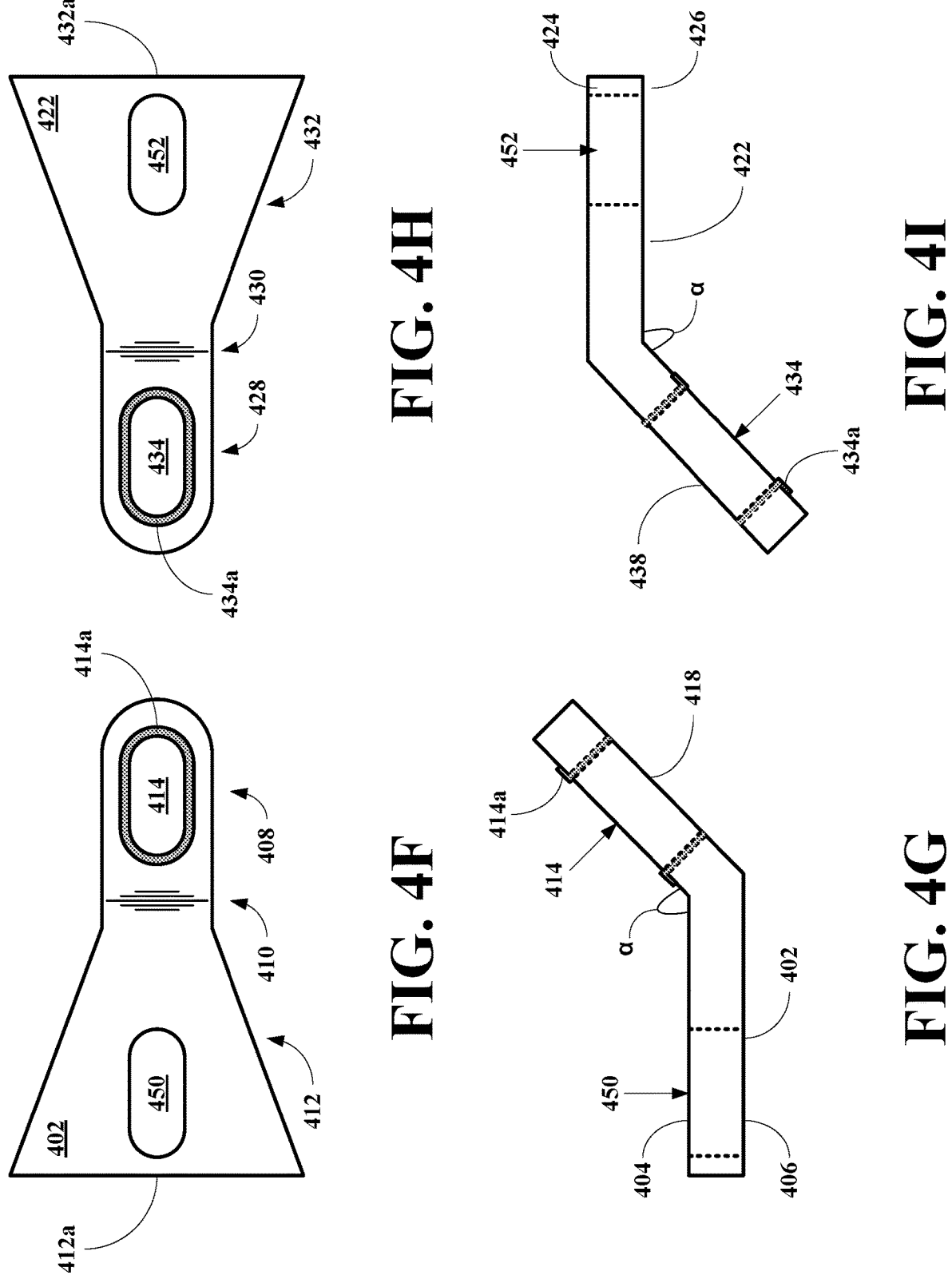

Looking at FIGS. 4F&G, the apparatus 400 includes a first member 402 having a top surface 404 and a bottom surface 406. The first member 402 also includes a proximal portion 408, a bent portion 410, and a distal portion 412. The proximal portion 408 includes the connection slot 414 including the plastic thread protection member 414a. The distal portion 412 includes a barbed wire receiving slot 450 disposed near a distal end 412a of the distal portion 412. The bent portion 410 makes the angle α between the proximal portion 408 and the distal portion 412. The first member 402 also includes a first engaging surface 438.

Looking at FIGS. 4H&I, the apparatus 400 also includes a second member 422 having a top surface 424 and a bottom surface 426. The second member 422 also includes a proximal portion 428, a bent portion 430, and a distal portion 432. The proximal portion 428 includes the connection slot 434 including the plastic thread protection member 434a. The distal portion 432 includes a barbed wire receiving slot 452 disposed near a distal end 432a of the distal portion 432. The bent portion 430 makes the angle α between the proximal portion 428 and the distal portion 432. The second member 422 also includes a second engaging surface 438, wherein the second engaging surface 438 is adapted to engage the first engaging surface 418.

Figure 4J:
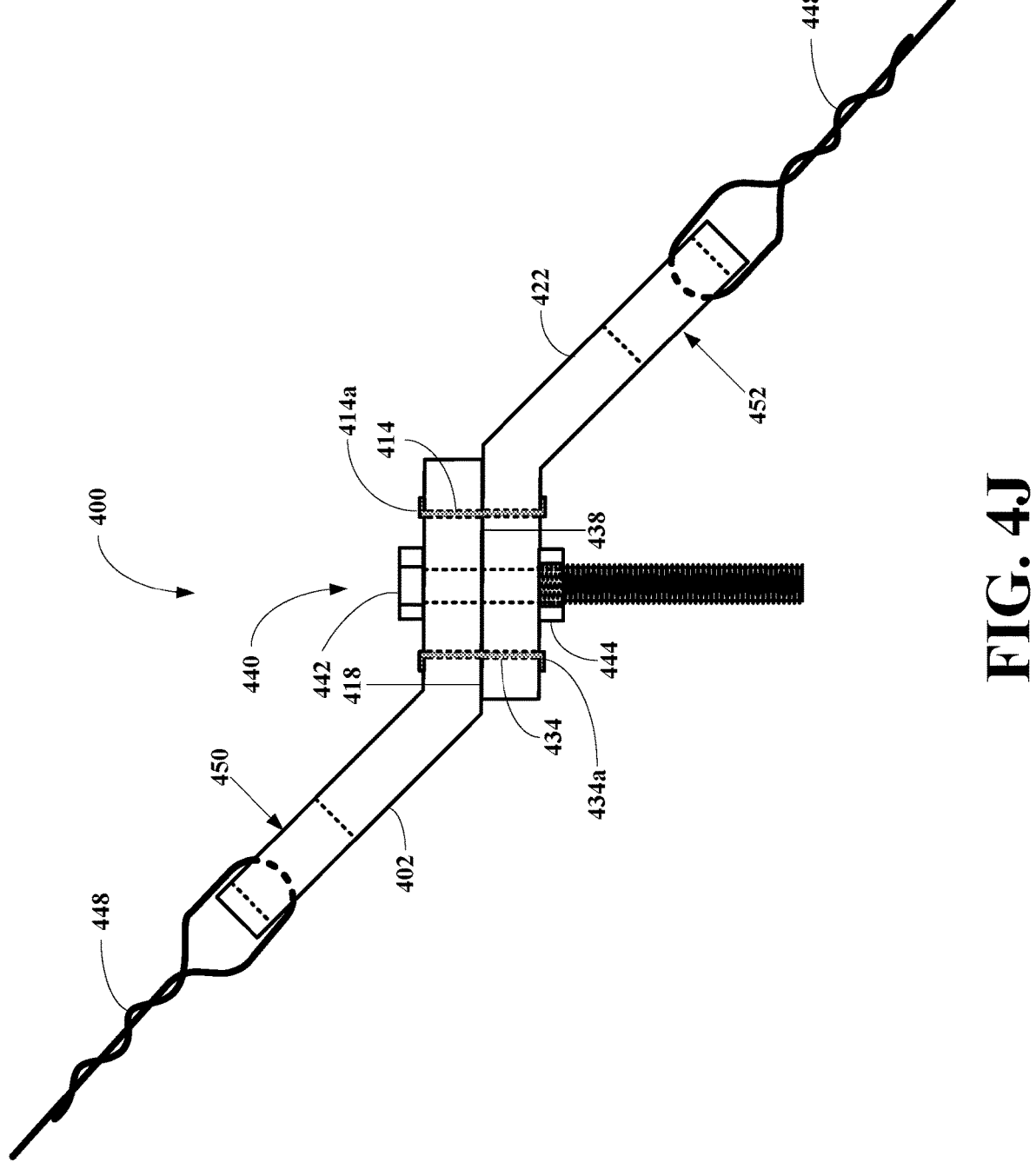

Looking at FIGS. 4J, the apparatus 400 is shown fixing a break in the barbed wire 448. After the ends of the break in the barbed wire are secured to the members 402 and 422 of the apparatus 400 via the barbed wire receiving slots 450 and 452, respectively, a connection device 440, here a long bolt 442 and a nut 444, is used to (a) secure the two members 402 and 422 together, (b) bring the first engaging surface 418 and the second engaging surface 438 into contact, and (c) repair the break and tensioning the repaired the barbed wire 448.

Type 3

Figures 4K, 4L, 4M, 4N:
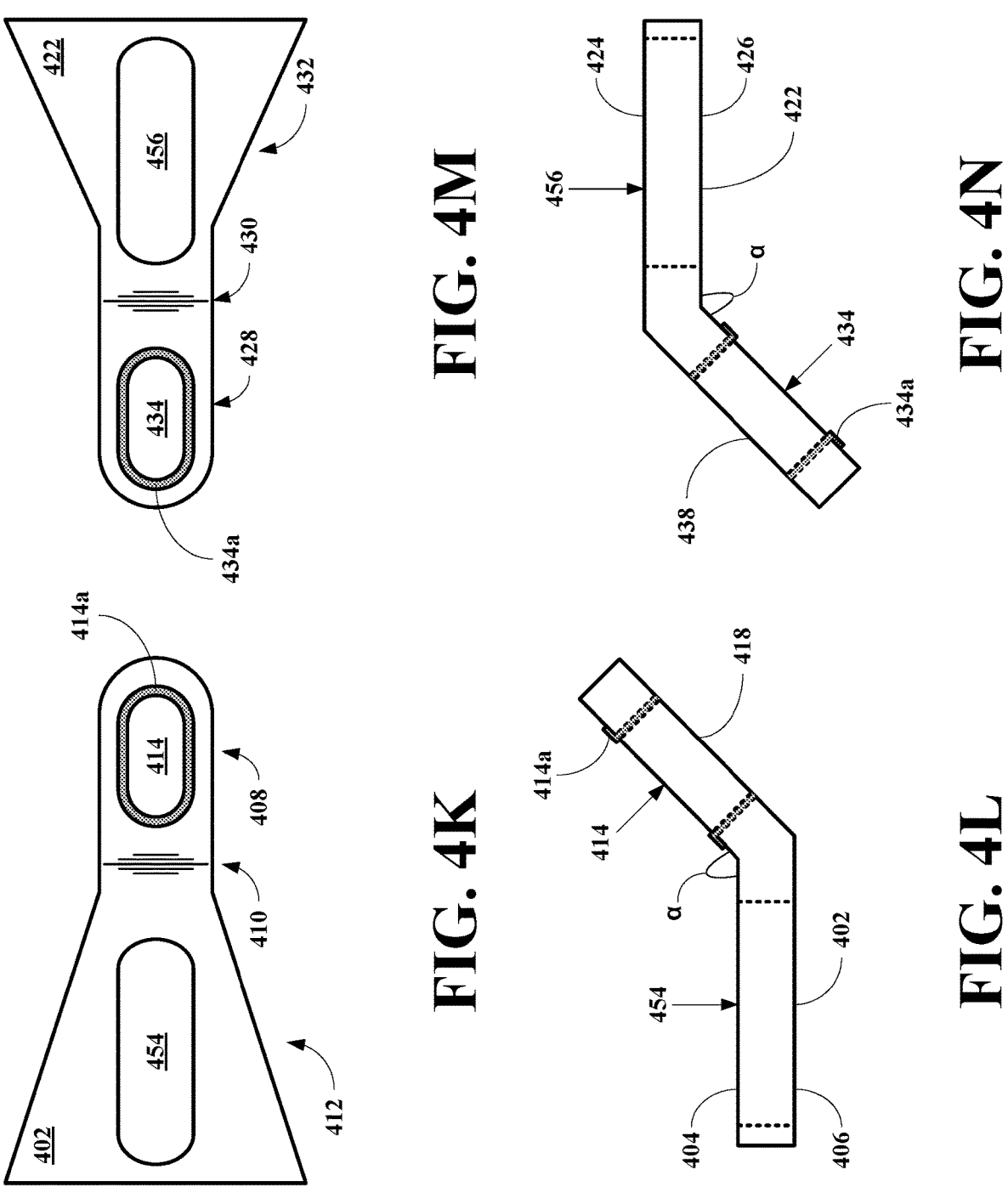
Figure 40:
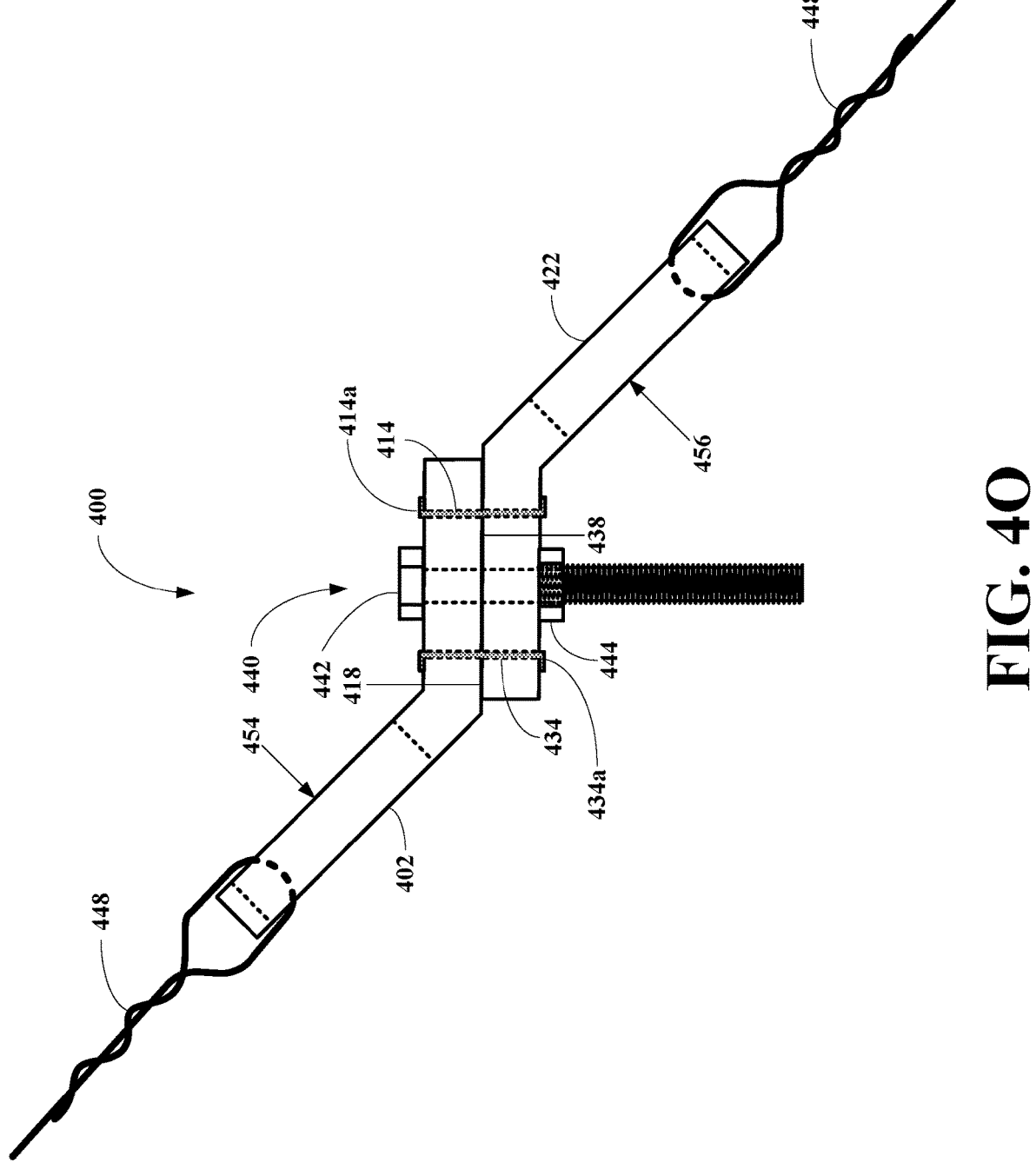

Looking at FIGS. 4K&L, the apparatus 400 includes a first member 402 having a top surface 404 and a bottom surface 406. The first member 402 also includes a proximal portion 408, a bent portion 410, and a distal portion 412. The proximal portion 408 includes the connection slot 414 including the plastic thread protection member 414a. The distal portion 412 includes an elongated barbed wire receiving slot 454. The bent portion 410 makes the angle α between the proximal portion 408 and the distal portion 412. The first member 402 also includes a first engaging surface 418.

Looking at FIGS. 4M&N, the apparatus 400 also includes a second member 422 having a top surface 424 and a bottom surface 426. The second member 422 also includes a proximal portion 428, a bent portion 430, and a distal portion 432. The proximal portion 428 includes the connection slot 434 including the plastic thread protection member 434a. The distal portion 432 includes an elongated barbed wire receiving slot 456. The bent portion 430 makes the angle α between the proximal portion 428 and the distal portion 432. The second member 422 also includes a second engaging surface 438, wherein the second engaging surface 438 is adapted to engage the first engaging surface 418.

Looking at FIGS. 4O, the apparatus 400 is shown fixing a break in the barbed wire 448. After the ends of the break in the barbed wire are secured to the members 402 and 422 of the apparatus 400 via the elongated barbed wire receiving slots 454 and 456, respectively, a connection device 440, here a long bolt 442 and a nut 444, is used to (a) secure the two members 402 and 422 together, (b) bring the first engaging surface 418 and the second engaging surface 438 into contact, and (c) repair the break and tensioning the repaired the barbed wire 448.

Fifth Embodiments

Figures 5A, 5B, 5C, 5D:
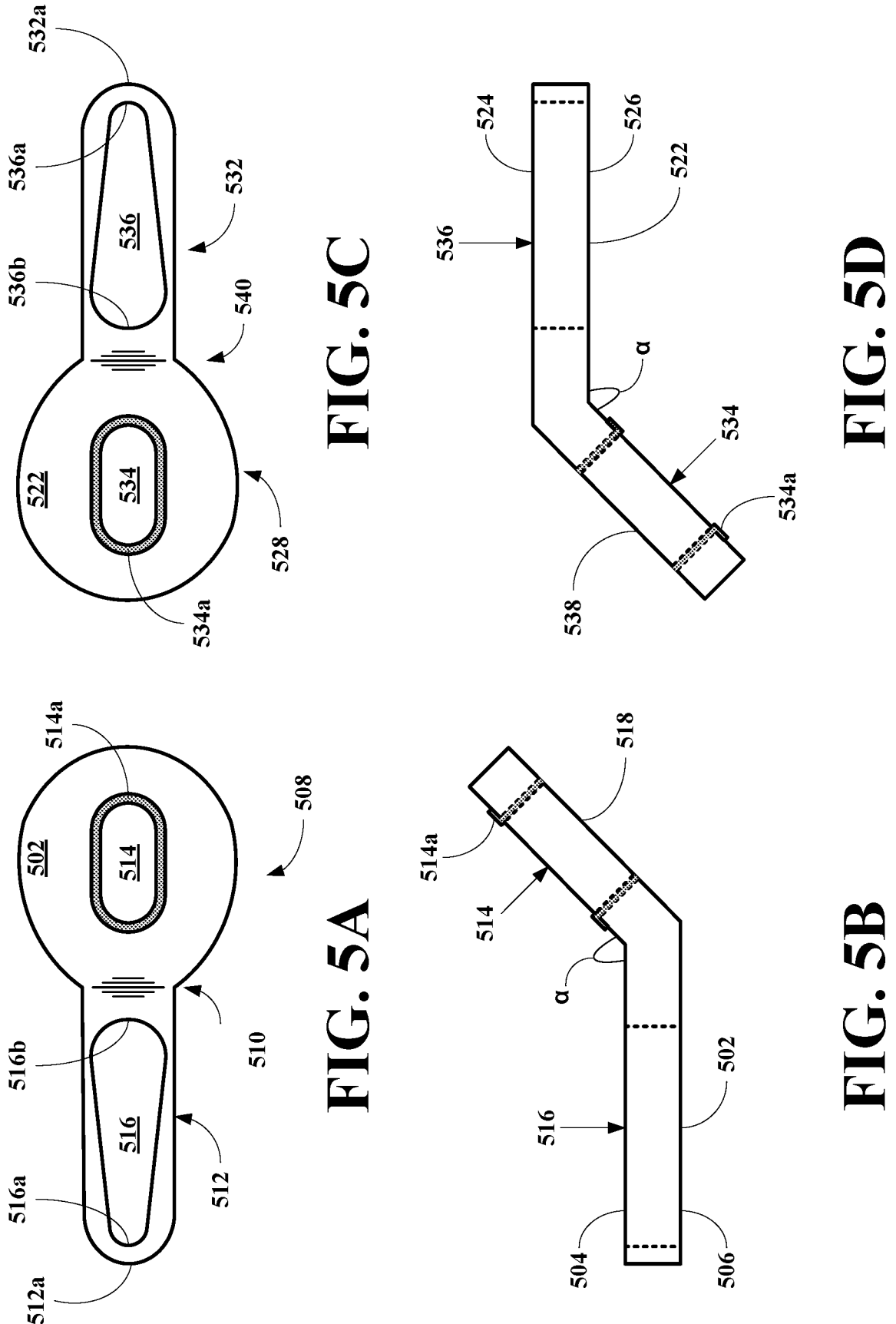

Referring now to FIG. 5A-O, fifth embodiments of a barbed wire repair apparatus, generally 500, are shown.

Type 1

Looking at FIGS. 5A&B, the apparatus 500 includes a first member 502 having a top surface 504 and a bottom surface 506. The first member 502 also includes a proximal portion 508, a bent portion 510, and a distal portion 512. The proximal portion 508 includes a connection slot 514 including a plastic thread protection member 514a. The distal portion 512 includes a tapered elongated barbed wire receiving aperture 516 having a narrow end 516a near a distal end 512a of the distal portion 512 and a broad end 516b near the bent portion 510. The bent portion 510 makes an angle α between the proximal portion 508 and the distal portion 512. The angle α is generally between 30 degrees and 60 degrees, here the angle α has a value of 45 degrees. The first member 502 also includes a first engaging surface 518.

Looking at FIGS. 5C&D, the apparatus 500 also includes a second member 522 having a top surface 524 and a bottom surface 526. The second member 522 also includes a proximal portion 528, a bent portion 530, and a distal portion 532. The proximal portion 128 includes a connection slot 534 including aplastic thread protection member 534a. The distal portion 532 includes a tapered elongated barbed wire receiving aperture 536 having a narrow end 536a near a distal end 532a of the distal portion 532 and a broad end 536b near the bent portion 530. The bent portion 530 makes the angle α between the proximal portion 528 and the distal portion 532. The second member 522 also includes a second engaging surface 538, wherein the second engaging surface 538 is adapted to engage the first engaging surface 518.

Figure 5E:
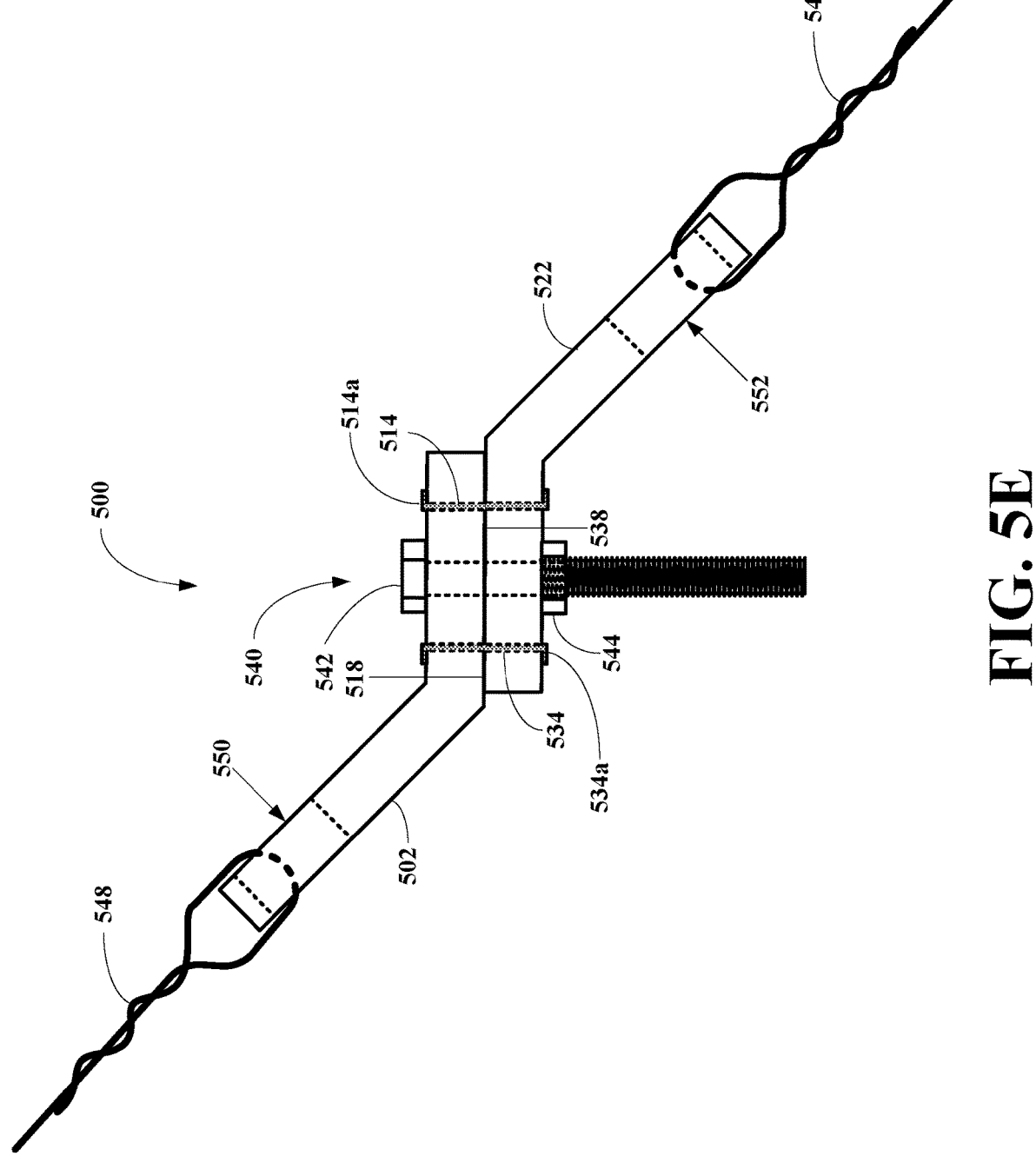

Looking at FIGS. 5E, the apparatus 500 is shown fixing a break in the barbed wire 548. After the ends of the break in the barbed wire are secured to the members 502 and 522 of the apparatus 500 via the tapered elongated barbed wire receiving slots 516 and 536, respectively, a connection device 540, here a long bolt 542 and a nut 544, is used to (a) secure the two members 502 and 522 together, (b) bring the first engaging surface 518 and the second engaging surface 538 into contact, and (c) repair the break and tensioning the repaired the barbed wire 548.

Type 2

Figures 5F, 5G, 5H, 5I:
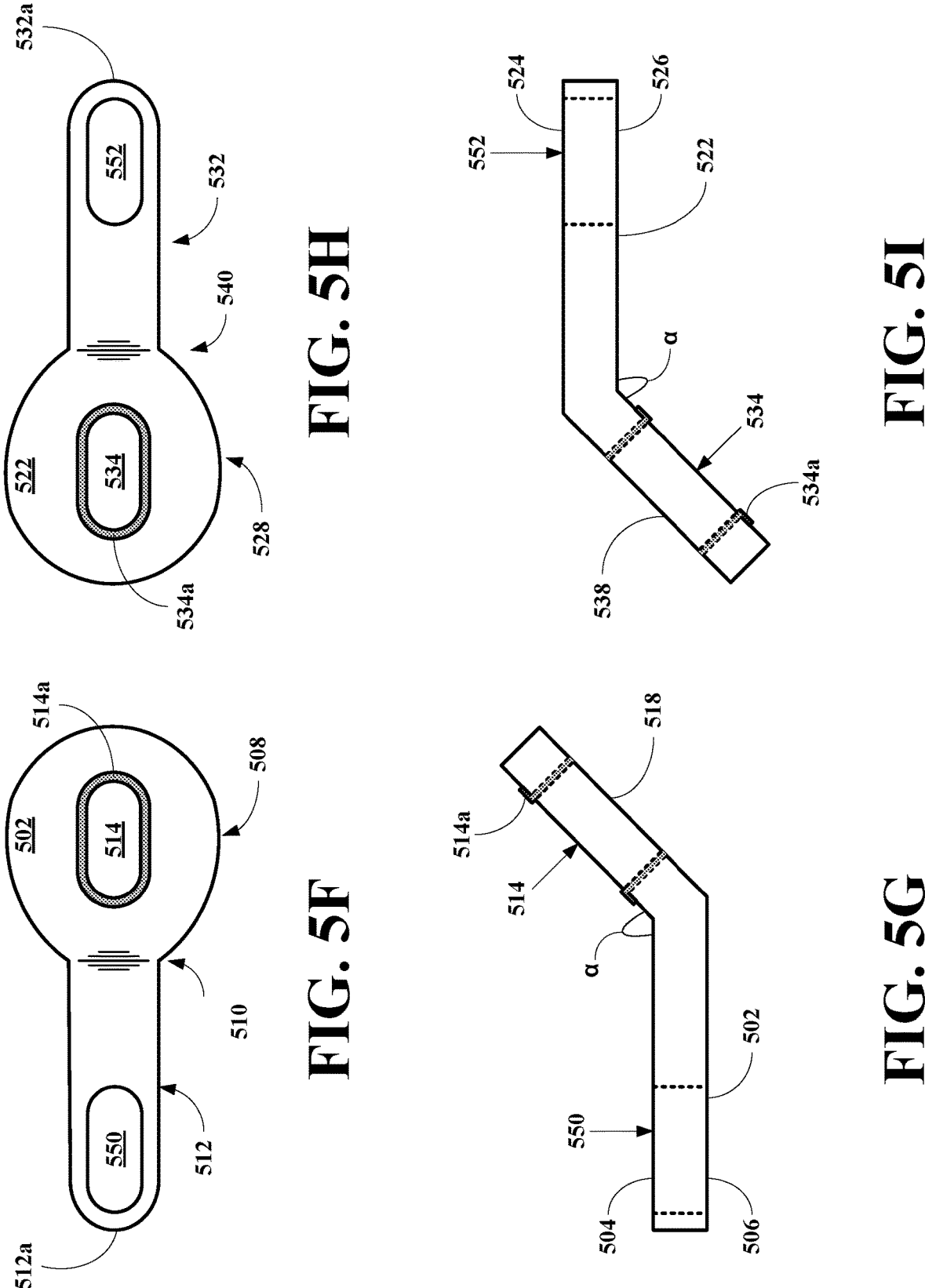

Looking at FIGS. 5F&G, the apparatus 500 includes the first member 502 having the top surface 504 and the bottom surface 506. The first member 502 also includes the proximal portion 508, the bent portion 510, and the distal portion 512. The proximal portion 508 includes the connection slot 514 including the plastic thread protection member 514a. The distal portion 512 includes a barbed wire receiving slot 550 disposed near a distal end 512a of the distal portion 512. The bent portion 510 makes the angle α between the proximal portion 508 and the distal portion 512. The first member 502 also includes the first engaging surface 518.

Looking at FIGS. 5H&I, the apparatus 500 also includes the second member 522 having the top surface 524 and the bottom surface 526. The second member 522 also includes the proximal portion 528, a bent portion 530, and a distal portion 532. The proximal portion 528 includes the connection slot 534 including the plastic thread protection member 534a. The distal portion 532 includes a barbed wire receiving slot 552 disposed near a distal end 532a of the distal portion 532. The bent portion 530 makes the angle α between the proximal portion 528 and the distal portion 532. The second member 522 also includes a second engaging surface 538, wherein the second engaging surface 538 is adapted to engage the first engaging surface 518.

Figure 5J:
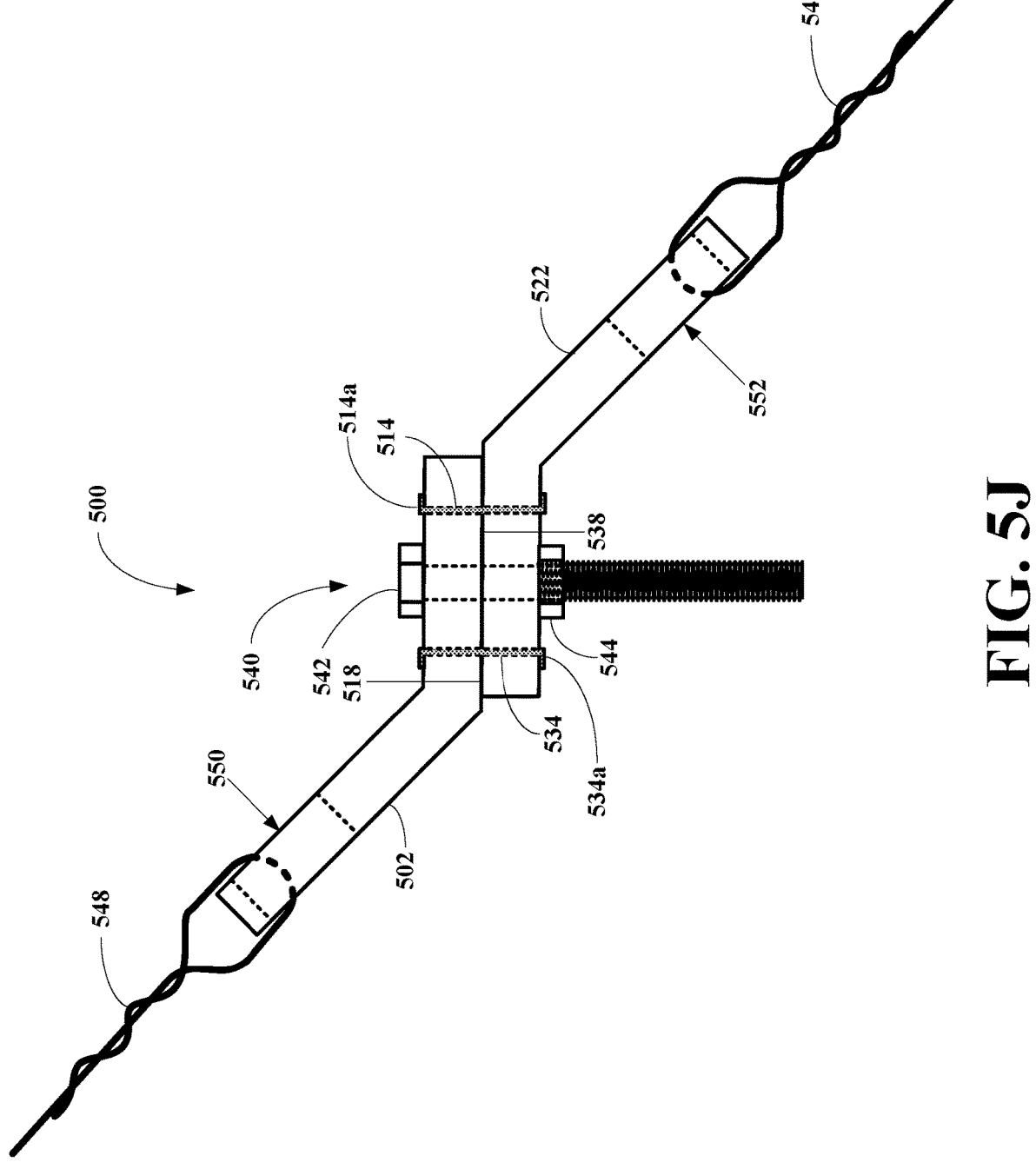
Figure 50:
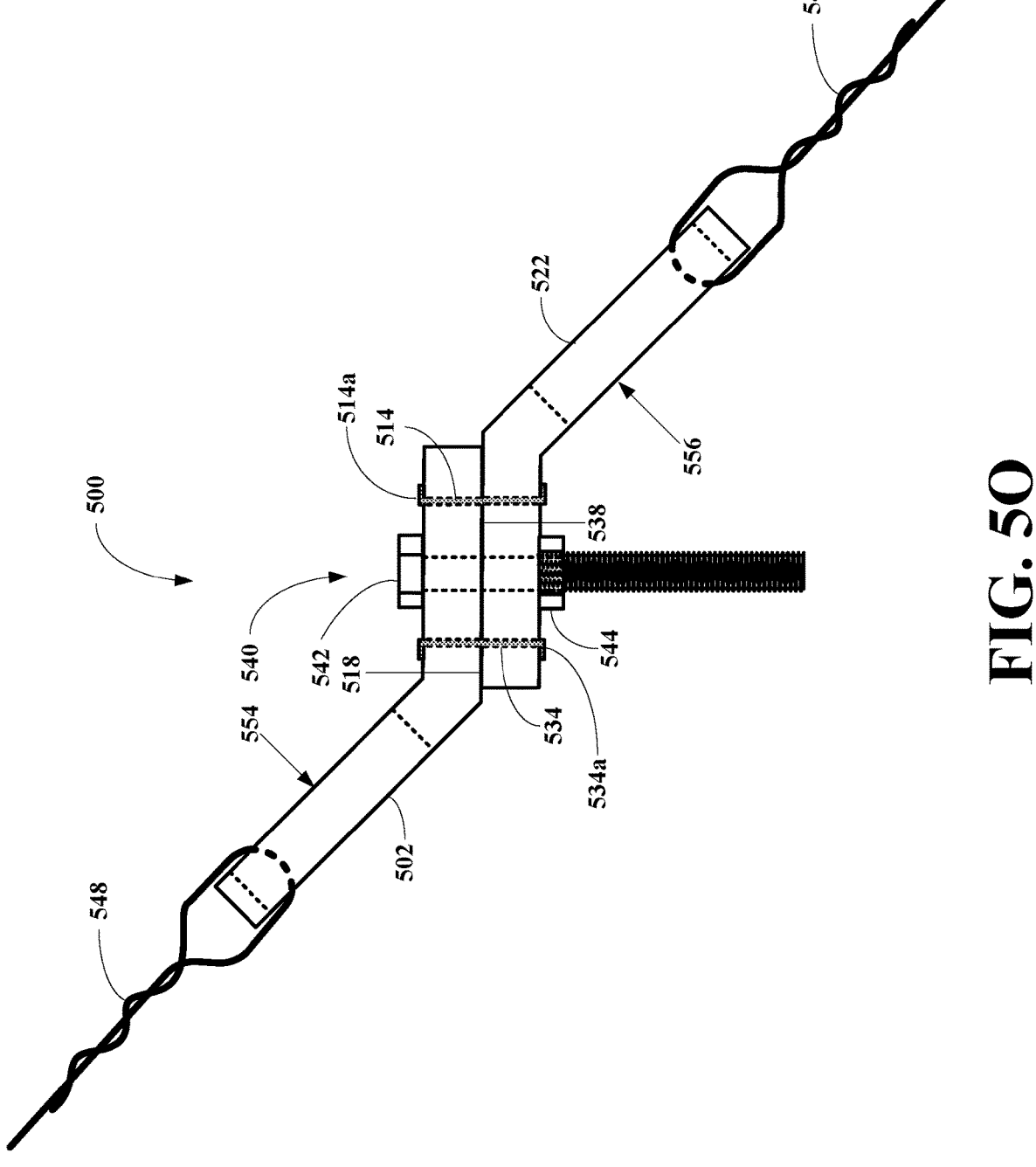

Looking at FIGS. 5J, the apparatus 500 is shown fixing a break in the barbed wire 548. After the ends of the break in the barbed wire are secured to the members 502 and 522 of the apparatus 500 via the barbed wire receiving slots 550 and 552, respectively, a connection device 540, here a long bolt 542 and a nut 544, is used to (a) secure the two members 502 and 522 together, (b) bring the first engaging surface 518 and the second engaging surface 538 into contact, and (c) repair the break and tensioning the repaired the barbed wire 548.

Type 3

Looking at FIGS. 5K&L, the apparatus 500 includes a first member 502 having a top surface 504 and a bottom surface 506. The first member 502 also includes a proximal portion 508, a bent portion 510, and a distal portion 512. The proximal portion 508 includes the connection slot 514 including the plastic thread protection member 514*a*. The distal portion 512 includes an elongated barbed wire receiving slot 554. The bent portion 510 makes the angle α between the proximal portion 508 and the distal portion 512. The first member 502 also includes a first engaging surface 518.

Looking at FIGS. 5M&N, the apparatus 500 also includes a second member 522 having a top surface 524 and a bottom surface 526. The second member 522 also includes a proximal portion 528, a bent portion 530, and a distal portion 532. The proximal portion 528 includes the connection slot 534 including the plastic thread protection member 534*a*. The distal portion 532 includes an elongated barbed wire receiving slot 556. The bent portion 530 makes the angle α between the proximal portion 528 and the distal portion 532. The second member 522 also includes a second engaging surface 538, wherein the second engaging surface 538 is adapted to engage the first engaging surface 518.

Looking at FIGS. 5O, the apparatus 500 is shown fixing a break in the barbed wire 548. After the ends of the break in the barbed wire are secured to the members 502 and 522 of the apparatus 500 via the elongated barbed wire receiving slots 554 and 556, respectively, a connection device 540, here a long bolt 542 and a nut 544, is used to (a) secure the two members 502 and 522 together, (b) bring the first engaging surface 518 and the second engaging surface 538 into contact, and (c) repair the break and tensioning the repaired the barbed wire 548.

Sixth Embodiments

Figures 6A, 6B, 6C, 6D:
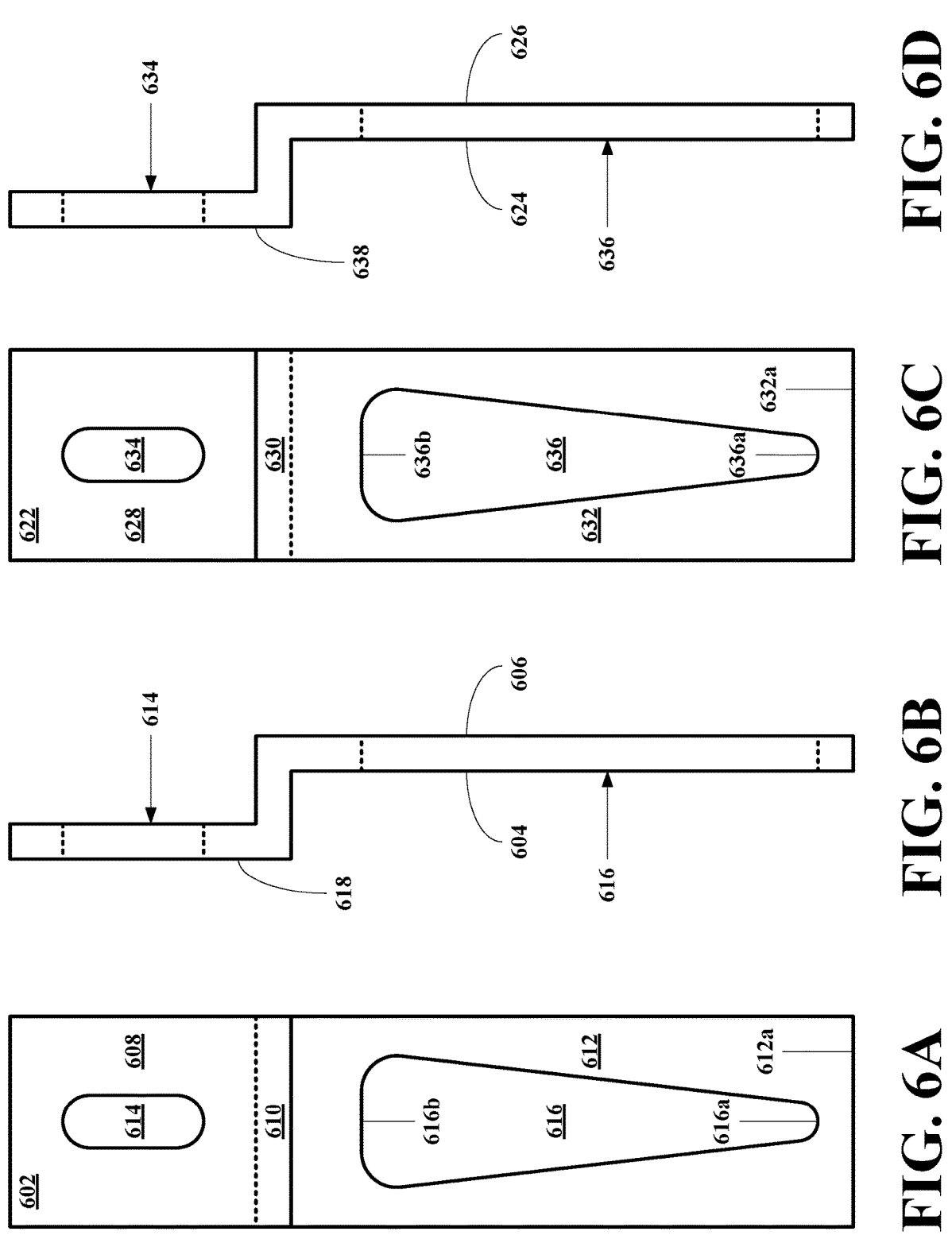

Referring now to FIG. 6A-O, sixth embodiments of a barbed wire repair apparatus, generally 600, are shown.

Type 1

Looking at FIGS. 6A&B, the apparatus 600 includes a first member 602 having a top surface 604 and a bottom surface 606. The first member 602 also includes a proximal portion 608, a bent portion 610, and a distal portion 612. The proximal portion 608 includes a connection slot 614. The distal portion 612 includes a tapered elongated barbed wire receiving aperture 616 having a narrow end 616*a* near a distal end 632*a* of the distal portion 632 and a broad end 616*b* near the bent portion 630. The bent portion 610 comprises 90-90 jog or vertical jog. The first member 602 also includes a first engaging surface 618.

Looking at FIGS. 6C&D, the apparatus 600 also includes a second member 622 having a top surface 624 and a bottom surface 626. The second member 622 also includes a proximal portion 628, a bent portion 630, and a distal portion 632. The proximal portion 628 includes a connection slot 634. The distal portion 632 includes a tapered elongated barbed wire receiving aperture 636 having a narrow end 636*a* near a distal end 632*a* of the distal portion 632 and a broad end 636*b* near the bent portion 630. The bent portion 630 makes the angle α between the proximal portion 628 and the distal portion 632. The second member 622 also includes a second engaging surface 638, wherein the second engaging surface 638 is adapted to engage the first engaging surface 618.

Figure 6E:
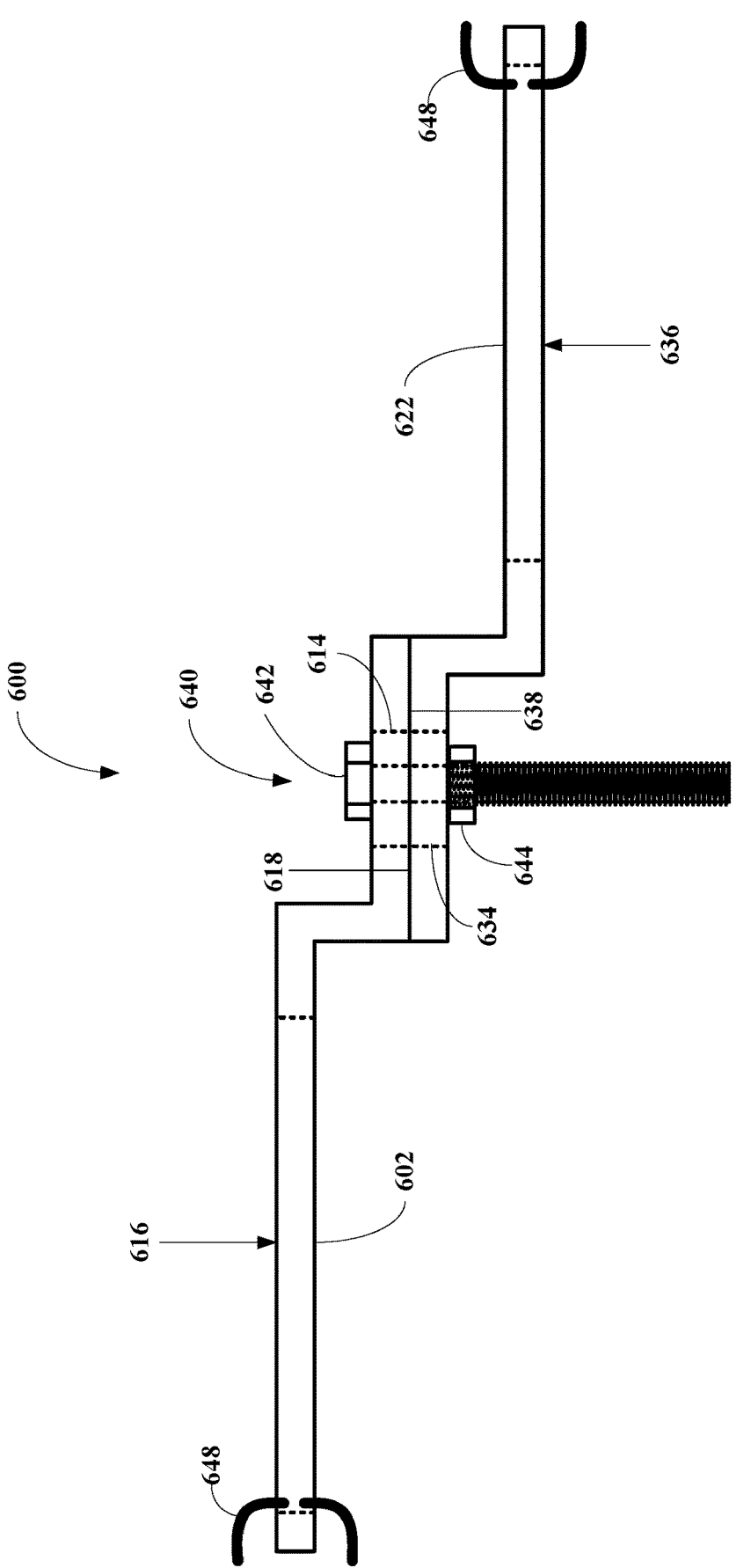

Looking at FIGS. 6E, the apparatus 600 is shown fixing a break in the barbed wire 648. After the ends of the break in the barbed wire are secured to the members 602 and 622 of the apparatus 600 via the tapered elongated barbed wire receiving slots 616 and 636, respectively, a connection device 640, here a long bolt 642 and a nut 644, is used to (a) secure the two members 602 and 622 together, (b) bring the first engaging surface 618 and the second engaging surface 638 into contact, and (c) repair the break and tensioning the repaired the barbed wire 648.

Type 2

Figures 6F, 6G, 6H, 6I:
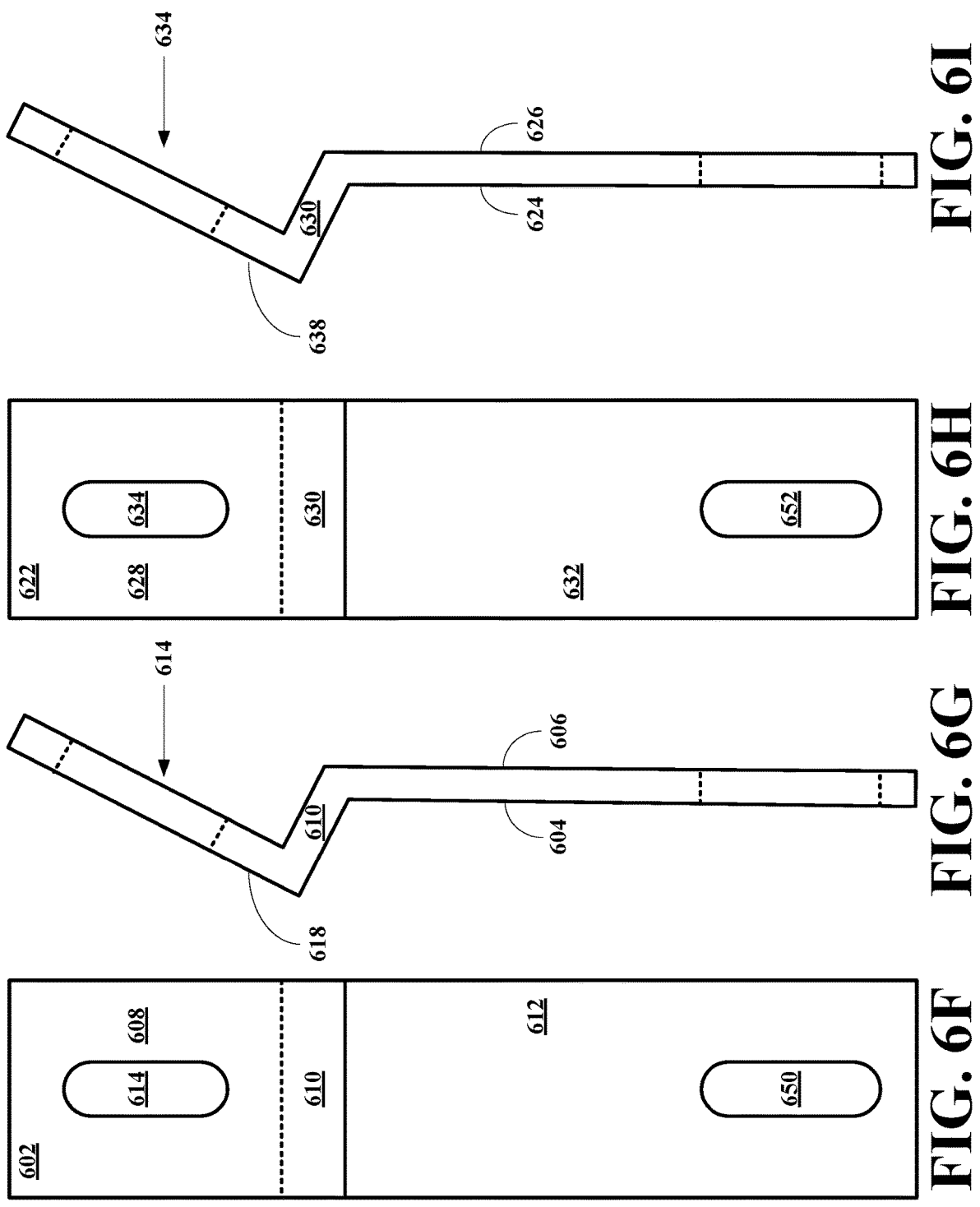

Looking at FIGS. 6F&G, the apparatus 600 includes the first member 602 having the top surface 604 and the bottom surface 606. The first member 602 also includes the proximal portion 608, the bent portion 610, and the distal portion 612. The proximal portion 608 includes the connection slot 614. The distal portion 612 includes a barbed wire receiving slot 650 disposed near the distal end 612*a* of the distal portion 612. the bent portion 610 comprises 90-901 jog or vertical jog. The first member 602 also includes a first engaging surface 618.

Looking at FIGS. 6H&I, the apparatus 600 also includes the second member 622 having the top surface 624 and the bottom surface 626. The second member 622 also includes the proximal portion 628, the bent portion 630, and the distal portion 632. The proximal portion 628 includes the connection slot 634. The distal portion 632 includes a barbed wire receiving slot 652 disposed near the distal end 632*a* of the distal portion 632. The bent portion 630 comprises 90-90 jog or vertical jog. The apparatus 622 also includes a second engaging surface 638, wherein the second engaging surface 638 is adapted to engage the first engaging surface 618.

Figure 6J:
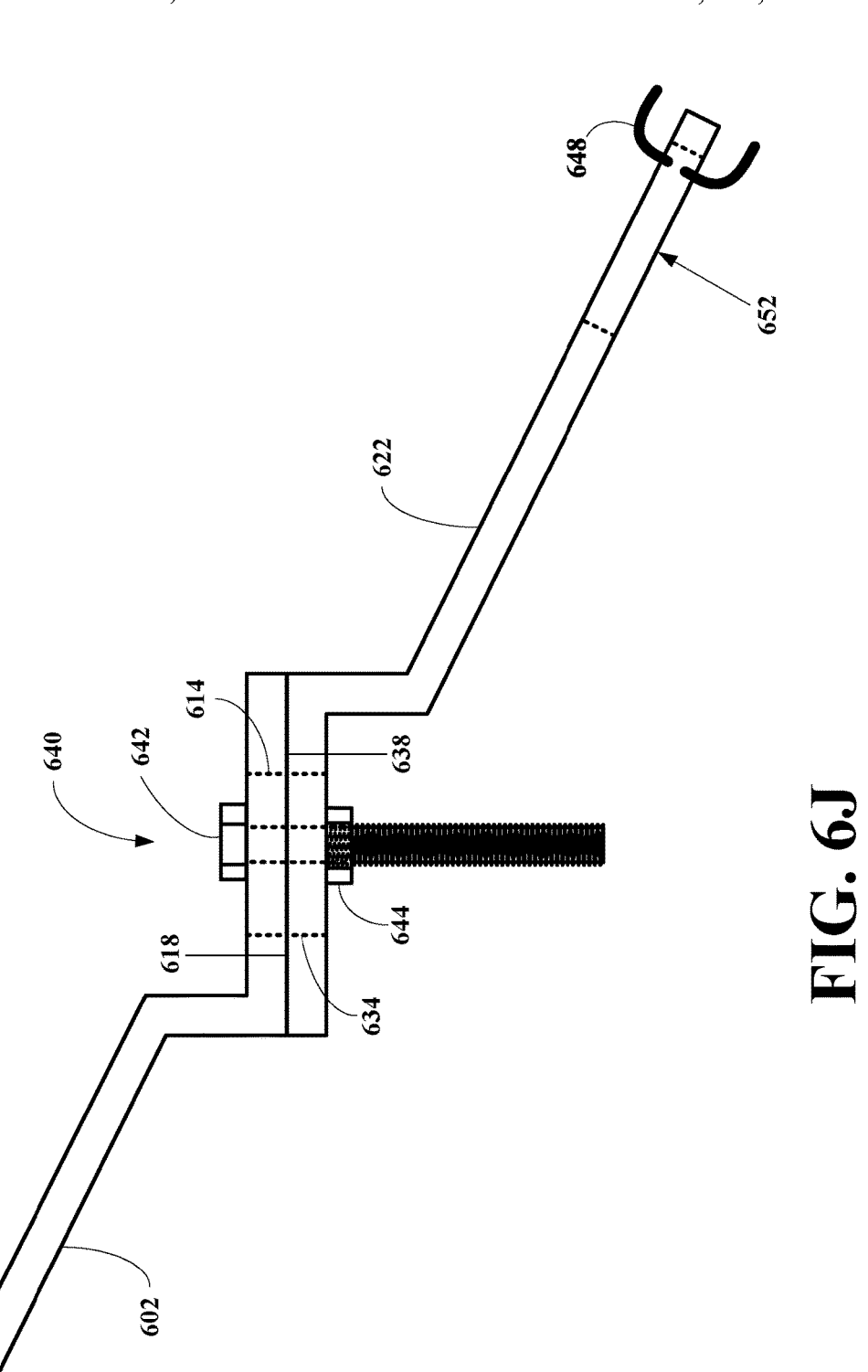
Figure 6L:
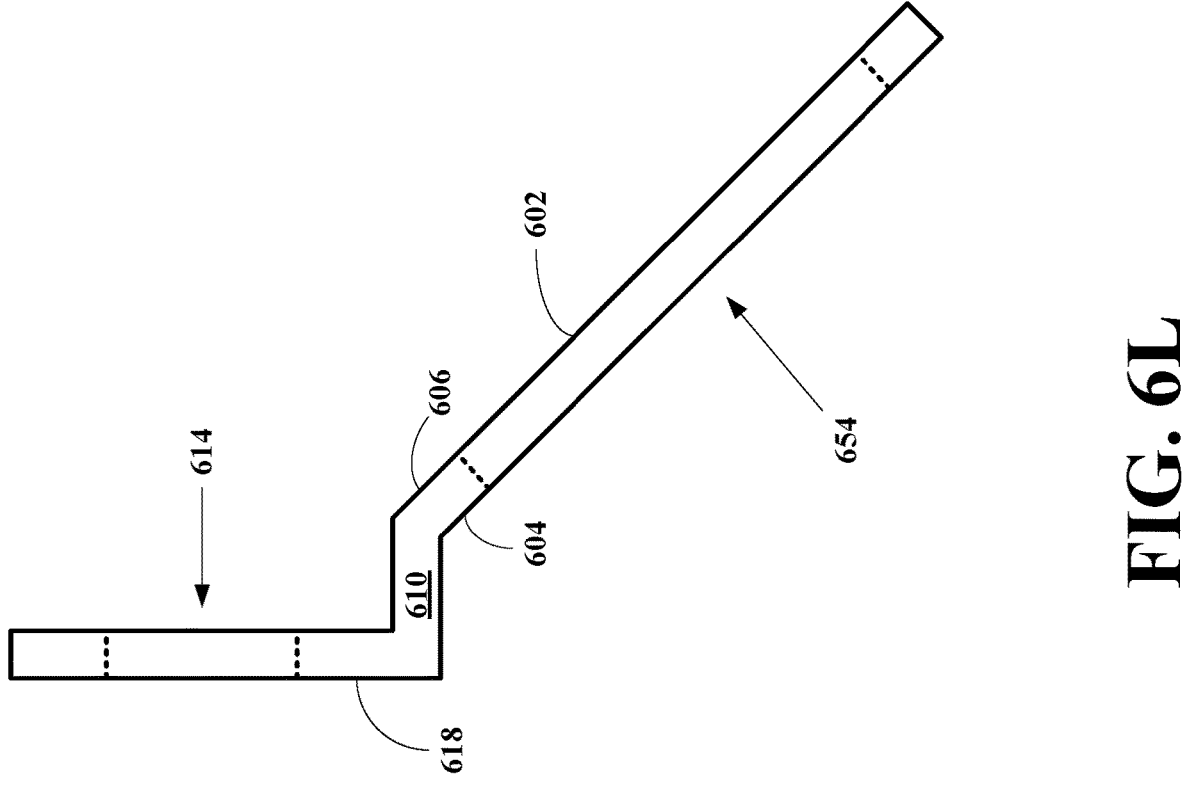

Looking at FIGS. 6J, the apparatus 600 is shown fixing a break in the barbed wire 648. After the ends of the break in the barbed wire are secured to the members 602 and 622 of the apparatus 600 via the barbed wire receiving slots 650 and 652, respectively, a connection device 640, here a long bolt 642 and a nut 644, is used to (a) secure the two members 602 and 622 together, (b) bring the first engaging surface 618 and the second engaging surface 638 into contact, and (c) repair the break and tensioning the repaired the barbed wire 648.

Type 3

Figure 6K:
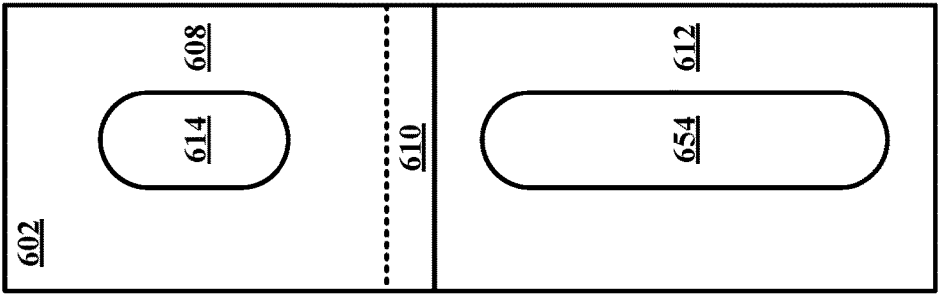
Figure 6N:
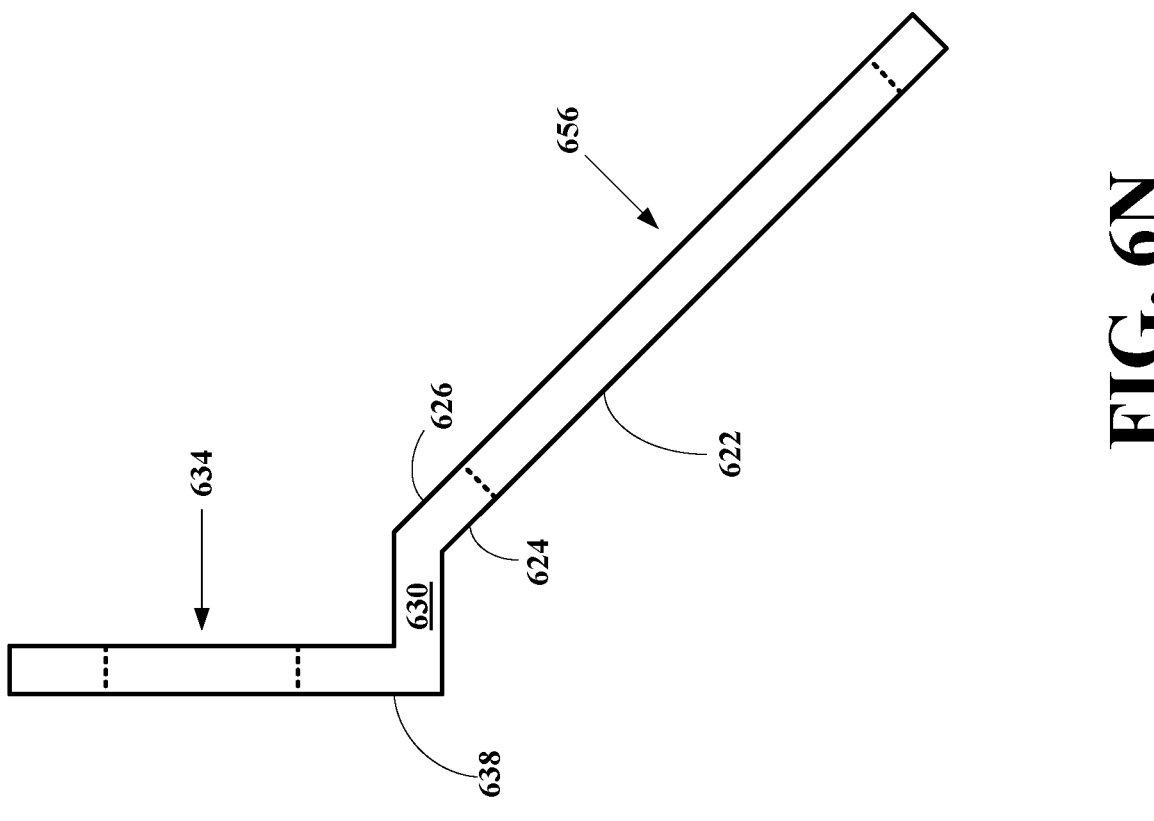

Looking at FIGS. 6K&L, the apparatus 600 includes the first member 602 having the top surface 604 and the bottom surface 606. The first member 602 also includes the proximal portion 608, the bent portion 610, and the distal portion 612. The proximal portion 608 includes the connection slot 614. The distal portion 612 includes an elongated barbed wire receiving slot 654. the bent portion 610 comprises 90-90 jog or vertical jog. The first member 602 also includes a first engaging surface 618.

Figure 6M:
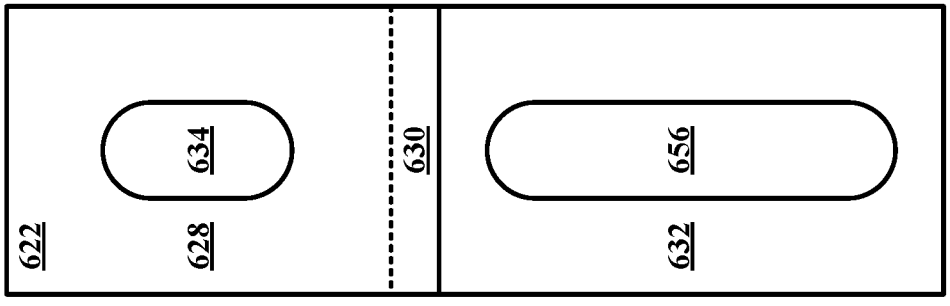
Figure 60:
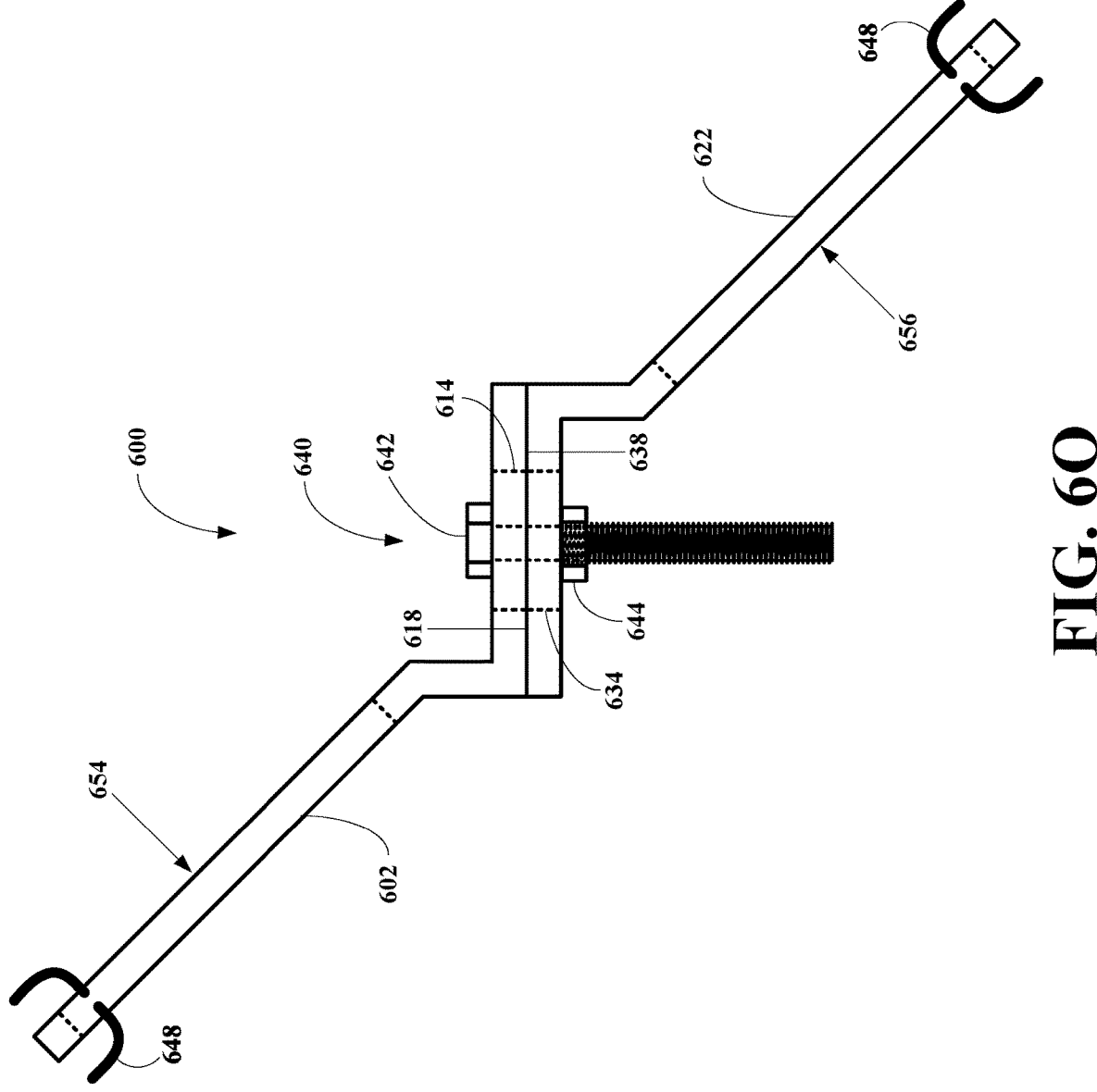

Looking at FIGS. 6M&N, the apparatus 600 also includes the second member 622 having the top surface 624 and the bottom surface 626. The second member 622 also includes the proximal portion 628, the bent portion 630, and the distal portion 632. The proximal portion 628 includes the connection slot 634. The distal portion 632 includes a barbed wire receiving slot 656. The bent portion 630 comprises 90-90 jog or vertical jog. The second member 622 also includes a second engaging surface 638, wherein the second engaging surface 638 is adapted to engage the first engaging surface 618.

Looking at FIGS. 6O, the apparatus 600 is shown fixing a break in the barbed wire 648. After the ends of the break in the barbed wire are secured to the members 602 and 622 of the apparatus 600 via the elongated barbed wire receiving slots 654 and 656, respectively, a connection device 640, here a long bolt 642 and a nut 644, is used to (a) secure the two members 602 and 622 together, (b) bring the first engaging surface 618 and the second engaging surface 638 into contact, and (c) repair the break and tensioning the repaired the barbed wire 648.

Seventh Embodiments

Referring now to FIG. 7A-O, seventh embodiments of a barbed wire repair apparatus, generally 700, are shown.
Type 1

Looking at FIGS. 7A&B, the apparatus 700 includes a first member 702 having a top surface 704 and a bottom surface 706. The first member 702 also includes a proximal portion 708, a bent portion 710, and a distal portion 712. The proximal portion 708 includes a connection slot 714. The distal portion 712 includes a tapered elongated barbed wire receiving aperture 716 having a narrow end 716a near a distal end 732a of the distal portion 732 and a broad end 716b near the bent portion 730. The bent portion 710 comprises an S-shaped jog. The first member 702 also includes a first engaging surface 718.

Looking at FIGS. 7C&D, the apparatus 700 also includes a second member 722 having a top surface 724 and a bottom surface 726. The second member 722 also includes a proximal portion 728, a bent portion 730, and a distal portion 732. The proximal portion 728 includes a connection slot 734. The distal portion 732 includes a tapered elongated barbed wire receiving aperture 736 having a narrow end 736a near a distal end 732a of the distal portion 732 and a broad end 736b near the bent portion 730, the bent portion 730 comprises an S-shaped jog. The apparatus 700 also includes a second engaging surface 738, wherein the second engaging surface 738 is adapted to engage the first engaging surface 718.

Figure 7E:
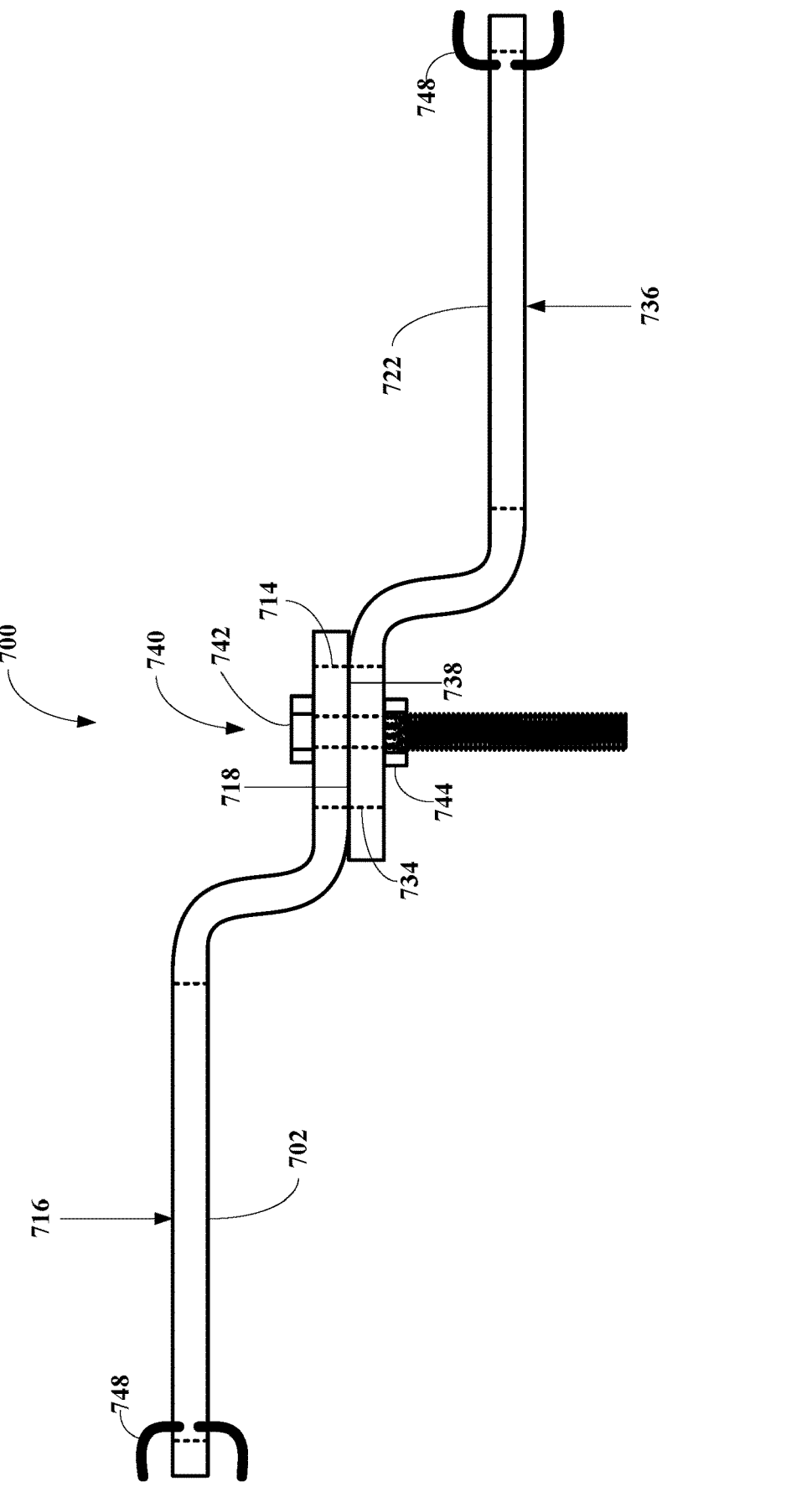

Looking at FIGS. 7E, the apparatus 700 is shown fixing a break in the barbed wire 748. After the ends of the break in the barbed wire are secured to the members 702 and 722 of the apparatus 600 via the tapered elongated barbed wire receiving slots 716 and 736, respectively, a connection device 740, here a long bolt 742 and a nut 744, is used to (a) secure the two members 702 and 722 together, (b) bring the first engaging surface 718 and the second engaging surface 738 into contact, and (c) repair the break and tensioning the repaired the barbed wire 748.
Type 2

Figures 7F, 7G, 7H, 7I:
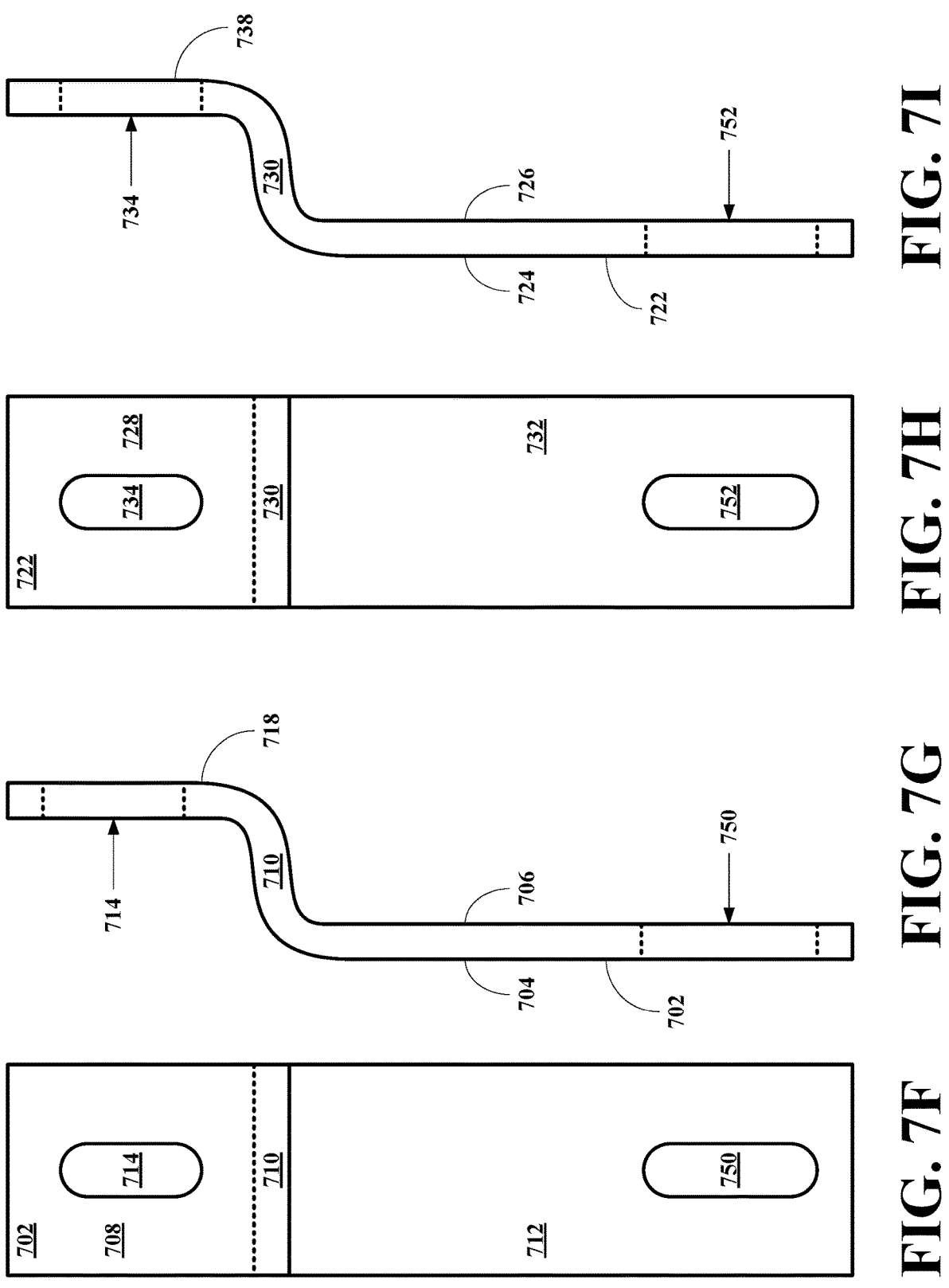

Looking at FIGS. 7F&G, the apparatus 700 includes a first member 702 having the top surface 704 and the bottom surface 706. The first member 702 also includes the proximal portion 708, the bent portion 710, and the distal portion 712. The proximal portion 708 includes the connection slot 714. The distal portion 712 includes a barbed wire receiving slot 750 disposed near the distal end 712a of the distal portion 712, the bent portion 710 comprises an S-shaped jog. The first member 702 also includes a first engaging surface 718.

Looking at FIGS. 7H&I, the apparatus 700 also includes a second member 722 having a top surface 724 and a bottom surface 726. The second member 722 also includes a proximal portion 728, a bent portion 730, and a distal portion 732. The proximal portion 728 includes the connection slot 714. The distal portion 732 includes a barbed wire receiving apertures 752 disposed near the distal end 732a of the distal portion 732, the bent portion 730 comprises an S-shaped jog.

The second member 722 also includes a second engaging surface 738, wherein the second engaging surface 738 is adapted to engage the first engaging surface 718.

Figure 7J:
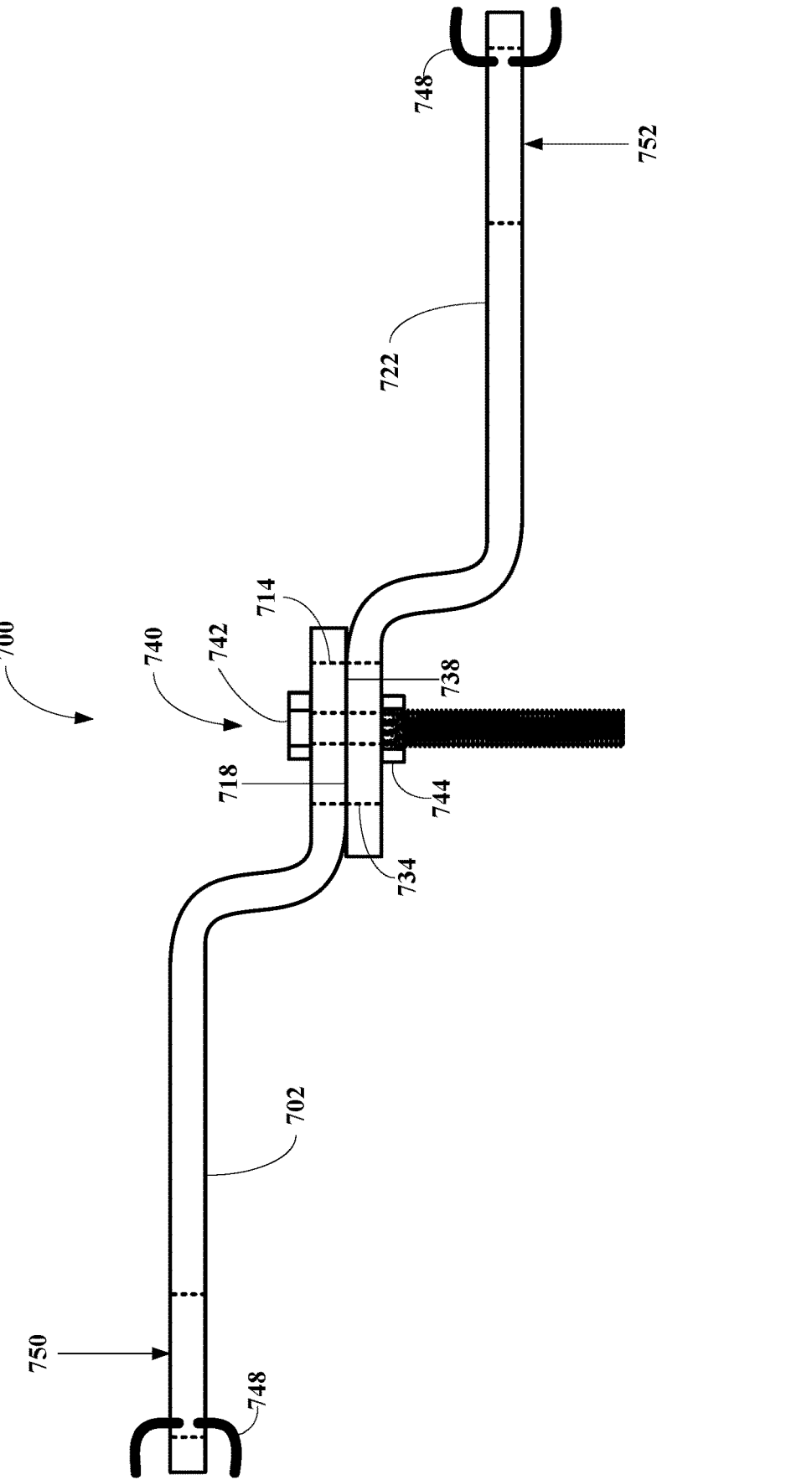

Looking at FIGS. 7J, the apparatus 700 is shown fixing a break in the barbed wire 748. After the ends of the break in the barbed wire are secured to the members 702 and 722 of the apparatus 700 via the barbed wire receiving slots 750 and 752, respectively, a connection device 740, here a long bolt 742 and a nut 744, is used to (a) secure the two members 702 and 722 together, (b) bring the first engaging surface 718 and the second engaging surface 738 into contact, and (c) repair the break in the barbed wire 748.
Type 3

Figures 7K, 7L, 7M, 7N:
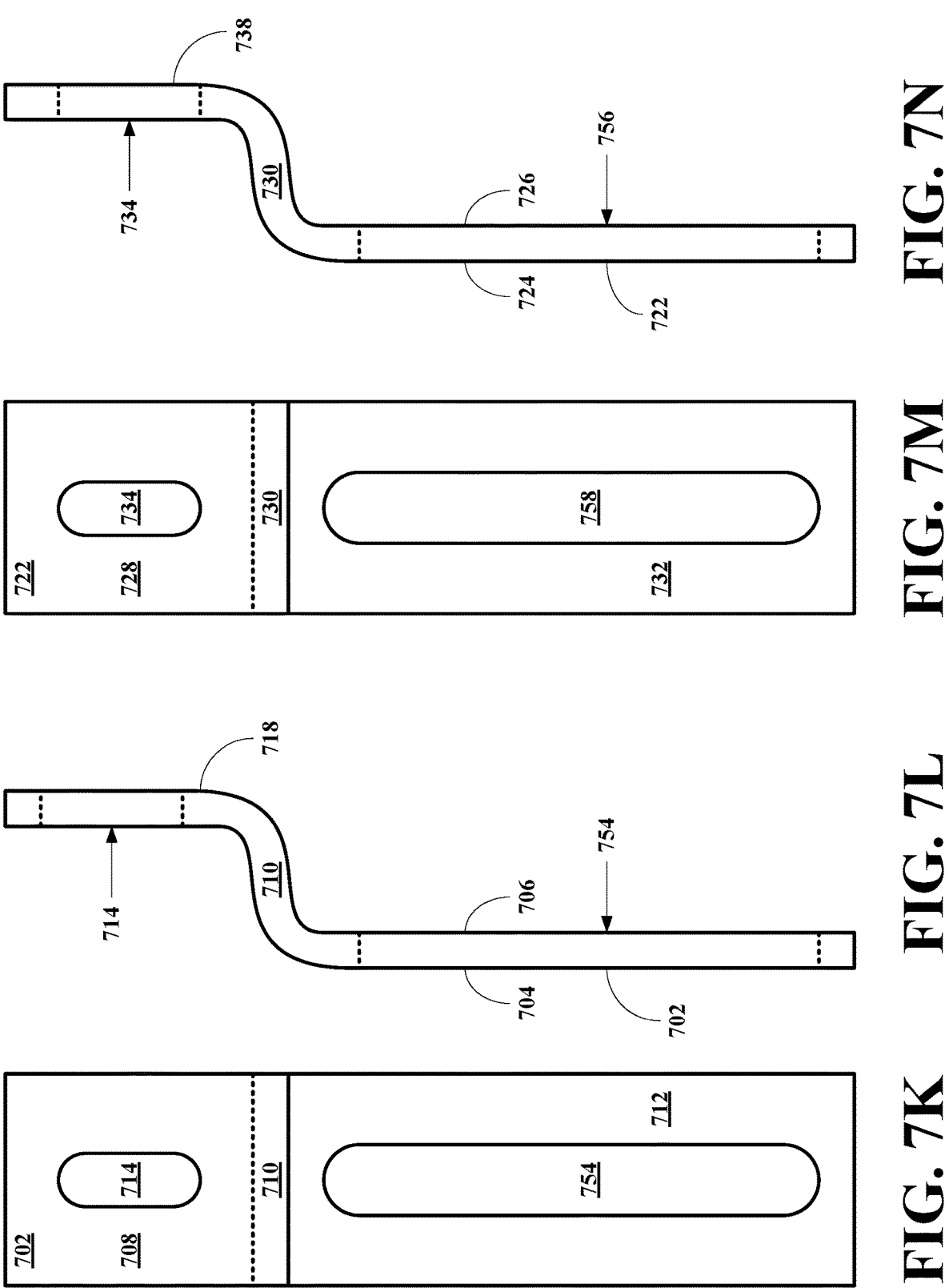

Looking at FIGS. 7K&L, the apparatus 700 includes a first member 702 having a top surface 704 and a bottom surface 706. The first member 702 also includes a proximal portion 708, a bent portion 710, and a distal portion 712. The proximal portion 708 includes the connection slot 714. The distal portion 712 includes barbed an elongated barbed wire receiving slot 754. The bent portion 710 barbed comprises an S-shaped jog. The first member 702 also includes a first engaging surface 718.

Looking at FIGS. 7M&N, the apparatus 700 also includes a second member 722 having a top surface 724 and a bottom surface 726. The second member 722 also includes a proximal portion 728 and a distal portion 732. The proximal portion 728 includes the connection slot 734. The distal portion 732 includes an elongated barbed wire receiving slot 756. The bent portion 730 comprises an S-shaped jog. The second member 722 also includes a second engaging surface 738, wherein the second engaging surface 738 is adapted to engage the first engaging surface 718.

Figure 70:
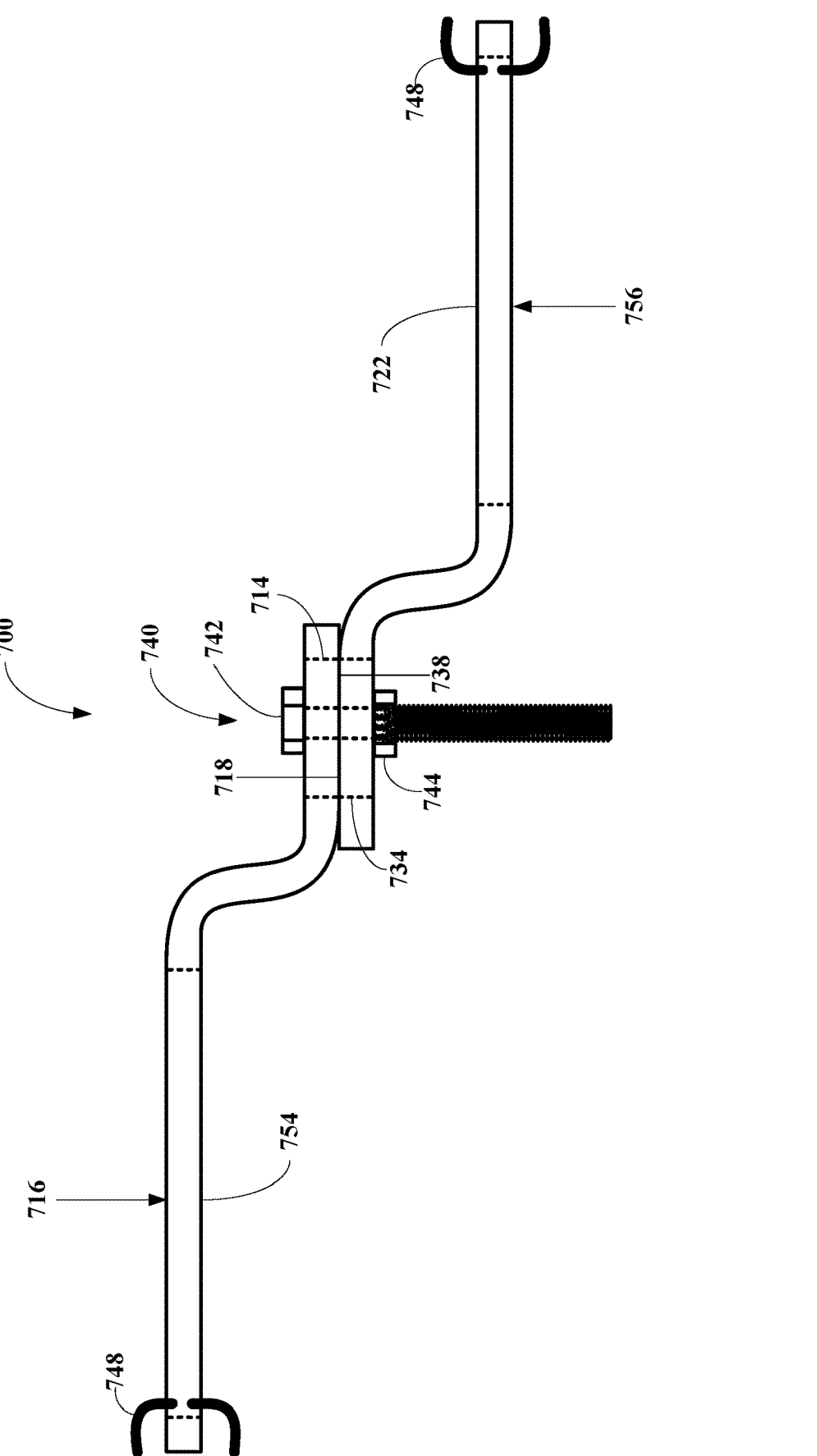

Looking at FIGS. 7O, the apparatus 700 is shown fixing a break in the barbed wire 748. After the ends of the break in the barbed wire are secured to the members 702 and 722 of the apparatus 700 via the elongated barbed wire receiving slots 754 and 756, respectively, a connection device 740, here a long bolt 742 and a nut 744, is used to (a) secure the two members 702 and 722 together, (b) bring the first engaging surface 718 and the second engaging surface 738 into contact, and (c) repair the break and tensioning the repaired the barbed wire 748.
Rachet Type Slot Embodiments Referring now to FIG. 8A-C, an embodiment of a rachet-type adjustable slot apparatus, generally 800 is shown, wherein the rachet-type adjustable slot apparatus may be associated with one or both members of FIGS. 1A-70 discussed above. The rachet-type apparatus 800 includes a slot 802 and a plurality of spring assemblies 804 including a housing 806, a retractable member 808, a spring mount member 810, and a spring 812. The rachet-type apparatus 800 also includes a slide assembly 814 including a platform member 816 having a barbed wire receiving slot 818.
Illustration of the Use of an Embodiment Similar to the Embodiment of FIG. 1A-E Referring now to FIG. 9A-E, an illustration of the method for using the barbed wired repair apparatus of this FIG. 1A-E, but shown without the washers 146 and including plastic inserts 914a and 934a to protect the threads of the elongated bolt 942 is shown in a sequence of figures for repairing a break in a barbed wire.

Figure 9A:
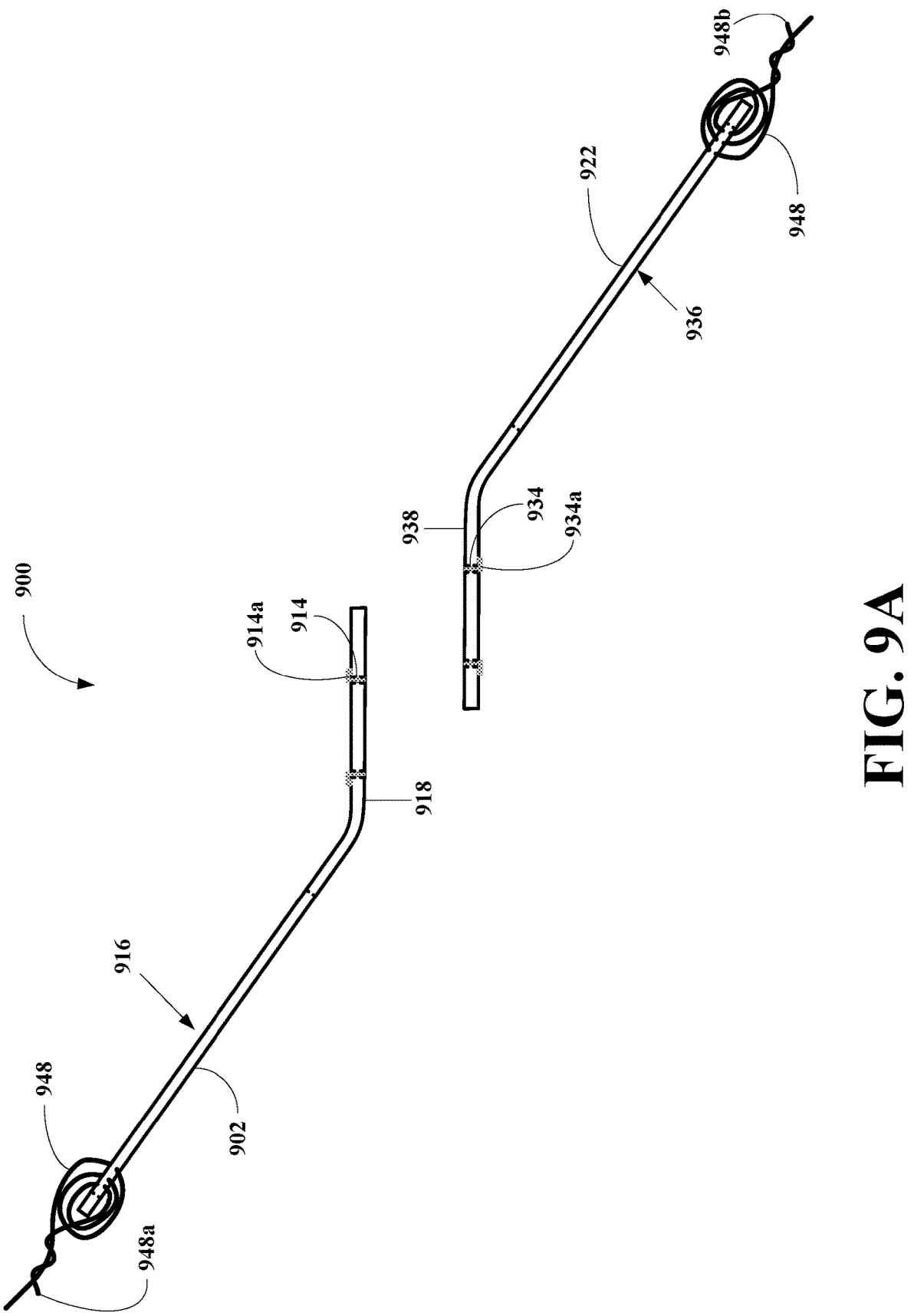

Looking at FIG. 9A, a barbed wire 948 is shown broken having break end 948a and break end 948b. The end 948a inserted through the aperture 916 of the member 902 one or more times and tied off, here three times, and the barbed wire 948b is inserted through the aperture 936 of the member 922 one or more times and tied off, here three times.

Figure 9B:
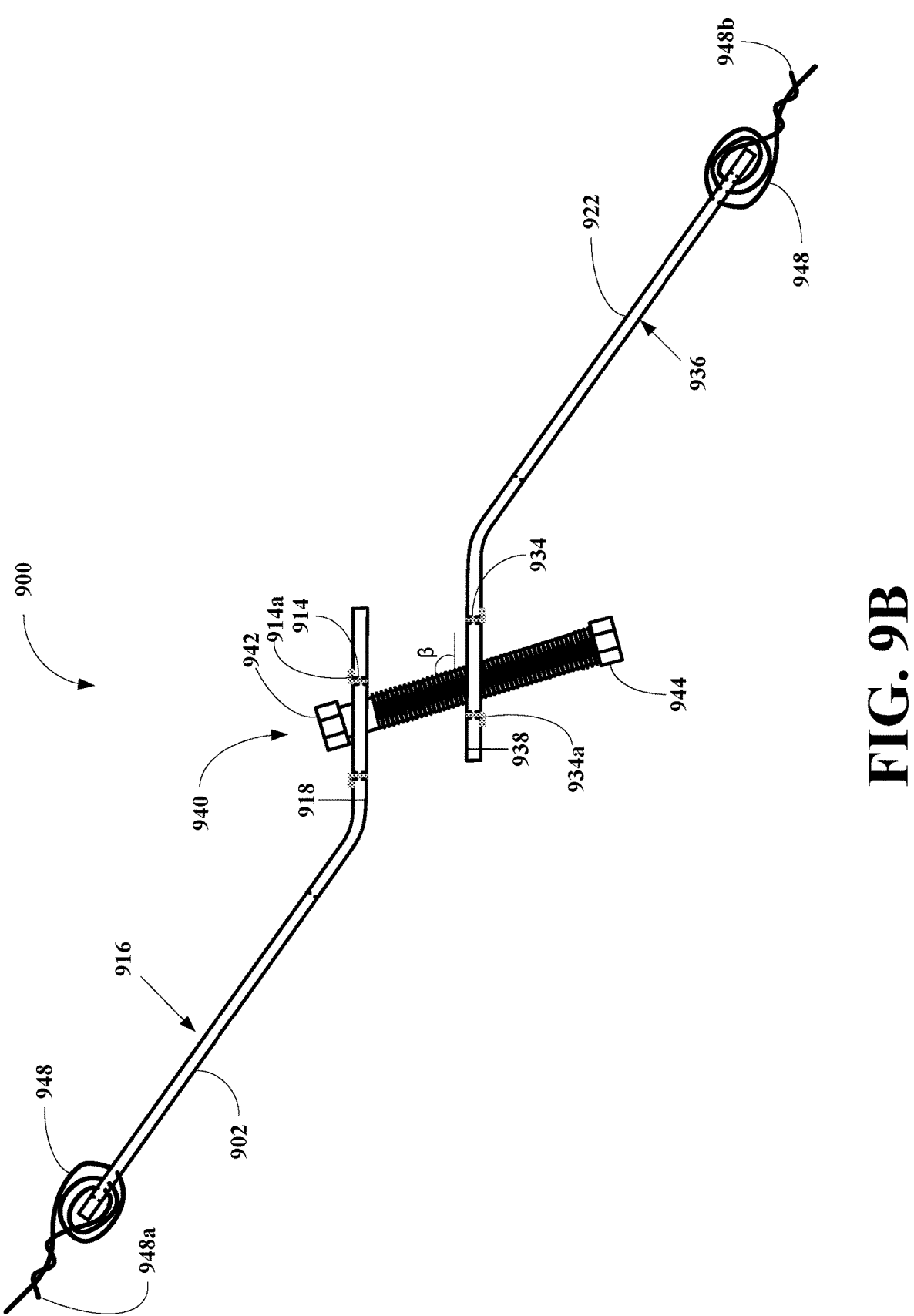

Looking at FIG. 9B, a long bolt 942 is inserted into and through the slot 914 including the plastic insert 914*a* of the member 902 with the barbed wire end 948*a* affixed thereto, and into and through the aperture 934 including the plastic insert 934*a* of the member 922 with the barbed wire end 948*b* affixed thereto and the nut 944 is just threaded onto the end of the bolt 942. The bolt 942 makes an angle β with respect the vertical, which reduces as the nut is tightened until the angle β has a value of about 0 degrees. The angle β allows the members 902 and 922 of the apparatus 900 to be offset from each other to begin with and as the nuts is tightened, the offset is reduced as the value of the angle β is reduced bringing the two members 902 and 922 towards each other, which acts to repair and tension the barbed wire 948 at the break.

Figure 9C:
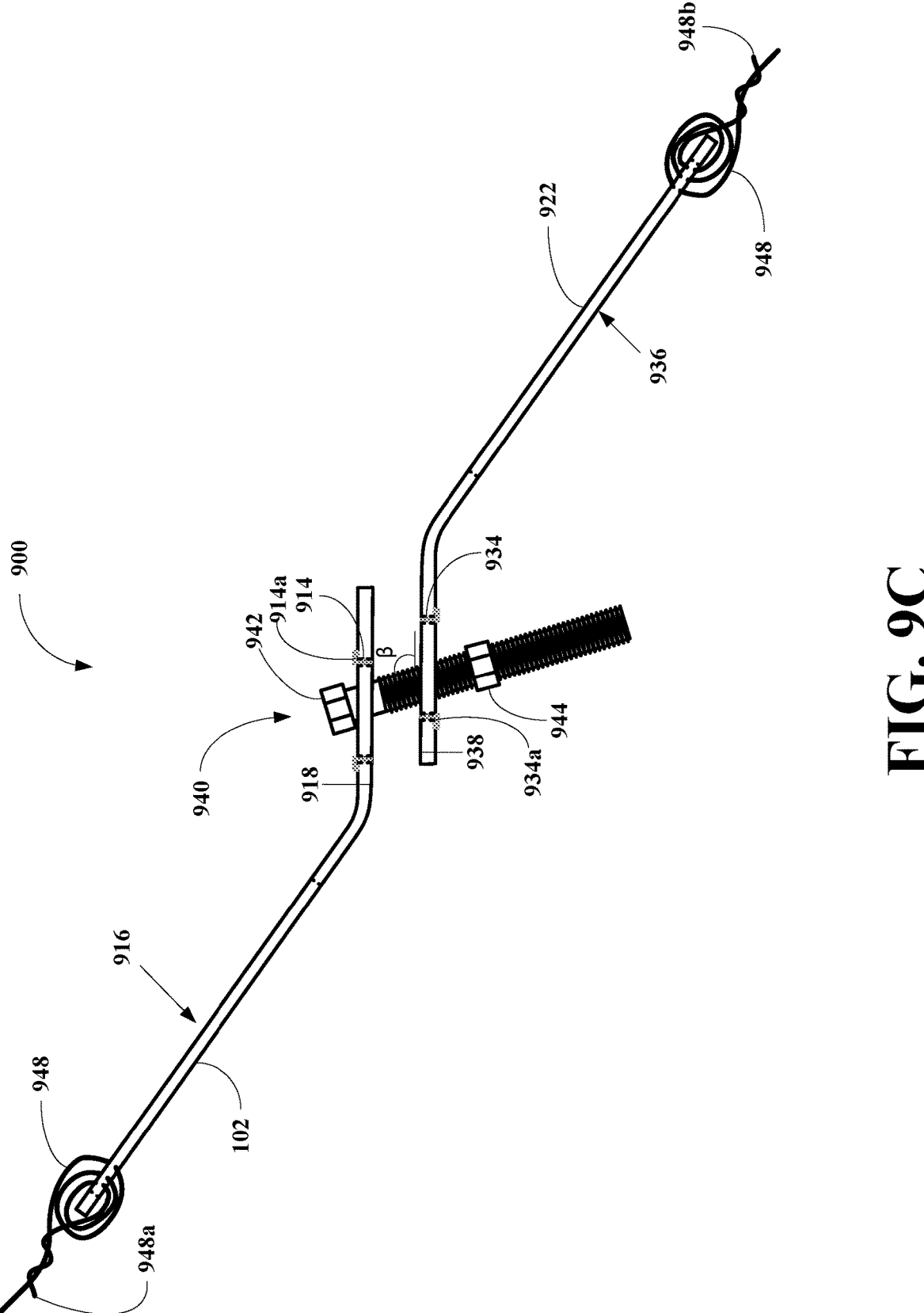

Looking at FIG. 9C, the nut 944 is further threaded onto the bolt 942 bringing the engaging surfaces 918 and 938 closer to contacting each other putting further tension on the barbed wire 948.

Figure 9D:

Looking at FIG. 9D, the nut 944 is still further threaded onto the bolt 942 bringing the engaging surfaces 918 and 938 even closer to contacting each other putting still further tension on the barbed wire 948.

Figure 9E:
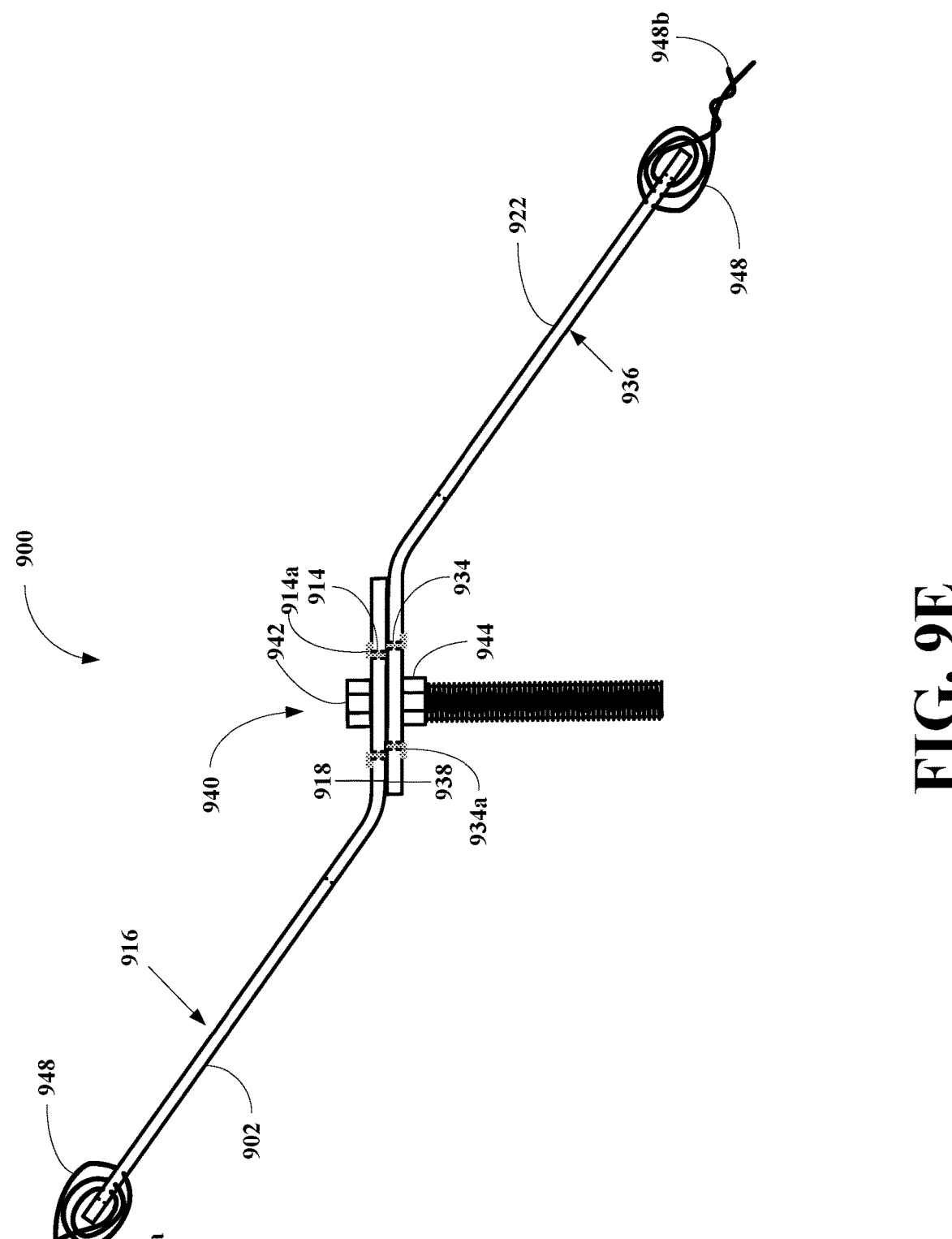

Looking at FIG. 9E, the nut 944 is threaded completely bringing the engaging surfaces 918 and 938 into contact with each other so that the barbed wire 948 is fully tensioned and repaired. It should be noted that the slots 914 and slot 934 do not have to perfectly align, but only align sufficiently for the engaging surfaces 918 and 938 even closer to contacting each other.

EXPERIMENTS OF THE DISCLOSURE

An experimental embodiment of the apparatuses of FIGS. 1A-E was field tested, wherein once the bolt is inserted into the members 102 and 122 at an offset, the nut is then threaded onto the bolt and tightened, the offset is reduced as the angle β is reduced reparing and tensioning the break in the barbed wire.

EMBODIMENTS OF THE DISCLOSURE

Embodiment 1. A barbed wire repair apparatus comprising:
  a first member including:
    a proximal portion having:
      a barbed wire receiving aperture,
    a middle portion,
    a distal portion having:
      a barbed wire receiving aperture, and
  a second member including:
    a proximal portion having:
      one or more barbed wire receiving apertures,
    a middle portion,
    a distal portion having:
      one or more connection apertures, and
  a connection device,
  wherein the barbed wire receiving apertures are adapted to receive and affix ends of a broken barbed wire of the members and
  wherein the connection device is adapted to be inserted through the connection apertures, and
  wherein the middle portions are adapted to allow the members to be offset from each other and to provide tension to the barbed wire as the connection device is tightened bringing the members together.

Embodiment 2. The apparatus of embodiment 1, wherein the middle portions comprise a bend making an angle α having a value between about 20 degrees and about 70 degrees including end points and subranges between the proximal portions and the distal portions.

Embodiment 3. The apparatus of embodiment 2, wherein the value is between about 25 degrees and about 65 degrees including end points and subranges.

Embodiment 4. The apparatus of embodiment 3, wherein the value is between about 30 degrees and about 60 degrees including end points and subranges.

Embodiment 5. The apparatus of embodiment 4, wherein the value is between about 35 degrees and about 55 degrees including end points and subranges.

Embodiment 6. The apparatus of embodiment 5, wherein the value is between about 30 degrees and about 60 degrees including end points and subranges.

Embodiment 7. The apparatus of embodiment 6, wherein the value is between about 35 degrees and about 55 degrees including end points and subranges.

Embodiment 8. The apparatus of embodiment 7, wherein the value is between about 40 degrees and about 50 degrees including end points and subranges.

Embodiment 9. The apparatus of embodiment 8, wherein the value is about 45 degrees.

Embodiment 10. The apparatus of embodiment 2, wherein the value is about 20 degrees, about 25 degrees, about 30 degrees, about 35 degrees, about 40 degrees, about 45 degrees, about 50 degrees, about 55 degrees, about 60 degrees, about 65 degrees, or about 70 degrees including any other value between 20 degrees and 70 degrees. In certain embodiments, the value of the angle α may assume any integral, fractional, or real numeric value between 20 degrees and about 70 degrees, e.g., about 20, about 25, about 30, about 35, about 40, about 45, about 50, about 55, about 60, about 65, about 70, about 20.5, about 25.5, about 30.5, about 35.5, about 40.5, about 45.5, about 50.5, about 55.5, about 60.5, about 65.5, or any other value.

Embodiment 11. The apparatus of embodiment 1, wherein the barbed wire receiving apertures comprising a tapered elongated slot having a narrow end disposed near a distal end of the distal portion of each of the members and a broad end disposed near a middle portion.

Embodiment 12. The apparatus of embodiment 1, wherein the barbed wire receiving apertures comprising slots.

Embodiment 13. The apparatus of embodiment 1, wherein the barbed wire receiving apertures comprising elongated slots.

Embodiment 14. The apparatus of embodiment 1, wherein each of the middle portions comprising an S-shaped jog between the proximal portions.

Embodiment 15. The apparatus of embodiment 1, wherein each of the middle portions comprising an 90-90 jog between the proximal portions and the distal portions.

Embodiment 16. The apparatus of embodiment 1, wherein the connection device comprising a long bolt and a nut, wherein the long bolt allows the two members to be offset from each other when the bolt is first inserted through then connection apertures and tensions the barbed wire as the connection devices is tightened.

Embodiment 17. The apparatus of embodiment 1, wherein each of the barbed wire receiving apertures comprising an elongated slot including a rachet-type tension adjusting assembly including:

a plurality of spring assemblies, each of the spring assemblies including:

a housing, a retractable member, a spring mount member, a spring, and a slide assembly including:

a platform member having:

the barbed wire receiving aperture.

Embodiment 18. The apparatus of embodiment 1, wherein each of the connection aperture including a thread protection member.

Embodiment 19. The apparatus of embodiment 18, wherein the thread protection member comprising:

a plastic thread protection member, a ceramic thread protection member; provided that the ceramic has a hardness less than that of the connection device, a metal thread protection member; provided that the metal has a hardness less than that of the connection device, a wood material thread protection member, a paper material thread protection member, or mixtures or combinations thereof.

Embodiment 20. The apparatus of embodiment 18, wherein the thread protection member comprising a plastic thread protection member.

Embodiment 21. The apparatus of embodiment 18, wherein the thread protection member comprising a ceramic thread protection member; provided that the ceramic has a hardness value less than about 10% of the hardness value of the connection device such as a long metal bolt, less than about 15% of the hardness value of the connection device, less than about 20% of the hardness value of the connection device, less than about 25% of the hardness value of the connection device, less than about 30% of the hardness value of the connection device including any subvalue.

Embodiment 22. The apparatus of embodiment 18, wherein the thread protection member comprising a metal having a hardness value less than about 10% of the hardness value of the connection device such as a long metal bolt, less than about 15% of the hardness value of the connection device, less than about 20% of the hardness value of the connection device, less than about 25% of the hardness value of the connection device, less than about 30% of the hardness value of the connection device including any subvalue.

Embodiment 23. A method of repairing barbed wire, via a barbed wire repair apparatus comprising (a) a first member including (i) a proximal portion having (1) one or more barbed wire receiving apertures, (ii) a middle portion, (iii) a distal portion having (1) one or more connection apertures, and (b) a second member including (i) a proximal portion having (1) one or more barbed wire receiving apertures, (ii) a middle portion, (iii) a distal portion having (1) one or more connection apertures, and (c) a connection device, the method comprising:

affixing an end of a broken barbed wire to the through each of the barbed wire receiving apertures, inserting a connection device through the connection apertures of the proximal ends of the members so that members are horizontally offset and the distal ends of the members are oriented away from each other, and tightening the connection device to simultaneously bring the members together reducing or eliminating the horizontal offset and tension the barbed wire.

Embodiment 24. The method of embodiment 23, wherein the middle portions comprise a bend making an angle $\alpha$ having a value between about 20 degrees and about 70 degrees including end points and subranges between the proximal portions and the distal portions.

Embodiment 25. The method of embodiment 24, wherein the value is between about 25 degrees and about 65 degrees including end points and subranges.

Embodiment 26. The method of embodiment 25, wherein the value is between about 30 degrees and about 60 degrees including end points and subranges.

Embodiment 27. The method of embodiment 26, wherein the value is between about 35 degrees and about 55 degrees including end points and subranges.

Embodiment 28. The method of embodiment 27, wherein the value is between about 30 degrees and about 60 degrees including end points and subranges.

Embodiment 29. The method of embodiment 28, wherein the value is between about 35 degrees and about 55 degrees including end points and subranges.

Embodiment 30. The method of embodiment 29, wherein the value is between about 40 degrees and about 50 degrees including end points and subranges.

Embodiment 31. The method of embodiment 30, wherein the value is about 45 degrees.

Embodiment 32. The method of embodiment 2, wherein the value is about 20 degrees, about 25 degrees, about 30 degrees, about 35 degrees, about 40 degrees, about 45 degrees, about 50 degrees, about 55 degrees, about 60 degrees, about 65 degrees, or about 70 degrees including any other value between 20 degrees and 70 degrees. In certain embodiments, the value of the angle $\alpha$ may assume any integral, fractional, or real numeric value between 20 degrees and about 70 degrees, e.g., about 20, about 25, about 30, about 35, about 40, about 45, about 50, about 55, about 60, about 65, about 70, about 20.5, about 25.5, about 30.5, about 35.5, about 40.5, about 45.5, about 50.5, about 55.5, about 60.5, about 65.5, or any other value.

Embodiment 33. The method of embodiment 21, wherein the barbed wire receiving apertures comprising a tapered elongated slot having a narrow end disposed near a distal end of the distal portion of each of the members and a broad end disposed near a middle portion.

Embodiment 34. The method of embodiment 21, wherein the barbed wire receiving apertures comprising slots.

Embodiment 35. The method of embodiment 21, wherein the barbed wire receiving apertures comprising elongated slots.

Embodiment 36. The method of embodiment 21, wherein each of the middle portions comprising an S-shaped jog between the proximal portions.

Embodiment 37. The method of embodiment 21, wherein each of the middle portions comprising an 90-90 jog between the proximal portions and the distal portions.

Embodiment 38. The method of embodiment 21, wherein the connection device comprising a long bolt and a nut, wherein the long bolt allows the two members to be offset from each other when the bolt is first inserted through then connection apertures and tensions the barbed wire as the connection devices is tightened.

Embodiment 39. The method of embodiment 21, wherein each of the barbed wire receiving apertures comprising an elongated slot including a rachet-type tension adjusting assembly including:

a plurality of spring assemblies, each of the spring assemblies including:

a housing, a retractable member, a spring mount member, a spring, and

23 a slide assembly including:
   a platform member having:
      the barbed wire receiving aperture.

Embodiment 40. The method of embodiment 31, wherein each of the connection aperture including a thread protection member.

Embodiment 41. The method of embodiment 39, wherein the thread protection member comprising:
   a plastic thread protection member,
   a ceramic thread protection member; provided that the ceramic has a hardness less than that of the connection device,
   a metal thread protection member; provided that the metal has a hardness less than that of the connection device,
   a wood material thread protection member,
   a paper material thread protection member, or
   mixtures or combinations thereof.

Embodiment 42. The method of embodiment 39, wherein the thread protection member comprising a plastic thread protection member.

Embodiment 43. The method of embodiment 39, wherein the thread protection member comprising a ceramic thread protection member; provided that the ceramic has a hardness value less than about 10% of the hardness value of the connection device such as a long metal bolt, less than about 15% of the hardness value of the connection device, less than about 20% of the hardness value of the connection device, less than about 25% of the hardness value of the connection device, less than about 30% of the hardness value of the connection device including any subvalue.

Embodiment 44. The method of embodiment 39, wherein the thread protection member comprising a metal having a hardness value less than about 10% of the hardness value of the connection device such as a long metal bolt, less than about 15% of the hardness value of the connection device, less than about 20% of the hardness value of the connection device, less than about 25% of the hardness value of the connection device, less than about 30% of the hardness value of the connection device including any subvalue.

CLOSING PARAGRAPH OF THE DISCLOSURE

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

I claim:

1. A barbed wire repair apparatus comprising:
   a first member including:
      a proximal portion having:
         a barbed wire receiving aperture,
      a middle portion including a bend, an S-shaped jog, or a 90-90 job,
      a distal portion having:
         a connection aperture, and
   a second member including:
      a proximal portion having:
         a barbed wire receiving aperture,
      a middle portion including a bend, an S-shaped jog, or a 90-90 job,
      a distal portion having:
         a connection aperture, and
   a connection device comprising a long threaded bolt and a nut,

wherein the barbed wire receiving apertures are adapted to receive and affix ends of a broken barbed wire to the members, and
   wherein the connection device is adapted to be inserted through the connection apertures, wherein the member are horizontally offset and the distal portions of the members are oriented away from each other, and
   wherein the connection device is adapted to simultaneously (a) tighten by bringing the members together reducing or eliminating the horizontal offset and (b) tension the barbed wire.

2. The apparatus of claim 1, wherein the bend in each of the middle portions makes an angle α having a value between about 20 degrees and about 70 degrees and subranges and including end points between the proximal portions and the distal portions.

3. The apparatus of claim 2, wherein the value is between about 40 degrees and about 50 degrees and subranges and including the end points.

4. The apparatus of claim 3, wherein the value is about 45 degrees.

5. The apparatus of claim 1, wherein each of the barbed wire receiving apertures comprises:
   a tapered elongated slot having a narrow end disposed near a distal end of the distal portion of each of the members and a broad end disposed near a middle portion, or
   a slot, or
   an elongated slot.

6. The apparatus of claim 1, wherein the S-shaped jogs or the 90-90 Jogs are disposed between the proximal portions and the distal portions of each of the members.

7. The apparatus of claim 1, wherein each member further comprises an elongated slot including a rachet-type tension adjusting assembly including:
   a plurality of spring assemblies, each of the spring assemblies including:
      a housing,
      a retractable member,
      a spring mount member,
      a spring, and
      a slide assembly including:
         a platform member having:
            the barbed wire receiving aperture.

8. The apparatus of claim 1, wherein each of the connection aperture including a thread protection member.

9. The apparatus of claim 8, wherein the thread protection member comprising:
   a plastic thread protection member,
   a ceramic thread protection member,
   provided that the ceramic has a hardness less than that of the connection device,
   a metal thread protection member;
   provided that the metal has a hardness less than that of the connection device,
   a wood material thread protection member,
   a paper material thread protection member, or
   mixtures or combinations thereof.

10. A method of repairing barbed wire, via a barbed wire repair apparatus comprising (a) a first member including (i) a proximal portion having (1) a barbed wire receiving aperture, (ii) a middle portion including a bend or an S-shaped jog, (iii) a distal portion having (1) a connection aperture, and (b) a second member including (i) a proximal portion having (1) a barbed wire receiving aperture, (ii) a middle portion including a bend or an S-shaped jog, (iii) a distal portion having (1) a connection aperture, and (c) a connection device comprising a long bolt and a nut, the method comprising:

affixing a first end of a broken barbed wire to the barbed wire receiving aperture of the first member and a second end of the broken barbed wire to the barbed wire receiving aperture of the second member, inserting the connection device through the connection apertures of the members so that the members are horizontally offset and the distal portions of the members are oriented away from each other, and tightening the connection device to simultaneously bring the members together reducing or eliminating the horizontal offset and tensioning the barbed wire.

11. The method of claim 10, wherein each of the middle portions comprising a bend making an angle α having a value between about 20 degrees and about 70 degrees and subranges and including end points between the proximal portions and the distal portions.

12. The method of claim 11, wherein the value is between about 40 degrees and about 50 degrees and subranges and including end points.

13. The method of claim 12, wherein the value is about 45 degrees.

14. The method of claim 11, wherein the barbed wire receiving apertures comprising:

a tapered elongated slot having a narrow end disposed near a distal end of the distal portion of each of the members and a broad end disposed near a middle portion, a slot, or an elongated slot.

15. The method of claim 11, wherein the middle portions comprising an S-shaped jog between the proximal portions and the distal portions.

16. The method of claim 11, wherein each of the connection aperture including a thread protection member.

17. The method of claim 16, wherein the thread protection member comprising:

a plastic thread protection member, a ceramic thread protection member; provided that the ceramic has a hardness less than that of the connection device, a metal thread protection member; provided that the metal has a hardness less than that of the connection device, a wood material thread protection member, a paper material thread protection member, or mixtures or combinations thereof.

18. The method of claim 11, wherein the barbed wire repair apparatus further comprising:

elongated barbed wire receiving slots, each of the elongated barbed wire receiving slots including a rachet-type tension adjusting assembly including:

a plurality of spring assemblies, each of the spring assemblies including:

a housing, a retractable member, a spring mount member, a spring, and a slide assembly including:

a platform member having:

the barbed wire receiving aperture, and the method further comprising:

affixing the ends of the barbed wire to the barbed wire receiving apertures of the slide assemblies and sliding one or both of the slide assemblies to tension the repaired barbed wire.

* * * * *